(12) United States Patent
Blake et al.

(10) Patent No.: US 12,031,494 B2
(45) Date of Patent: Jul. 9, 2024

(54) SYSTEM AND METHOD FOR CONTROLLING OPERATION OF A TWO-STROKE ENGINE HAVING A TURBOCHARGER

(71) Applicant: Polaris Industries Inc., Medina, MN (US)

(72) Inventors: Dallas J. Blake, Roseau, MN (US);
James H. Buchwitz, Roseau, MN (US);
Lucas R. Salfer, Salol, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/346,993

(22) Filed: Jul. 5, 2023

(65) Prior Publication Data
US 2023/0349336 A1    Nov. 2, 2023

Related U.S. Application Data

(62) Division of application No. 17/831,828, filed on Jun. 3, 2022, now Pat. No. 11,725,599, which is a division
(Continued)

(51) Int. Cl.
*F02D 41/00* (2006.01)
*B62J 50/21* (2020.01)
(Continued)

(52) U.S. Cl.
CPC .......... *F02D 41/0007* (2013.01); *B62J 50/21* (2020.02); *F01N 13/1805* (2013.01);
(Continued)

(58) Field of Classification Search
CPC ...... F02D 41/0007; F02D 9/105; F02D 23/00; F02D 41/10; F02D 2200/0404;
(Continued)

(56) References Cited

U.S. PATENT DOCUMENTS 1,656,629 A    1/1928    Gray
1,874,326 A    8/1932    Mason
(Continued)

FOREIGN PATENT DOCUMENTS

CN    207648298 U    7/2018
CN    110195644 A    9/2019
(Continued)

OTHER PUBLICATIONS

"Garrett by Honeywell", 2016, Honeywell, vol. 6 (Year: 2016).
(Continued)

*Primary Examiner* — Audrey B. Walter
(74) *Attorney, Agent, or Firm* — Harness, Dickey & Pierce, P.L.C.

(57) ABSTRACT

A method and system for controlling operation of a two-stroke engine having a turbocharger includes the two-stroke engine comprising an electronically controlled exhaust valve. A throttle position sensor generates a throttle position signal corresponding to a position of a throttle plate of a throttle. A boost box is coupled to the two-stroke engine. A boost box pressure sensor is coupled to the boost box and generates a boost box pressure signal corresponding to a pressure within the boost box. A controller is coupled to the boost box pressure signal controlling a position of the electronically controlled exhaust valve in response to the boost box pressure signal and the throttle position signal.

20 Claims, 62 Drawing Sheets

Related U.S. Application Data of application No. 17/145,298, filed on Jan. 9, 2021, now Pat. No. 11,384,697.

(60) Provisional application No. 62/960,414, filed on Jan. 13, 2020.

(51) Int. Cl.
| | |
|---|---|
| *F01N 13/18* | (2010.01) |
| *F02B 37/18* | (2006.01) |
| *F02D 9/10* | (2006.01) |
| *F02D 23/00* | (2006.01) |
| *F02D 41/10* | (2006.01) |
| *F02B 75/02* | (2006.01) |

(52) U.S. Cl.
CPC ............ *F02B 37/186* (2013.01); *F02D 9/105* (2013.01); *F02D 23/00* (2013.01); *F02D 41/10* (2013.01); *F01N 2240/36* (2013.01); *F01N 2410/00* (2013.01); *F02B 2075/025* (2013.01); *F02D 2200/0404* (2013.01); *F02D 2200/0406* (2013.01); *F02D 2200/101* (2013.01); *F02D 2200/703* (2013.01)

(58) Field of Classification Search
CPC ....... F02D 2200/0406; F02D 2200/101; F02D 2200/703; B62J 50/21; F01N 13/1805; F01N 2240/36; F01N 2410/00; F02B 37/186; F02B 2075/025
See application file for complete search history.

(56) References Cited

U.S. PATENT DOCUMENTS

| | | | |
|---|---|---|---|
| 2,047,443 A | 7/1936 | Starkweather | |
| 3,045,419 A | 7/1962 | Addie et al. | |
| 3,190,271 A | 6/1965 | Gudmundsen | |
| 3,614,259 A | 10/1971 | Neff | |
| 3,653,212 A | 4/1972 | Gast et al. | |
| 3,703,937 A | 11/1972 | Tenney | |
| 3,868,822 A | 3/1975 | Keller | |
| 3,870,115 A | 3/1975 | Hase | |
| 3,948,206 A | 4/1976 | Tyler | |
| 4,005,579 A | 2/1977 | Lloyd | |
| 4,047,507 A | 9/1977 | Noguchi et al. | |
| 4,169,354 A | 10/1979 | Woollenweber | |
| 4,235,484 A | 11/1980 | Owen et al. | |
| 4,254,625 A | 3/1981 | Bergstedt et al. | |
| 4,289,094 A | 9/1981 | Tanahashi | |
| 4,305,351 A | 12/1981 | Staerzl | |
| 4,349,000 A | 9/1982 | Staerzl | |
| 4,468,928 A | 9/1984 | Suzuki | |
| 4,512,152 A | 4/1985 | Asaba | |
| 4,598,549 A | 7/1986 | Kanawyer | |
| 4,628,877 A | 12/1986 | Sundles et al. | |
| 4,671,068 A | 6/1987 | Moody et al. | |
| 5,050,559 A | 9/1991 | Kurosu et al. | |
| 5,051,909 A | 9/1991 | Gomez et al. | |
| 5,085,193 A | 2/1992 | Morikawa | |
| 5,121,604 A | 6/1992 | Berger et al. | |
| 5,191,531 A | 3/1993 | Kurosu et al. | |
| 5,197,426 A | 3/1993 | Frangesch et al. | |
| 5,214,919 A | 6/1993 | Jiewertz et al. | |
| 5,427,083 A | 6/1995 | Ahern | |
| 5,441,030 A | 8/1995 | Satsukawa | |
| 5,579,740 A | 12/1996 | Cotton et al. | |
| 5,586,524 A | 12/1996 | Nonaka et al. | |
| 5,630,395 A | 5/1997 | Katoh et al. | |
| 5,659,158 A | 8/1997 | Browning et al. | |
| 5,726,397 A | 3/1998 | Mukai et al. | |
| 5,782,214 A | 7/1998 | Nanami et al. | |
| 5,791,304 A | 8/1998 | Taipale | |
| 5,813,374 A | 9/1998 | Chasteen | |
| 5,832,901 A | 11/1998 | Yoshida et al. | |
| 5,960,631 A | 10/1999 | Hayashi | |
| 6,073,447 A | 6/2000 | Kawakami et al. | |
| 6,158,214 A | 12/2000 | Kempka et al. | |
| 6,161,384 A | 12/2000 | Reinbold et al. | |
| 6,162,028 A | 12/2000 | Rembold | |
| 6,170,463 B1 | 1/2001 | Koerner | |
| 6,209,530 B1 | 4/2001 | Faletti et al. | |
| 6,286,623 B1 | 9/2001 | Shaya | |
| 6,435,169 B1 | 8/2002 | Vogt | |
| 6,443,123 B1 | 9/2002 | Aoki et al. | |
| 6,658,849 B1 | 12/2003 | Hallman et al. | |
| 6,739,579 B1 | 5/2004 | Rim | |
| 6,745,568 B1 | 6/2004 | Squires | |
| 6,830,121 B1 | 12/2004 | Johnson | |
| 6,941,755 B2 | 9/2005 | Bucknell et al. | |
| 6,942,052 B1 | 9/2005 | Blakely | |
| 6,962,225 B2 | 11/2005 | Conte | |
| 6,976,359 B2 | 12/2005 | Hastings et al. | |
| 6,983,596 B2 | 1/2006 | Frankenstein et al. | |
| 7,017,706 B2 | 3/2006 | Brown et al. | |
| 7,621,127 B2 | 11/2009 | Robinson | |
| 7,794,213 B2 | 9/2010 | Gaude et al. | |
| 8,128,356 B2 | 3/2012 | Higashimori | |
| 8,220,262 B2 | 7/2012 | Robinson | |
| 8,474,789 B2 | 7/2013 | Shimada et al. | |
| 8,483,932 B2 | 7/2013 | Pursifull | |
| 8,490,605 B2 | 7/2013 | Gracner et al. | |
| 8,528,327 B2 | 9/2013 | Bucknell et al. | |
| 8,641,363 B2 | 2/2014 | Love et al. | |
| 8,671,683 B2 | 3/2014 | Lilly | |
| 8,789,369 B2 | 7/2014 | Sato | |
| 9,188,048 B2 | 11/2015 | Bedard | |
| 9,322,323 B2 | 4/2016 | Panciroli | |
| 9,630,611 B1 | 4/2017 | Dufford | |
| 9,670,833 B2 | 6/2017 | Klipfel et al. | |
| 9,719,469 B1 | 8/2017 | Pelfrey et al. | |
| 9,920,670 B1 | 3/2018 | Wright | |
| 10,989,124 B2 | 4/2021 | Yamaguchi et al. | |
| 11,131,235 B2 | 9/2021 | Buchwitz et al. | |
| 11,255,231 B2 | 2/2022 | Fuhrman et al. | |
| 11,293,316 B2 | 4/2022 | Muramatsu et al. | |
| 2001/0023683 A1 | 9/2001 | Nakamura et al. | |
| 2001/0032601 A1 | 10/2001 | Galka et al. | |
| 2001/0047656 A1 | 12/2001 | Maddock et al. | |
| 2002/0078934 A1 | 6/2002 | Hohkita et al. | |
| 2002/0124817 A1 | 9/2002 | Abei | |
| 2003/0029663 A1 | 2/2003 | Etou | |
| 2003/0236611 A1 | 12/2003 | James et al. | |
| 2005/0039722 A1 | 2/2005 | Montgomery et al. | |
| 2005/0204730 A1 | 9/2005 | Tsukahara et al. | |
| 2006/0175107 A1 | 8/2006 | Etou | |
| 2006/0185632 A1 | 8/2006 | Mavinahally | |
| 2007/0062188 A1 | 3/2007 | Fry et al. | |
| 2007/0113829 A1 | 5/2007 | Allen | |
| 2007/0234997 A1 | 10/2007 | Prenger | |
| 2007/0289302 A1 | 12/2007 | Funke et al. | |
| 2008/0060356 A1* | 3/2008 | Livshiz | F02D 41/0007 60/601 |
| 2008/0060617 A1 | 3/2008 | Adachi et al. | |
| 2008/0250786 A1 | 10/2008 | Robinson | |
| 2008/0264380 A1 | 10/2008 | Kang et al. | |
| 2008/0276906 A1 | 11/2008 | Thomas | |
| 2009/0276141 A1 | 11/2009 | Surnilla et al. | |
| 2010/0024786 A1 | 2/2010 | Robinson | |
| 2010/0036585 A1 | 2/2010 | Scharfenberg | |
| 2010/0041287 A1 | 2/2010 | Woods et al. | |
| 2010/0114454 A1 | 5/2010 | French et al. | |
| 2010/0213000 A1 | 8/2010 | Inoue | |
| 2010/0243343 A1 | 9/2010 | Rasmussen | |
| 2010/0313418 A1 | 12/2010 | St. Mary | |
| 2011/0061637 A1 | 3/2011 | Mavinahally et al. | |
| 2011/0093182 A1 | 4/2011 | Weber et al. | |
| 2011/0186013 A1 | 8/2011 | Sasaki | |
| 2011/0296835 A1 | 12/2011 | Ebisu | |
| 2012/0018468 A1 | 1/2012 | Dunican, Sr. | |
| 2012/0060494 A1 | 3/2012 | Sato et al. | |
| 2012/0181468 A1 | 7/2012 | Telep et al. | |
| 2012/0255379 A1 | 10/2012 | Lim et al. | |
| 2012/0269620 A1 | 10/2012 | Boening et al. | |

(56) References Cited

U.S. PATENT DOCUMENTS

| | | |
|---|---|---|
| 2012/0282078 A1 | 11/2012 | Marsal et al. |
| 2012/0285177 A1 | 11/2012 | Swenson et al. |
| 2012/0285427 A1 | 11/2012 | Hayman et al. |
| 2012/0316756 A1 | 12/2012 | Tsuyuki |
| 2013/0111900 A1 | 5/2013 | Hagner et al. |
| 2014/0158089 A1 | 6/2014 | Glugla et al. |
| 2014/0360178 A1 | 12/2014 | Wang |
| 2014/0366815 A1 | 12/2014 | Lu |
| 2015/0167593 A1 | 6/2015 | Kim et al. |
| 2015/0240707 A1 | 8/2015 | Wang et al. |
| 2016/0010541 A1 | 1/2016 | Wang et al. |
| 2016/0040566 A1 | 2/2016 | Barole et al. |
| 2016/0061139 A1 | 3/2016 | Imai et al. |
| 2016/0341116 A1 | 11/2016 | French |
| 2017/0016407 A1 | 1/2017 | Whitney et al. |
| 2017/0022927 A1 | 1/2017 | Sanborn et al. |
| 2017/0051684 A1 | 2/2017 | Lahti et al. |
| 2017/0058760 A1 | 3/2017 | Shor |
| 2017/0152794 A1 | 6/2017 | Patil et al. |
| 2017/0276067 A1 | 9/2017 | Hand, III et al. |
| 2017/0292631 A1 | 10/2017 | Muraoka |
| 2018/0003103 A1 | 1/2018 | Kawamura et al. |
| 2018/0051622 A1 | 2/2018 | Liu et al. |
| 2018/0058391 A1 | 3/2018 | Gibson et al. |
| 2018/0283270 A1 | 10/2018 | Niwa |
| 2018/0347455 A1 | 12/2018 | Noda et al. |
| 2019/0055862 A1 | 2/2019 | Fuhrman et al. |
| 2019/0063304 A1 | 2/2019 | Lefebvre et al. |
| 2019/0136754 A1 | 5/2019 | Brin et al. |
| 2019/0136818 A1 | 5/2019 | Blake et al. |
| 2019/0178197 A1 | 6/2019 | Okamura |
| 2019/0323510 A1 | 10/2019 | Serbes |
| 2020/0182139 A1 | 6/2020 | Buchwitz et al. |
| 2021/0040907 A1 | 2/2021 | Christensen et al. |
| 2021/0078674 A1 | 3/2021 | Schuehmacher et al. |
| 2021/0131366 A1 | 5/2021 | Blake et al. |

FOREIGN PATENT DOCUMENTS

| | | |
|---|---|---|
| JP | H05180056 A | 7/1993 |
| JP | 2000248920 A | 9/2000 |
| JP | 2002276383 A | 9/2002 |
| JP | 2008223626 A | 9/2008 |
| JP | 4661612 B2 | 3/2011 |
| JP | 5001918 B2 | 8/2012 |
| KR | 20010059144 A | 7/2001 |
| RU | 2706329 C1 | 11/2019 |
| SE | 535726 C2 | 11/2012 |

OTHER PUBLICATIONS

Office Action dated Mar. 9, 2021 in counterpart Canadian App. No. 3,063, 162.

Office Action issued in corresponding Canadian Application No. 3,063,162 dated Aug. 20, 2021 (4 pages).

Office Action issued in corresponding Canadian Application No. 3,063,162 dated Sep. 16, 2021 (6 pages).

Office Action issued in corresponding Canadian Application No. 3,063,164 dated Feb. 14, 2022.

Canadian Office Action dated Apr. 6, 2022 in corresponding Canadian Application No. 3,063,132 (5 pages).

Canadian Office Action dated Nov. 17, 2022 in corresponding Canadian Application No. 3,105,244.

\* cited by examiner

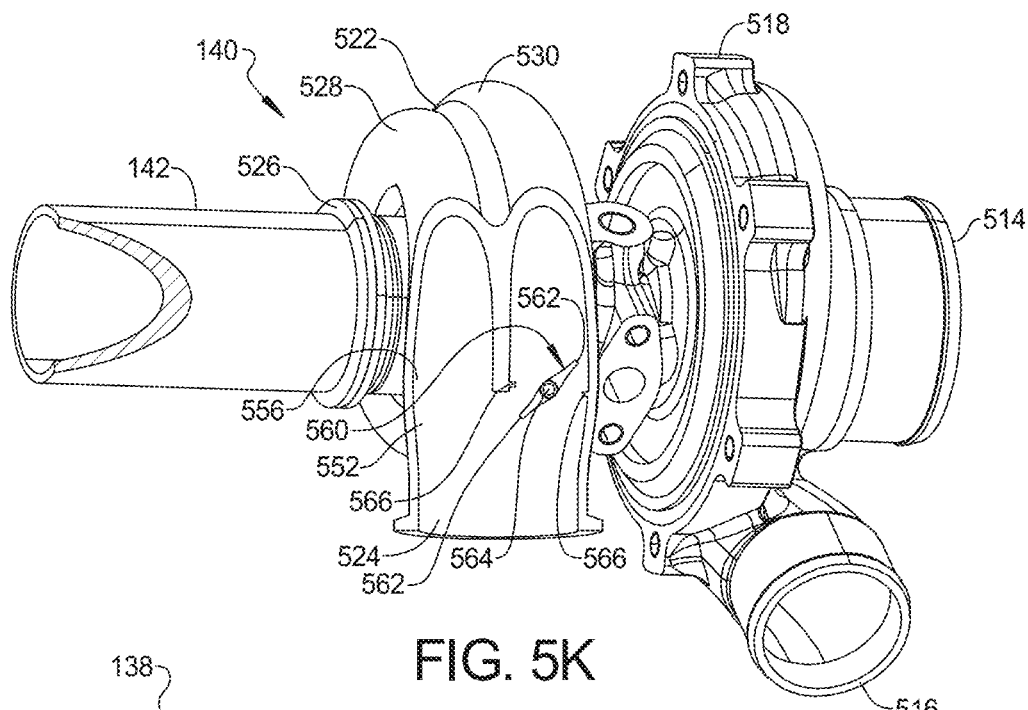
FIG. 5K
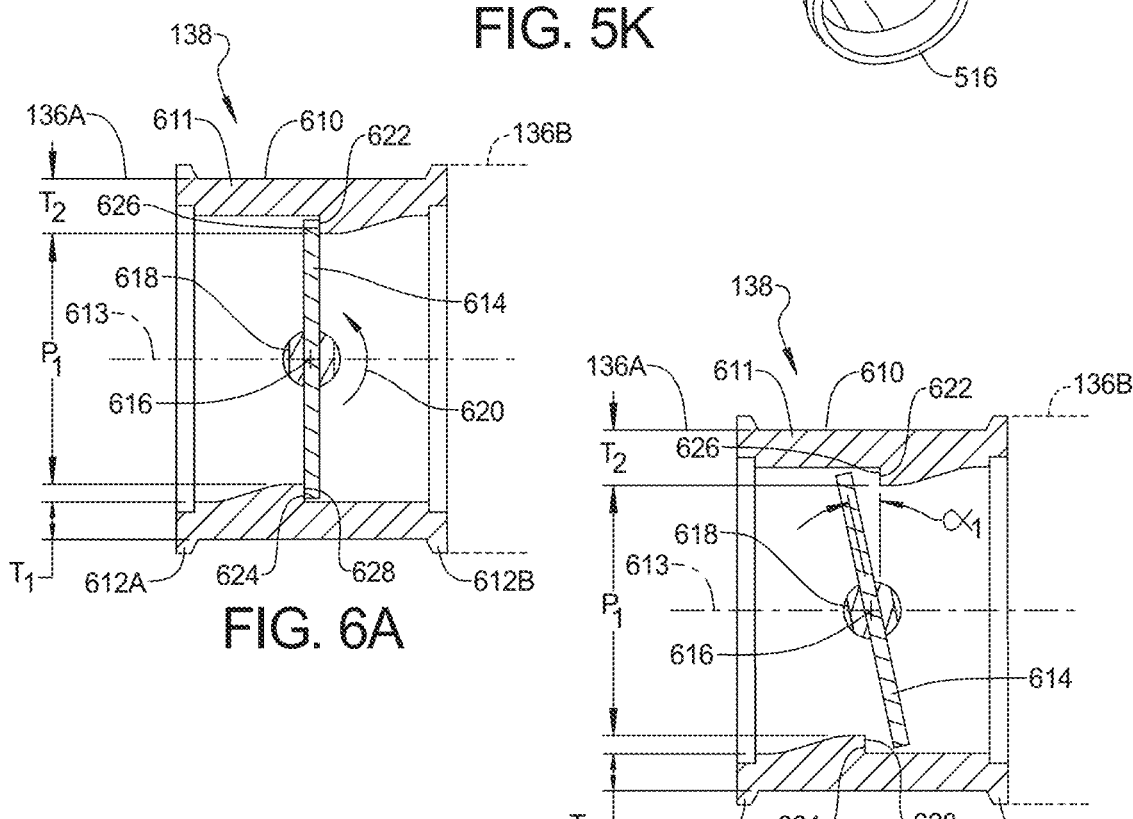
FIG. 6A
FIG. 6B

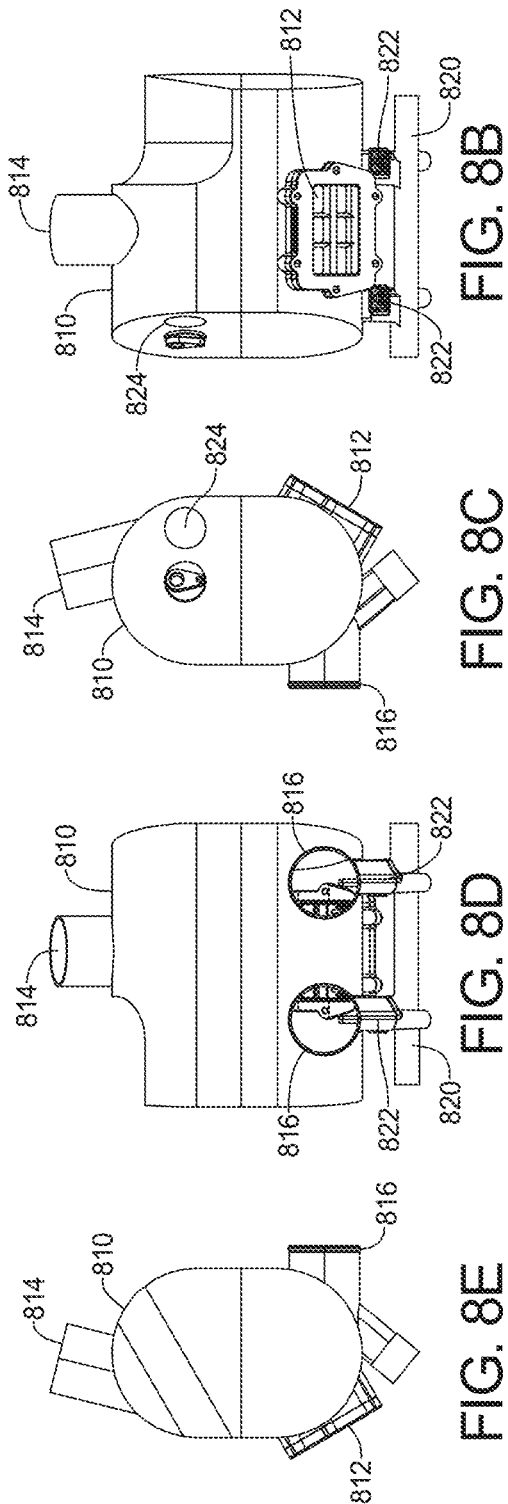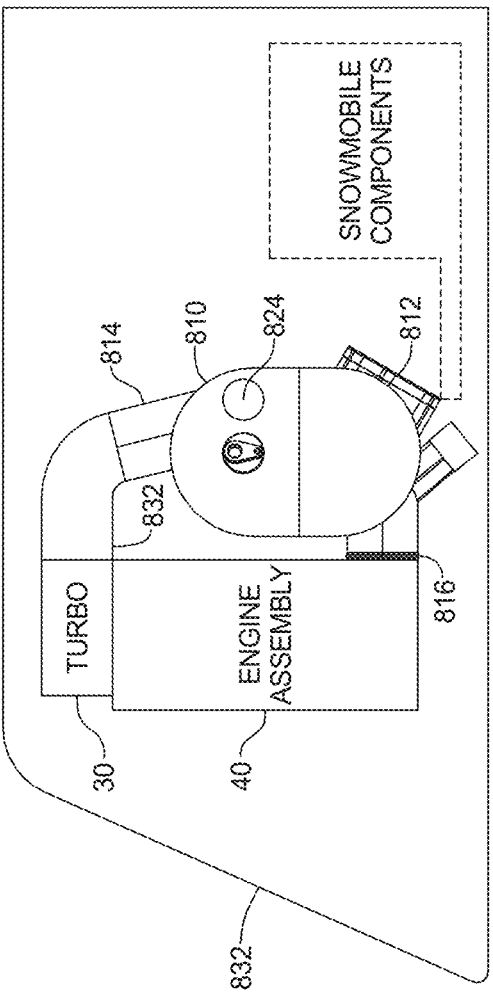

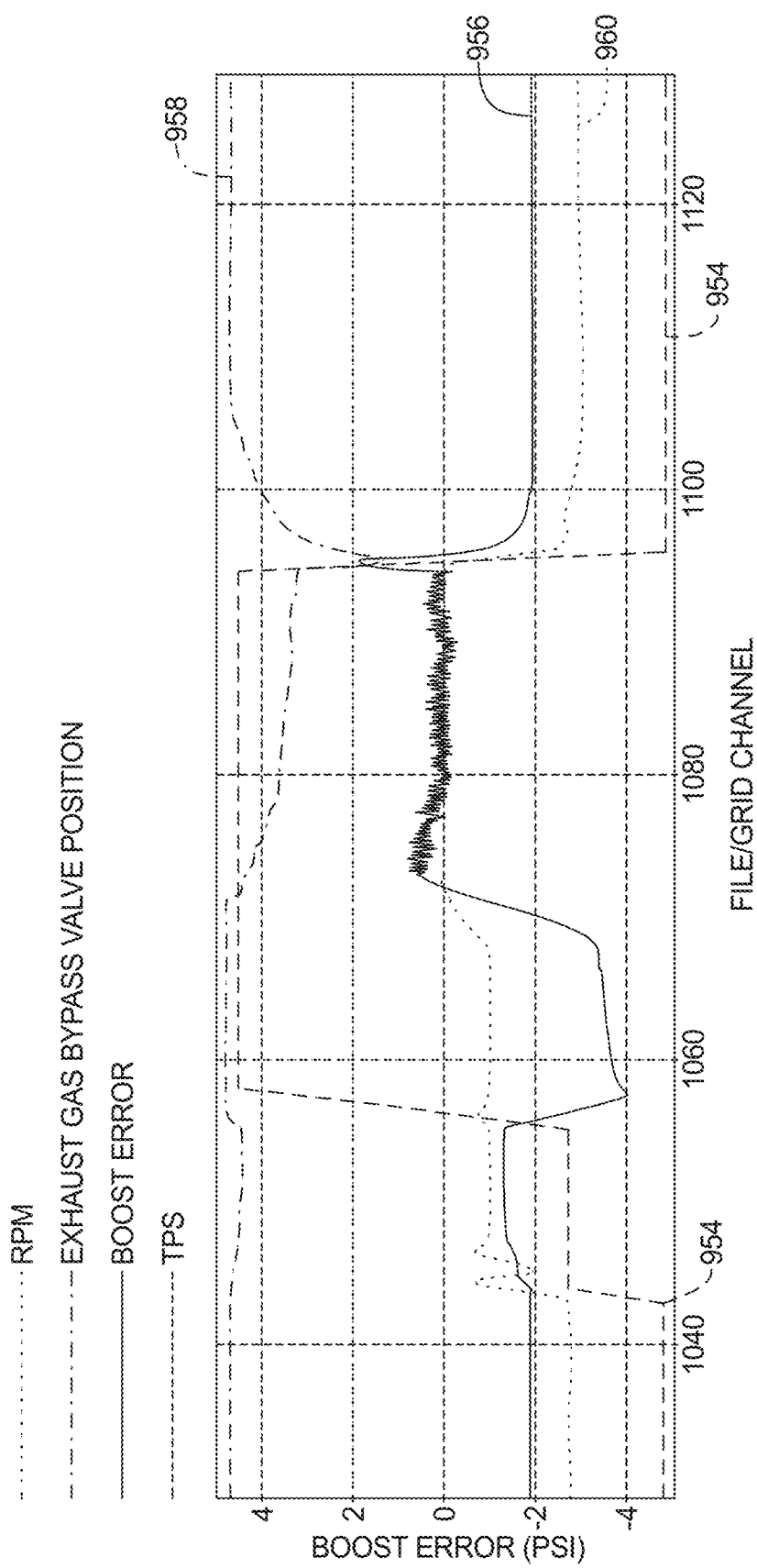

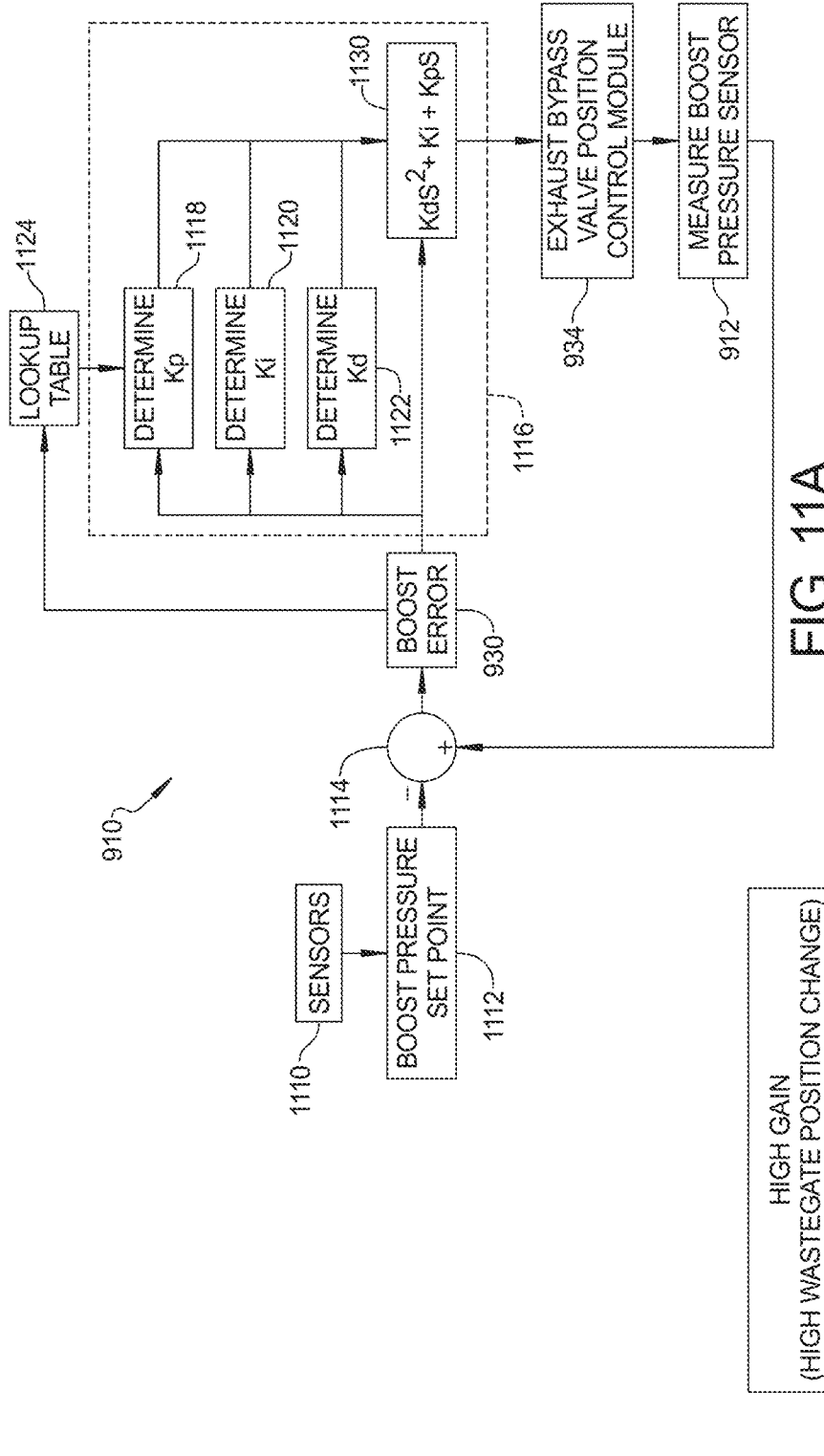

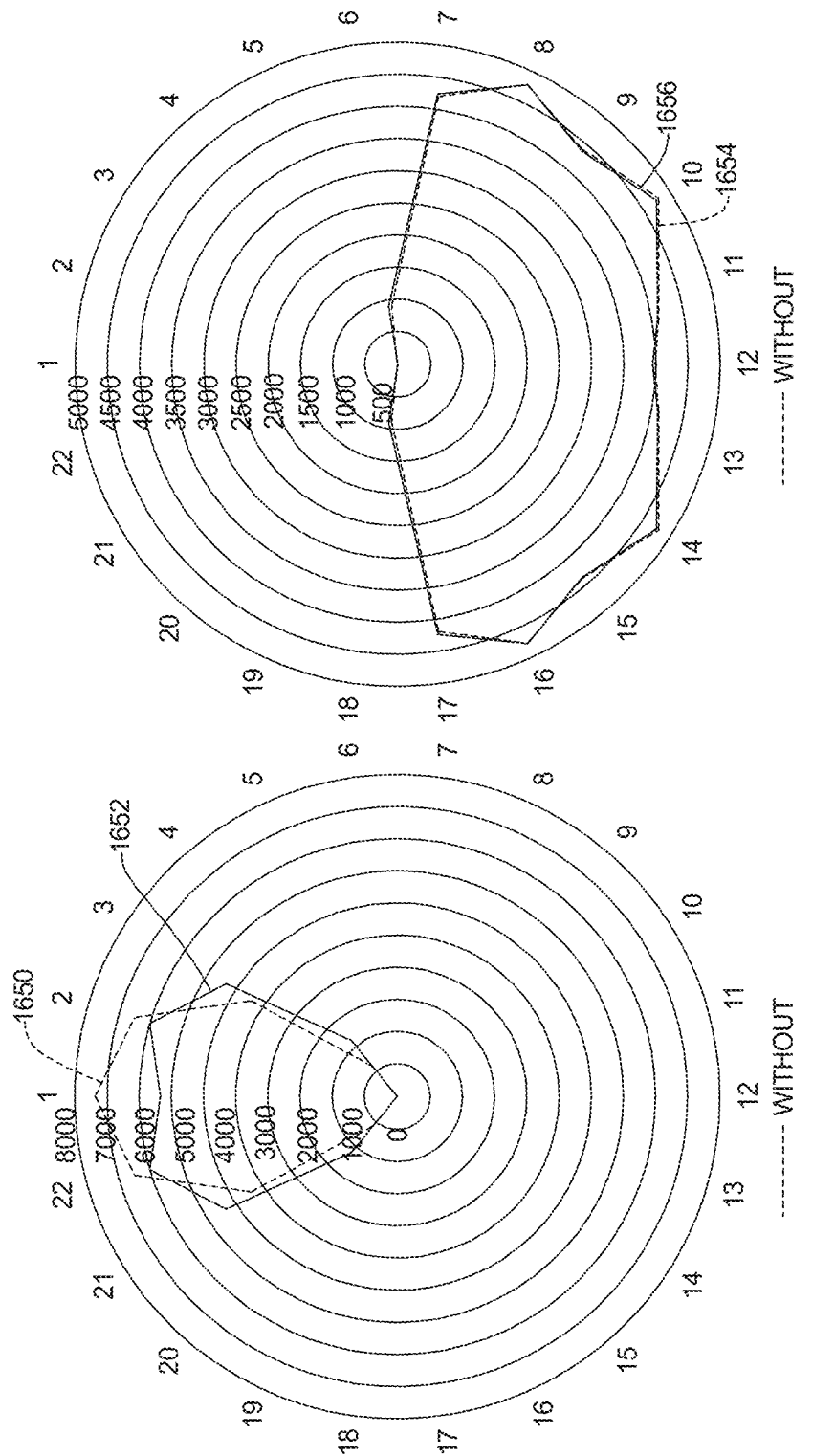

SYSTEM AND METHOD FOR CONTROLLING OPERATION OF A TWO-STROKE ENGINE HAVING A TURBOCHARGER

CROSS-REFERENCE TO RELATED APPLICATIONS

This application is a divisional of U.S. application Ser. No. 17/831,828, filed Jun. 3, 2022, which is a divisional of U.S. application Ser. No. 17/145,298, filed Jan. 9, 2021, which claims priority to non-provisional application of 62/960,414, filed Jan. 13, 2020. This application incorporates the disclosures of U.S. application Ser. No. 16/691,995 filed Nov. 22, 2019, U.S. application Ser. No. 16/696,198 filed Nov. 26, 2019, U.S. application Ser. No. 16/691,097 filed Nov. 21, 2019, U.S. application Ser. No. 16/692,336 filed Nov. 22, 2019, U.S. application Ser. No. 16/692,470 filed Nov. 22, 2019, U.S. application Ser. No. 16/692,628 filed Nov. 22, 2019, U.S. application Ser. No. 16/692,724 filed Nov. 22, 2019, U.S. application Ser. No. 16/692,795 filed Nov. 22, 2019, and U.S. Provisional Application No. 62/690,388 filed on Jan. 13, 2020. The entire disclosures of the above applications are incorporated herein by reference.

FIELD

The present disclosure relates to a vehicle engine and, more particularly, to a method of operating the engine with an electronically controlled exhaust valve and turbocharger.

BACKGROUND

This section provides background information related to the present disclosure which is not necessarily prior art.

A vehicle, such as a snowmobile, generally includes an engine assembly. The engine assembly is operated with the use of fuel to generate power to drive the vehicle. The power to drive a snowmobile is generally generated by a combustion engine that drives pistons and a connected crankshaft. Two-stroke snowmobile engines are highly tuned, and high specific power output engines that operate under a wide variety of conditions.

Vehicle manufacturers are continually seeking ways to improve the power output for engines. Turbochargers have been used together with two-stroke engines to provide increased power output. However, improving the packaging and performance of a turbocharged two-stroke engine is desirable.

SUMMARY

This section provides a general summary of the disclosures, and is not a comprehensive disclosure of its full scope or all of its features.

In one aspect of the disclosure a system for controlling operation of a two-stroke engine having a turbocharger includes the two-stroke engine comprising an electronically controlled exhaust valve. A throttle position sensor generates a throttle position signal corresponding to a position of a throttle plate of a throttle. A boost box is coupled to the two-stroke engine. A boost box pressure sensor is coupled to the boost box and generates a boost box pressure signal corresponding to a pressure within the boost box. A controller is coupled to the boost box pressure signal controlling a position of the electronically controlled exhaust valve in response to the boost box pressure signal and the throttle position signal.

In another aspect of the disclosure, a method or controlling operation of a two-stroke engine having a turbocharger includes generating a throttle position signal corresponding to a position of a throttle plate from a throttle position sensor, generating a boost box pressure signal corresponding to a pressure within a boost box and controlling a position of an electronically controlled exhaust valve in response to the boost box pressure signal and the throttle position signal.

In another aspect of the disclosure, a system for controlling an engine having a turbocharger includes a boost pressure sensor generating a boost pressure signal, a barometric pressure sensor generating a barometric pressure signal and a controller coupled to the boost pressure sensor and the barometric pressure sensor. The controller is programmed to determine an offset between the boost pressure signal and the barometric pressure signal, when the offset is outside a tolerance range, display an indicator.

In still another aspect of the disclosure, a method for controlling an engine having a turbocharger includes generating a boost pressure signal, generating a barometric pressure signal and a controller programmed to determine an offset between the boost pressure signal and the barometric pressure signal, display an indicator when the offset is outside a tolerance range.

In another aspect of the disclosure, a method includes determining an exhaust bypass valve position from an exhaust bypass valve position signal and controlling a fuel and ignition system based on the exhaust bypass valve position signal.

Further areas of applicability will become apparent from the description provided herein. The description and specific examples in this summary are intended for purposes of illustration only and are not intended to limit the scope of the present disclosure.

DRAWINGS

FIG. 1 is a perspective view of a snowmobile.
FIG. 2 is an exploded view of the snowmobile of FIG. 1.
FIGS. 2A and 2B are enlarged exploded views of FIG. 2.
FIG. 3 is a block diagram of the engine of FIG. 2.
FIG. 4 is an exploded view of the engine of FIG. 3.
FIG. 5A is a perspective view of a turbocharger according to the present disclosure.
FIG. 5B is a side view of the turbocharger FIG. 5A.
FIG. 5C is a cutaway view of the turbine housing of the turbocharger of FIG. 5A.
FIG. 5D is a partial cross-sectional view of the turbine housing of the turbocharger of FIG. 5A.
FIG. 5E is a cutaway view of the turbocharger having the diverter valve in a position closing off the first scroll.
FIG. 5F is a partial cutaway view of the turbocharger having the diverter valve in a neutral position.
FIG. 5G is a partial cutaway view of the turbocharger having the diverter valve in a position closing off the second scroll.
FIG. 5H is a partial cutaway view of an alternate valve for controlling flow to the scrolls in a partially open position.
FIG. 5I is a partial cutaway view of the valve in FIG. 5H in a closed position.
FIG. 5J is a partial cutaway view of another alternate valve for controlling flow to one of the scrolls in a closed position.

FIG. 6A is a cross-sectional view of an exhaust gas bypass valve.

FIG. 6B is the exhaust bypass valve of FIG. 6A in a first open position.

FIG. 8B is a rear side of the boost box of FIG. 8A.

FIG. 8C is a left side view of the boost box of FIG. 8A.

FIG. 8D is a front side view of the boost box of FIG. 8A.

FIG. 8E is a right side view of the boost box of FIG. 8A.

FIG. 8G is a side view of an engine compartment having the boost box oriented so that the one-way valve is located rearwardly.

FIG. 9C is a plot of boost error versus time for a plurality of signals used for updating the exhaust gas bypass valve position.

FIG. 11A is a method for controlling the exhaust valve of the engine.

FIG. 11B is a diagrammatic representation of the gains for the wastegate position.

FIG. 16C is a force diagram of connecting rods with and without the inertia reducing holes.

FIG. 16D is an inertia diagram of the connecting rods with and without the inertia reducing holes.

DETAILED DESCRIPTION

Examples will now be described more fully with reference to the accompanying drawings. Although the following description includes several examples of a snowmobile application, it is understood that the features herein may be applied to any appropriate vehicle, such as motorcycles, all-terrain vehicles, utility vehicles, moped, scooters, etc. The examples disclosed below are not intended to be exhaustive or to limit the disclosure to the precise forms disclosed in the following detailed description. Rather, the examples are chosen and described so that others skilled in the art may utilize their teachings. The signals set forth below refer to electromagnetic signals that communicate data.

Figure 1:
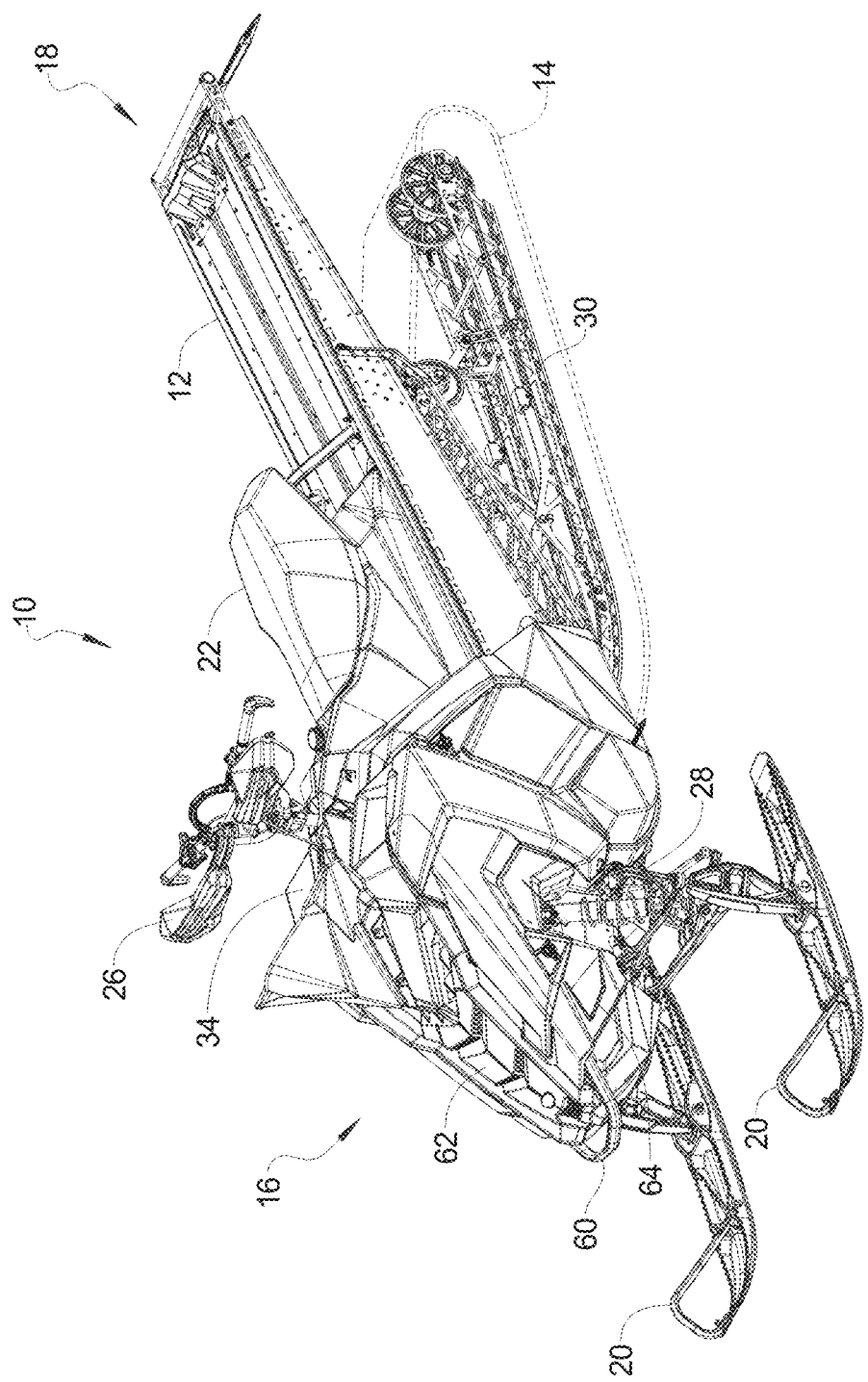
Figure 2:
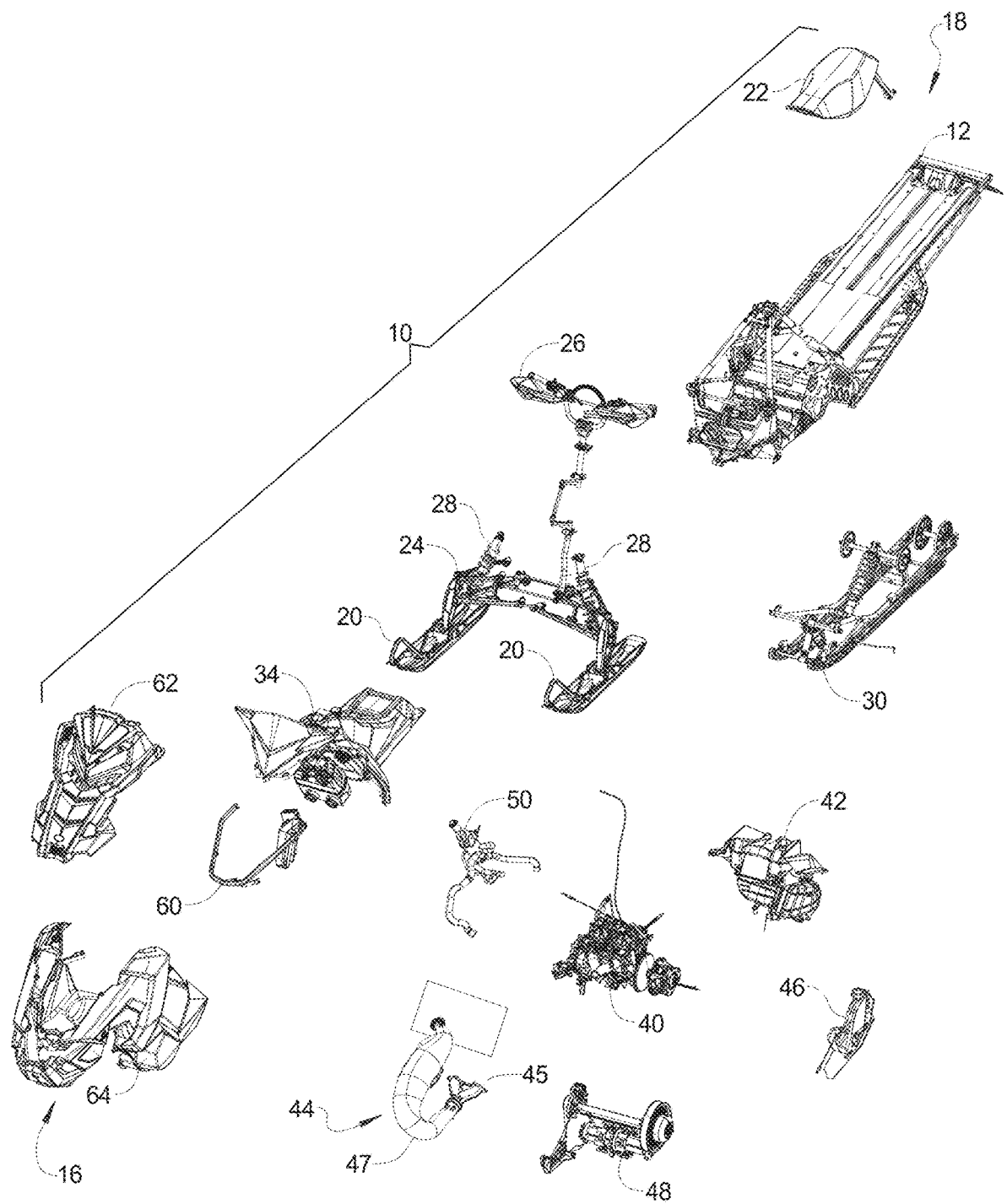
Figure 2A:
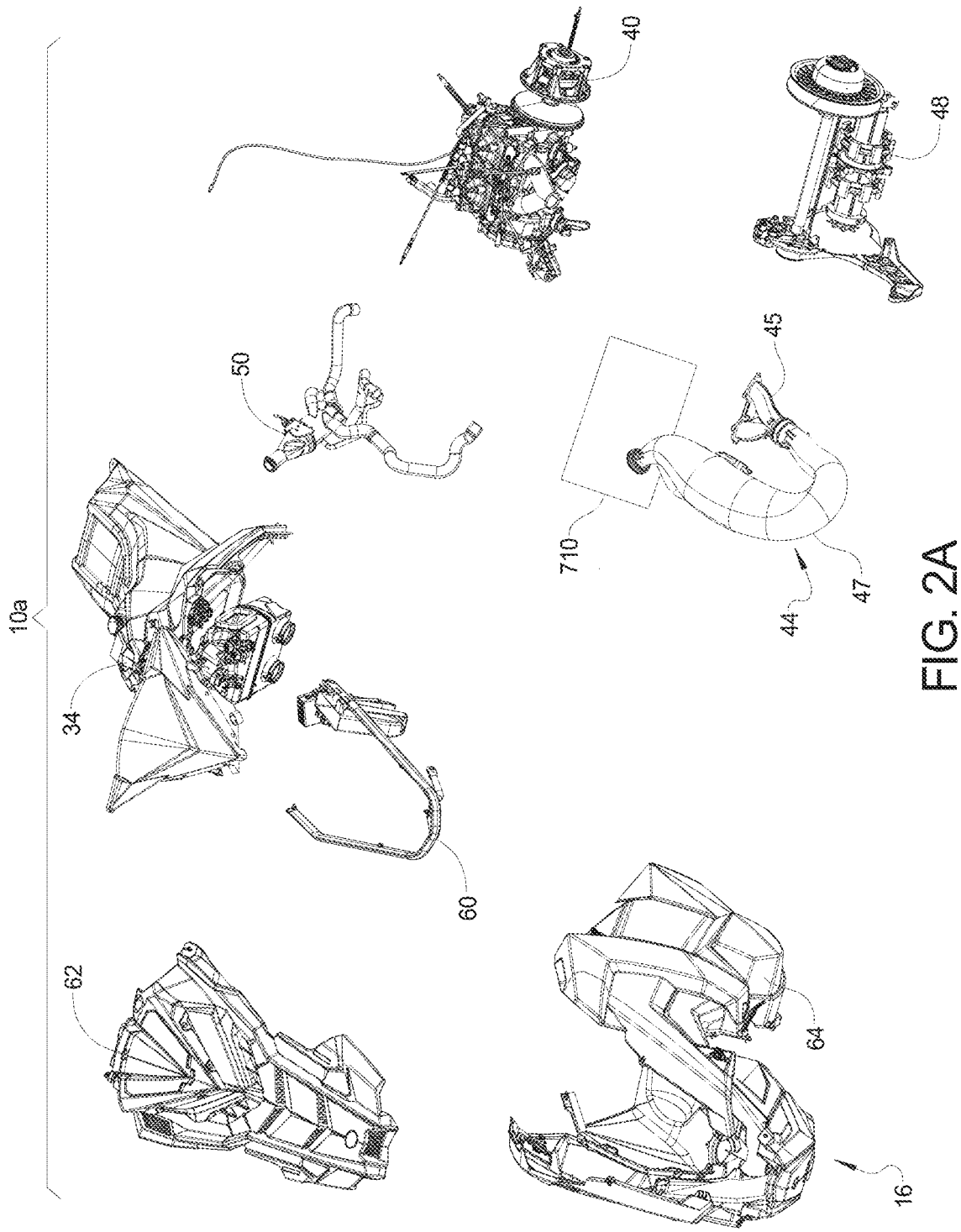
Figure 2B:
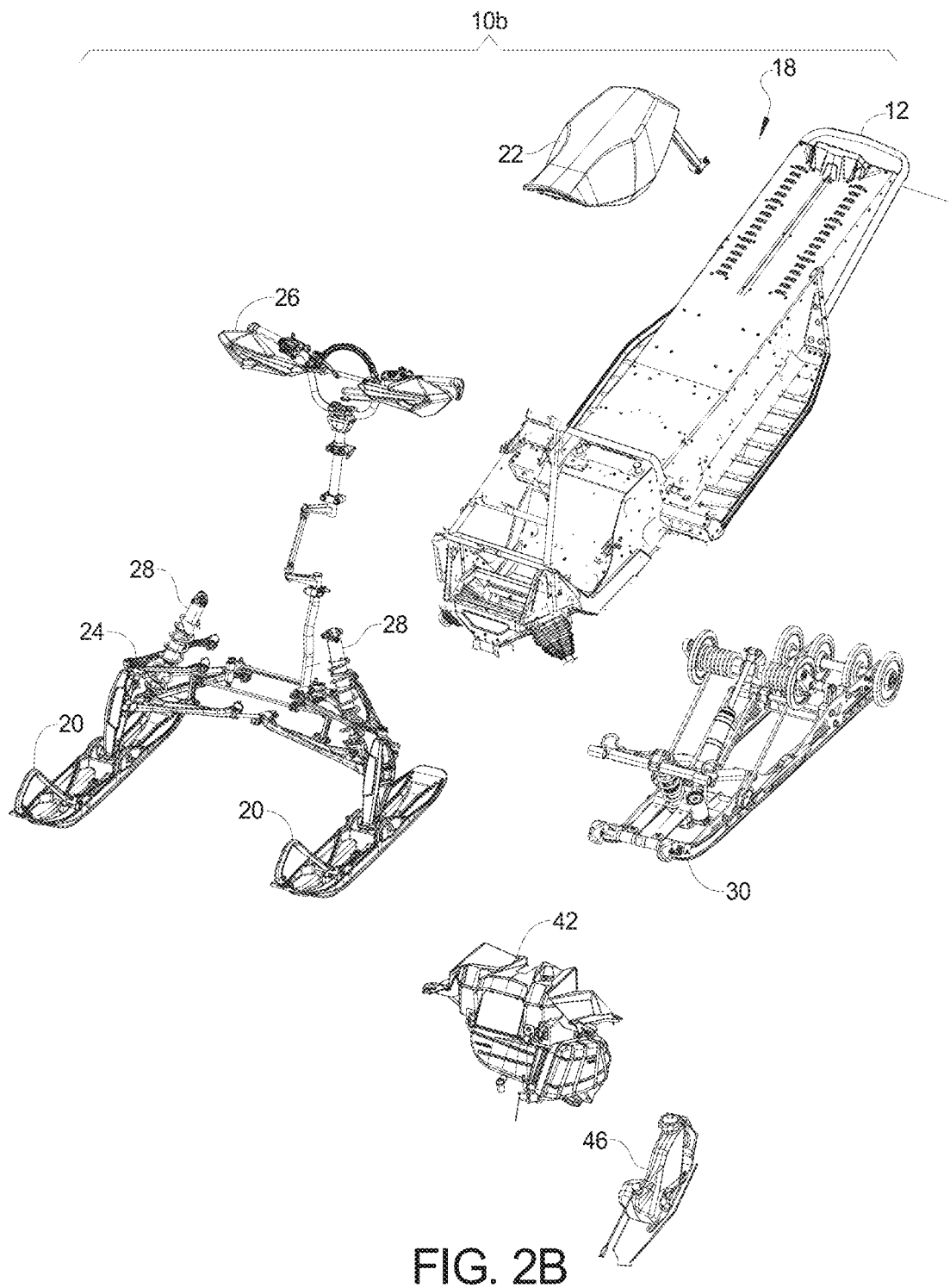

Referring now to FIGS. 1 and 2, one example of an exemplary snowmobile 10 is shown. Snowmobile 10 includes a chassis 12, an endless belt assembly 14, and a pair of front skis 20. Snowmobile 10 also includes a front-end 16 and a rear-end 18.

The snowmobile 10 also includes a seat assembly 22 that is coupled to the chassis assembly 12. A front suspension assembly 24 is also coupled to the chassis assembly 12. The front suspension assembly 24 may include handlebars 26 for steering, shock absorbers 28 and the skis 20. A rear suspension assembly 30 is also coupled to the chassis assembly 12. The rear suspension assembly 30 may be used to support the endless belt 14 for propelling the vehicle. An electrical console assembly 34 is also coupled to the chassis assembly 12. The electrical console assembly 34 may include various components for displaying engine conditions (i.e., gauges) and for electrically controlling the snowmobile 10.

The snowmobile 10 also includes an engine assembly 40. The engine assembly 40 is coupled to an intake assembly 42 and an exhaust assembly 44. The intake assembly 42 is used for providing fuel and air into the engine assembly 40 for the combustion process. Exhaust gas leaves the engine assembly 40 through the exhaust assembly 44. The exhaust assembly 44 includes the exhaust manifold 45 and tuned pipe 47. An oil tank assembly 46 is used for providing oil to the engine for lubrication where it is mixed directly with fuel. In other systems oil and fuel may be mixed in the intake assembly. A drivetrain assembly 48 is used for converting the rotating crankshaft assembly from the engine assembly 40 into a potential force to use the endless belt 14 and thus the snowmobile 10. The engine assembly 40 is also coupled to a cooling assembly 50.

The chassis assembly 12 may also include a bumper assembly 60, a hood assembly 62 and a nose pan assembly 64. The hood assembly 62 is movable to allow access to the engine assembly 40 and its associated components.

Figure 3:
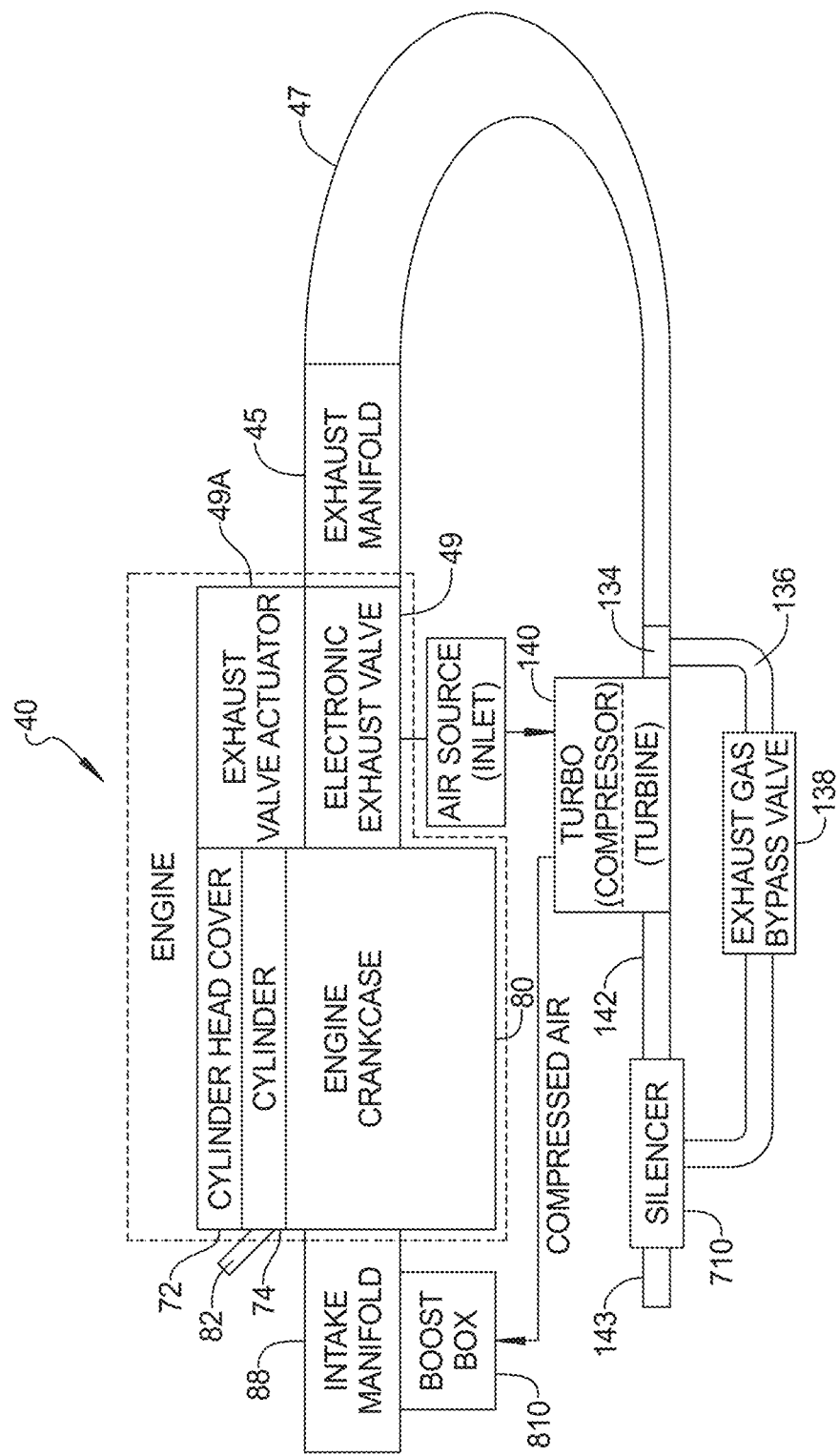
Figure 4:
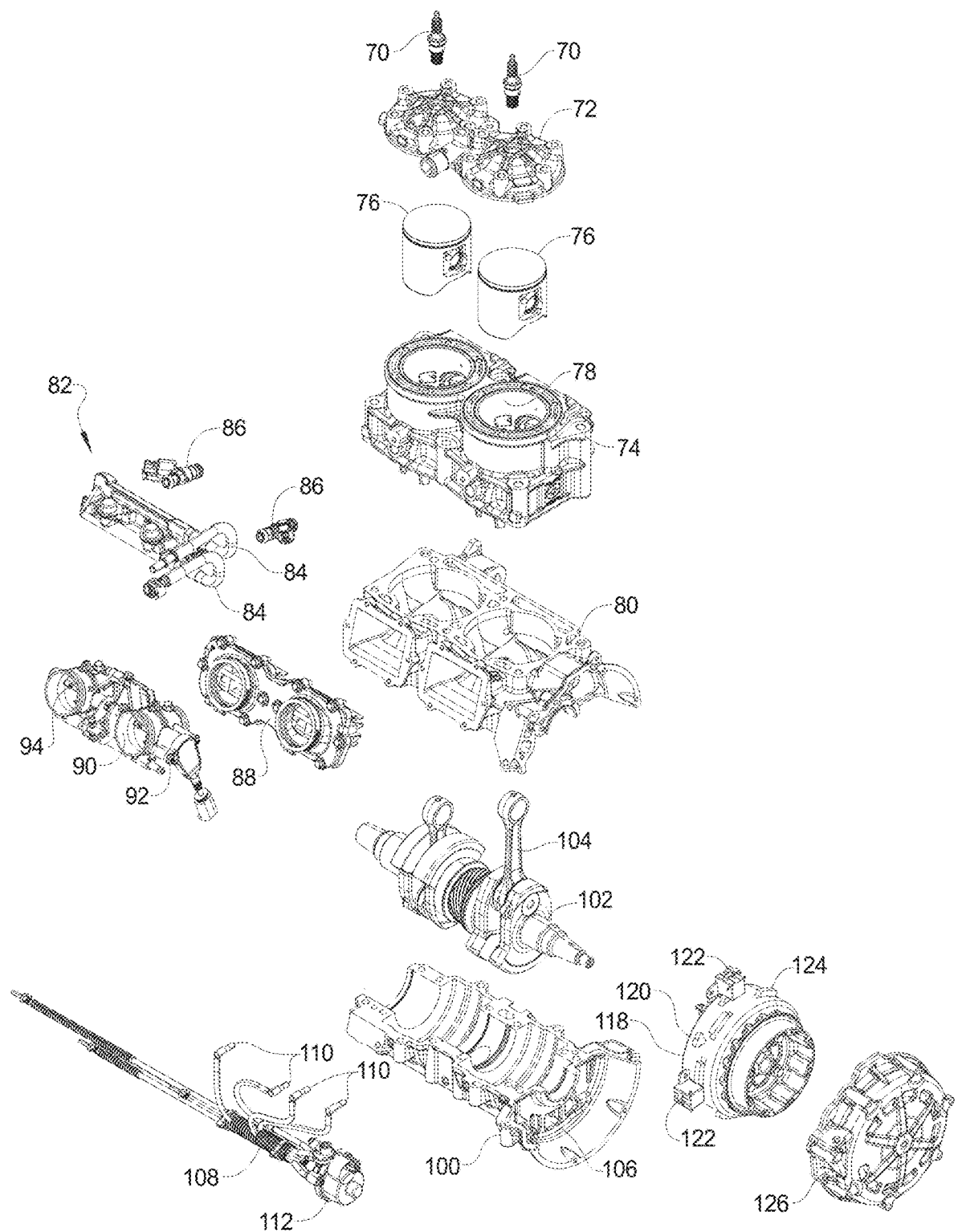

Referring now to FIGS. 3 and 4, the engine assembly 40 is illustrated in further detail. The engine assembly 40 is a two-stroke engine that includes the exhaust assembly 44 that includes an exhaust manifold 45, tuned pipe 47, an exhaust valve 49, an exhaust port actuator 49A and exhaust silencer 710. The exhaust valve 49 may be electronically controlled to achieve various states of opening and closing.

The engine assembly 40 may include spark plugs 70 which are coupled to a one-piece cylinder head cover 72. The cylinder head cover 72 is coupled to the cylinder 74 with twelve bolts which is used for housing the pistons 76 to form a combustion chamber 78 therein. The cylinder 74 is mounted to the engine upper crankcase 80.

The fuel and ignition system 82 that forms part of the engine assembly 40, includes fuel lines 84 and fuel injectors 86 and the controller to determine fuel quantities and ignition timing. The fuel lines 84 provide fuel to the fuel injectors 86 which inject fuel, in this case, into a port in the cylinder adjacent to the pistons 76. In other cases, an injection may take place adjacent to the piston, into a boost box (detailed below) or into the throttle body. An intake manifold 88 is coupled to the engine upper crankcase 80. The intake manifold 88 is in fluidic communication with the throttle body 90. Air for the combustion processes is admitted into the engine through the throttle body 90 which may be controlled directly through the use of an accelerator pedal or hand operated lever or switch. A throttle position sensor 92 is coupled to the throttle to provide a throttle position signal corresponding to the position of the throttle plate 94 to an engine controller discussed further herein.

The engine upper crankcase 80 is coupled to lower crankcase 100 and forms a cavity for housing the crankshaft 102. The crankshaft 102 has connecting rods 104 which are ultimately coupled to the pistons 76. The movement of the pistons 76 within the combustion chamber 78 causes a rotational movement at the crankshaft 102 by way of the connecting rods 104. The crankcase may have openings or vents 106 therethrough.

The system is lubricated using oil lines 108 which are coupled to the oil injectors 110 and an oil pump 112.

The crankshaft 102 is coupled to a generator flywheel 118 and having a stator 120 therein. The flywheel 118 has crankshaft position sensors 122 that aid in determining the positioning of the crankshaft 102. The crankshaft position sensors 122 are aligned with the teeth 124 and are used when starting the engine, as well as being used to time the operation of the injection of fuel during the combustion process. A stator cover 126 covers the stator 120 and flywheel 118.

Discussed below are various features of the engine assembly 40 used in the snowmobile 10. Each of the features relate to the noted section headings set forth below. It should be noted that each of these features can be employed either individually or in any combination with the engine assembly 40. Moreover, the features discussed below will utilize the reference numerals identified above, when appropriate, or other corresponding reference numerals as needed. Again, as noted above, while the engine assembly 40 is a two-stroke engine that can be used with the snowmobile 10, the engine assembly 40 can be used with any appropriate vehicles and the features discussed below may be applied to four-stroke engine assemblies as well.

The engine assembly 40 also includes an exhaust manifold 45 that directs the exhaust gases from the engine. The exhaust manifold 45 is in fluid communication with a tuned pipe 47. The tuned pipe 47 is specifically shaped to improve the performance and provide the desired feedback to the engine assembly 40. The tuned pipe 47 is in communication with a stinger 134. The tuned pipe 47 has a bypass pipe 136 coupled thereto. The bypass pipe 136 has an exhaust gas bypass valve 138 used for bypassing some or all of the exhaust gases from being directed to a turbocharger 140. Details of the turbocharger 140 are set forth in the following Figures.

Referring now to FIGS. 5A-5G, the turbocharger 140 includes a turbine portion 510 and a pump or compressor portion 512. The turbine portion 510 and the compressor portion 512 have a common shaft 521 that extends there between. That is, the rotational movement within the turbine portion 510 caused from the exhaust gases rotate a turbine wheel 520 which in turn rotates the shaft 521 which, in turn, rotates a compressor wheel 519. The compressor portion 512 includes an inlet 514 and an outlet 516. Movement of the compressor wheel 519 causes inlet air from the inlet 514 to be pressurized and output through the outlet 516 of the housing 518.

The turbine portion 510 includes a turbine wheel 520 with housing 522. The housing 522 includes a turbine inlet 524 and a turbine outlet 526. The inlet 524 receives exhaust gas through the tuned pipe 47 and the stinger 134 as illustrated above. The exhaust gases enter the inlet 524 and are divided between a first scroll 528 and a second scroll 530. Of course, more than two scrolls may be implemented in a system. The scrolls 528, 530 may also be referred to as a volute. Essentially the first scroll 528 and the second scroll 530 start off with a wide cross-sectional area and taper to a smaller cross-sectional area near the turbine wheel. The reduction in cross-sectional area increases the velocity of the exhaust gases which in turn increases the speed of the turbine wheel 520. Ultimately, the rotation of the turbine wheel 520 turns the compressor wheel 519 within the compressor portion 512 by way of a common shaft 521. The size of the first scroll 528 and the second scroll 530 may be different. The overall area to radius (A/R) ratio of the scrolls may be different. The first scroll 528 has a first end 528A and a second end 528B and the second scroll has a second first end 530A and a second end 530B. The first ends 528A, 530A are adjacent to the turbine inlet 524. The second ends 528B, 530B are adjacent to the turbine wheel 520 within the housing 522. The volume of the first scroll 528 and second scroll 530 may be different. The cross-sectional opening adjacent to the turbine wheel 520 may be different between the scrolls.

The first scroll 528 and the second scroll 530 are separated by a separation wall 532. The separation wall 532 separates the first scroll 528 from the second scroll 530. The separation wall 532 may extend from the first end 528A of the first scroll 528 and the first end 530A of the second scroll 530 to the second end 528B, 530B of the respective scrolls.

The turbine portion 510 includes an exhaust gas diverter valve 540 mounted adjacent to the separation wall 532. The exhaust gas diverter valve 540 is used to selectively partially or fully close off either the first scroll 528 or the second scroll 530. A valve seat 542A is located adjacent to the first scroll 528. A second valve seat 542B is located adjacent to the second scroll 530. Either one of the valve seats 542A, 542B receive the exhaust gas diverter valve 540 when the exhaust gas diverter valve 540 is in a completely closed position. The valve seats 542A, 542B may be recesses or grooves that are formed within the housing 522. The valve seats 542A, 542B form a surface that receives an edge 541 of the exhaust gas diverter valve 540 so that when exhaust gases push the exhaust gas diverter valve 540 into the scroll outer wall, the valve seats 542A, 542B provide a counter force. The edge 541 is the end of the valve 540 opposite a pivot pin 544. The valve seats 542A, 542B may be circumferentially formed within each of the first scroll 528 and the second scroll 530. The seal between the valve 540 may be on the edge 541 or on the surface of the valve 540 on each side of the edges 541.

Figure 5A:
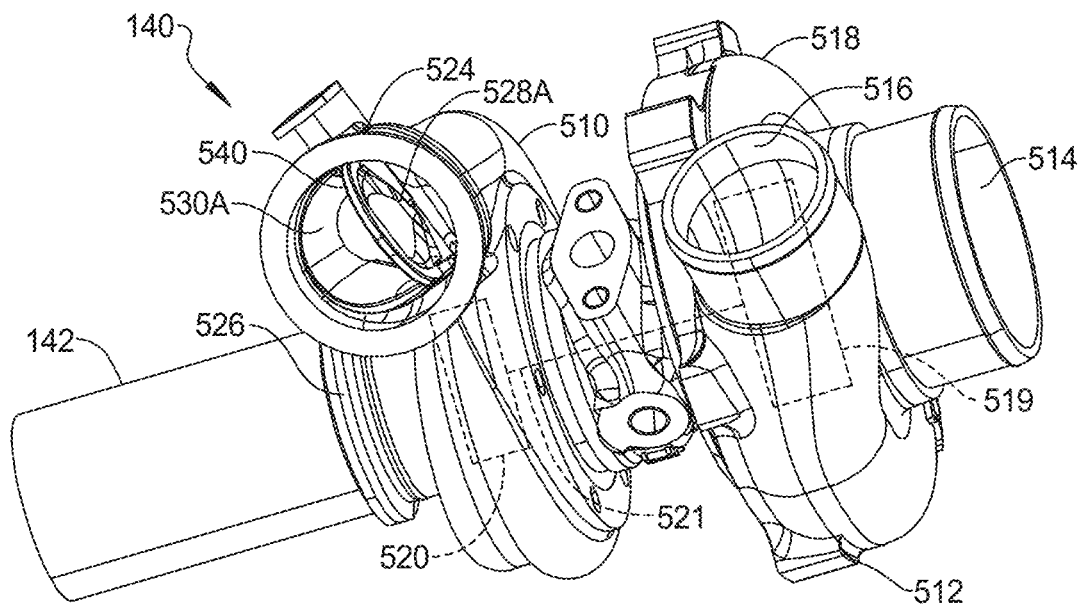
FIG. 5K is a partial cutaway view of the valve in FIG. 5J in a partially open position.
Figure 5B:
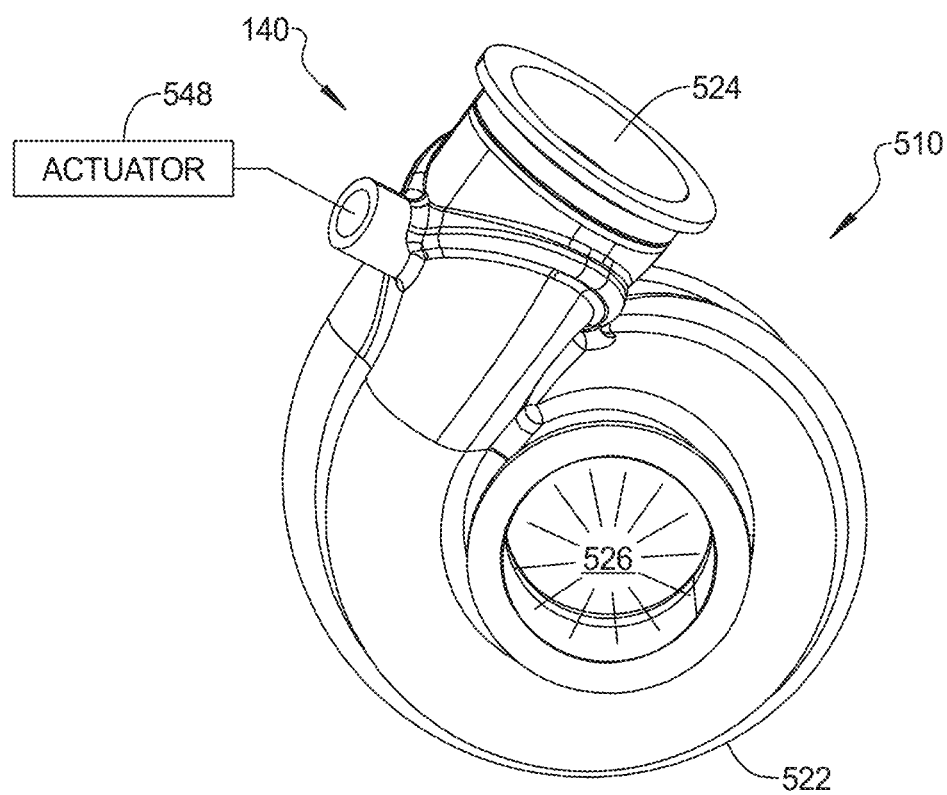
Figure 5C:
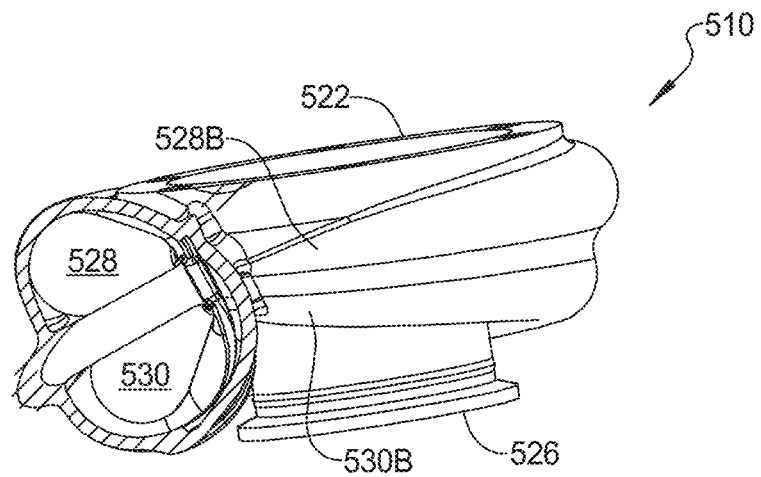
Figure 5D:
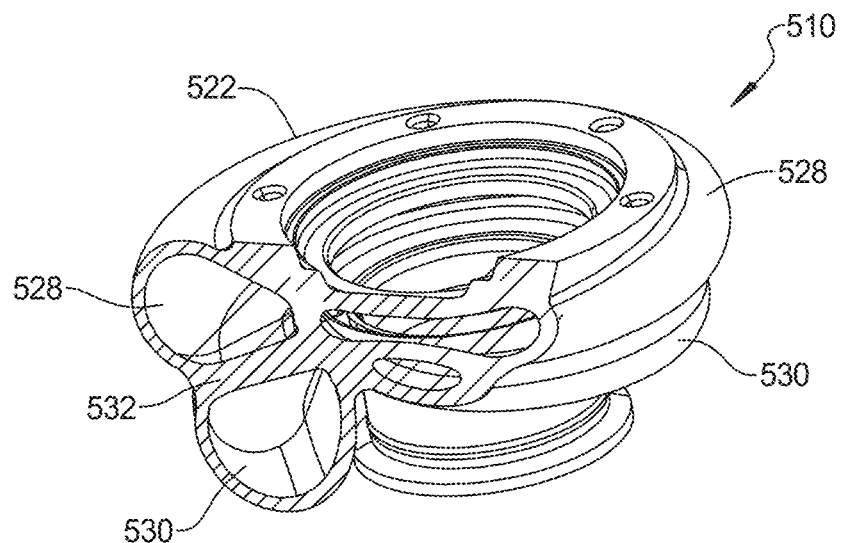
Figure 5E:
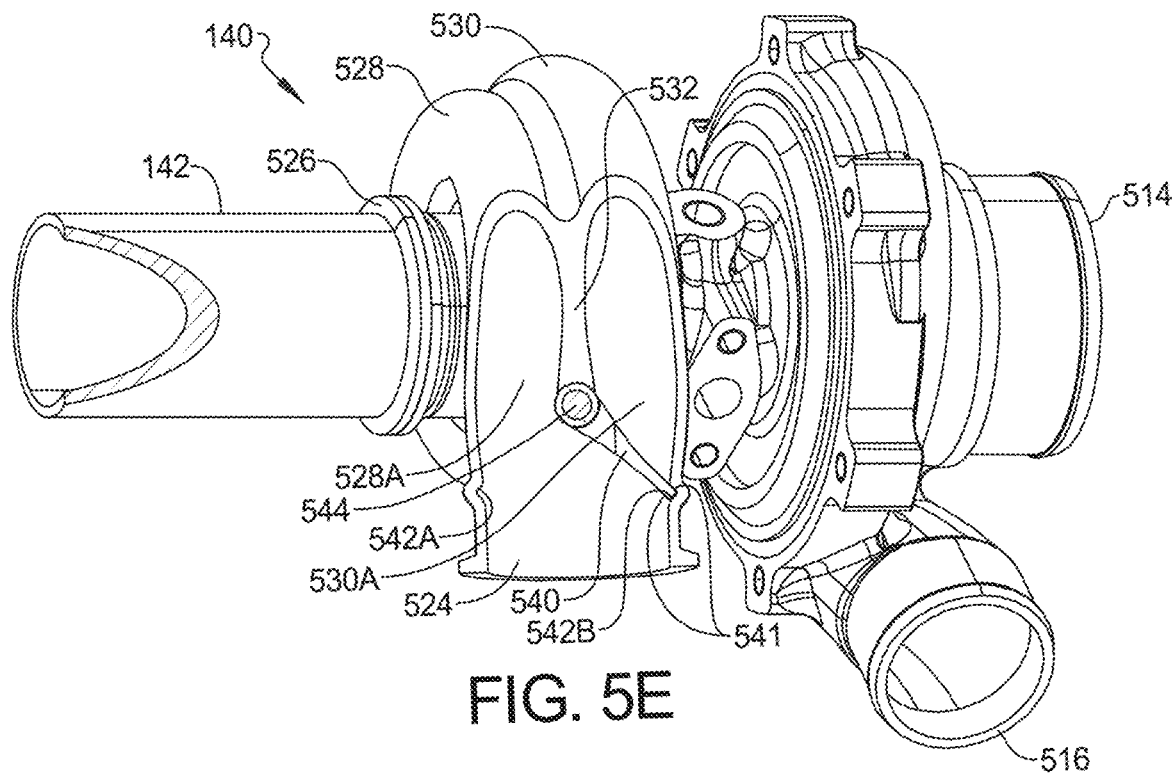
Figure 5F:
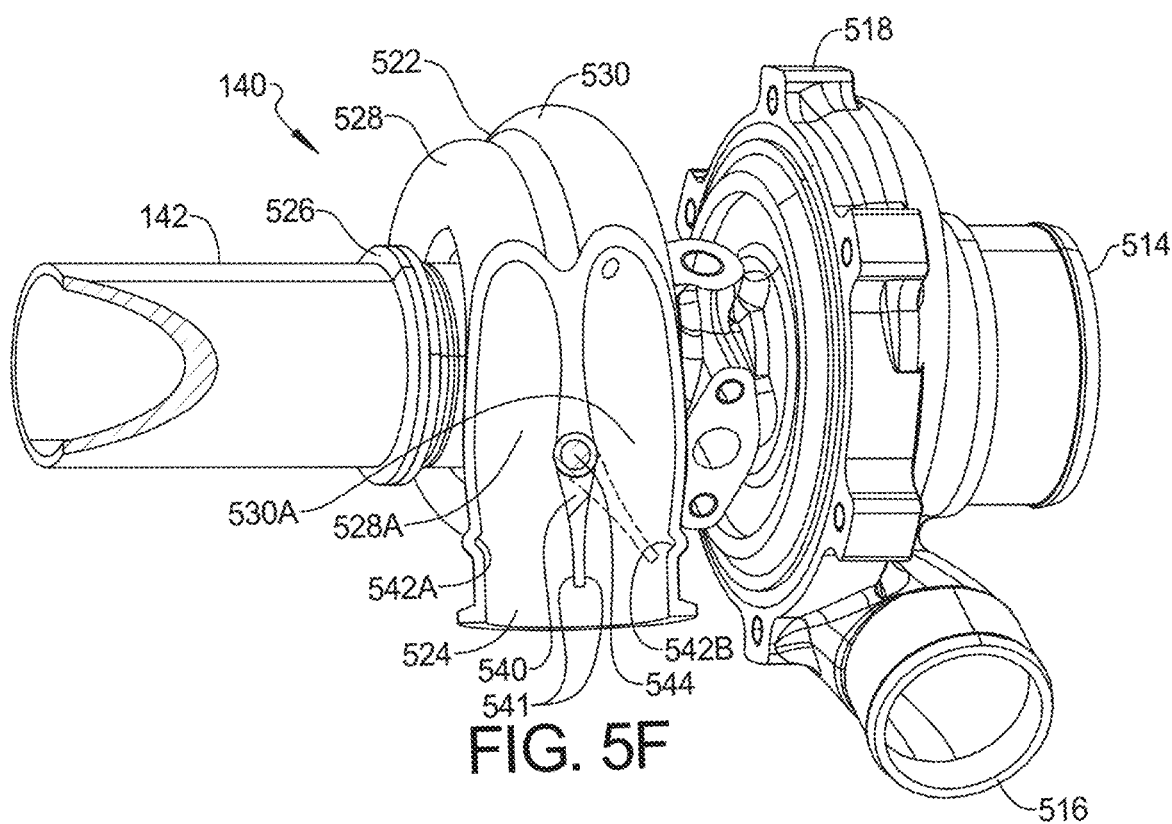
Figure 5G:
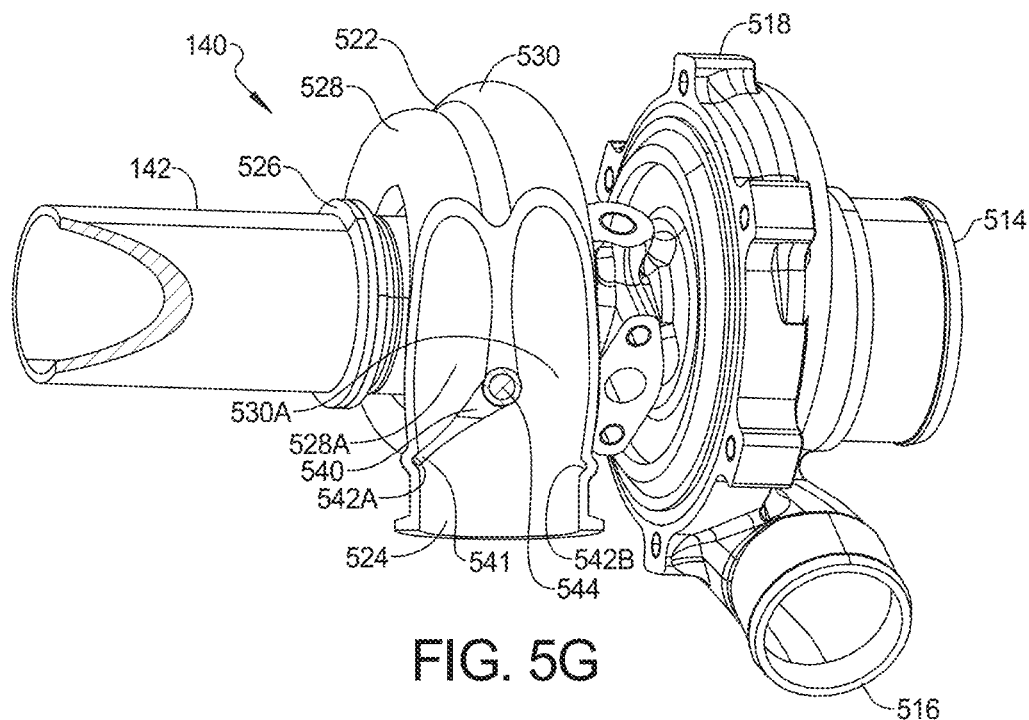

The pivot pin 544 which extends across the turbine inlet 524 to selectively separate or close off the first scroll 528 or the second scroll 530. A partial closing of either the first scroll 528 or the second scroll 530 may also be performed by the exhaust gas diverter valve 540. The exhaust gas diverter valve 540 pivots about the pivot pin 544. As is best shown in FIG. 5B, an actuator 548 such as a motor or a hydraulic actuator may be coupled to the exhaust gas diverter valve 540. Other types of actuators include pneumatic actuator. The actuator 548 moves the exhaust gas diverter valve to the desired position in response to various inputs as will be described in more detail below. That is, there may be conditions where both scrolls may be fully opened, or one or the other scroll may be opened, at least partially. The opening and closing of the valve may be used to control the pressure in the tuned pipe. Further, one scroll may be partially closed using the exhaust gas diverter valve 540 while one scroll may be fully open as indicated by the dotted lines. That is, in FIG. 5E the scroll 530 is completely closed by the edge 541 of the exhaust gas diverter valve 540 being received within the valve seat 542B. In FIG. 5F the exhaust gas diverter valve 540 is in a middle or neutral position in which the first scroll 528 and the second scroll 530 are fully opened. That is, the valve is in a fully opened position and is coincident to or parallel with the separation wall 532. In FIG. 5G the edge 541 of the exhaust gas diverter valve 540 is received within and rests against the valve seat 542A to fully close the first scroll 528.

Figure 5H:
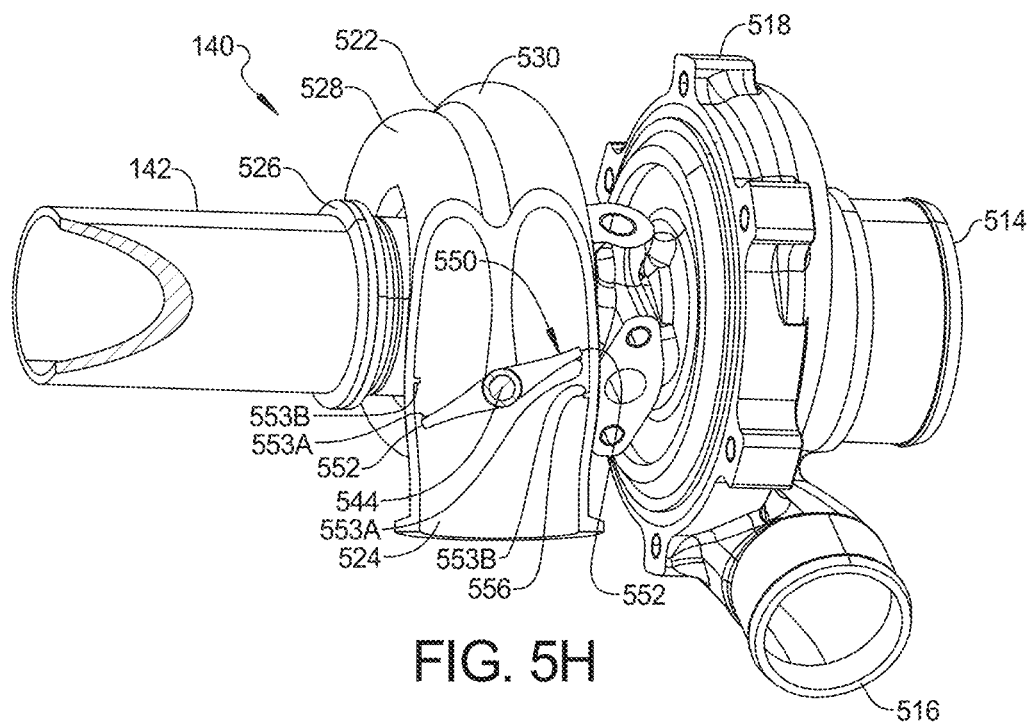
Figure 5I:
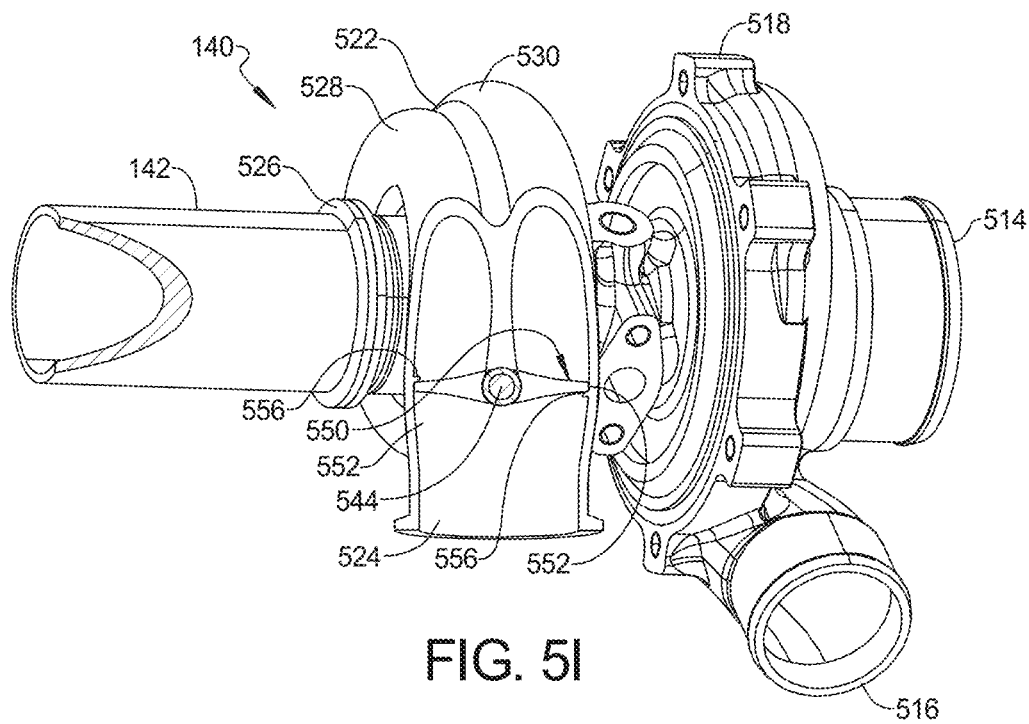

Referring now to FIGS. 5H and 5I, a butterfly type valve 550 may be used in place of the diverter valve 540. The butterfly valve 550 pivots about pivot pin 544. The edge 552 of the valve 550 rests against the valve seat 556 in a closed position (FIG. 5I). The closure may result in a seal or a near closure if a protrusion 553A is on the edge 552 of valve or bump 553B on the seat 556. A dotted protrusion 553B is shown on the edges 552 and valve seat 556. The valve 550 may be in communication with an actuator and motor (or hydraulic actuator or a pneumatic actuator) to move the valve 550 into the desired position. In this manner the valve 550 is more balanced with respect to exhaust gas acting on the valve blade than the diverter valve 540.

Figure 5J:
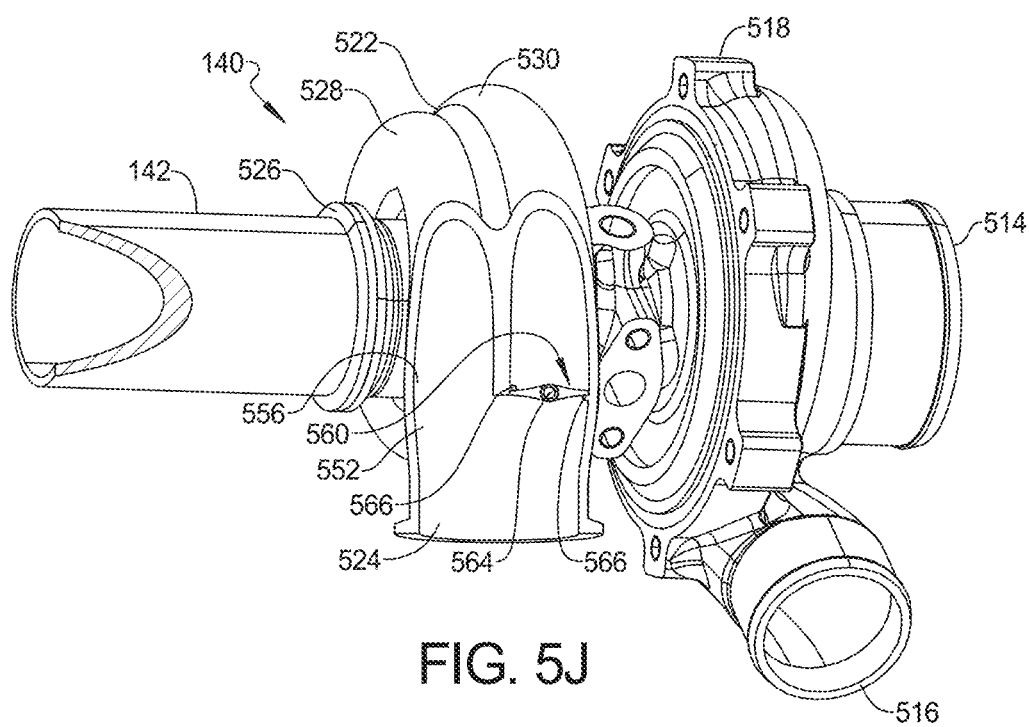

Referring now to FIGS. 5J and 5K, alternate configuration for a butterfly type valve 560 may be used in place of the diverter valves 540 and 550. The butterfly valve 560 is disposed within one of the scrolls. In this example scroll 530 has the first butterfly type valve 560. The butterfly valve 560 pivots about pivot pin 564. The edge 562 of the valve 560 rests against the valve seat 566 in a closed position (FIG. 5J). The valve 560 may be in communication with an actuator and motor (or hydraulic actuator or a pneumatic actuator) to move the valve 560 into the desired position. In this manner, the valve 560 is more balanced with respect to exhaust gas acting on the valve blade than the diverter valve 540.

In any of the examples in FIGS. 5A-5K, the valve 550 may also be made oval. The closed position may be less than 90 degrees. The closure may not be air tight intentionally. In addition, any of FIGS. 5A-5K may have the protrusions 553A and/or 553B.

Referring now to FIGS. 6A-6F, an exhaust gas bypass valve 138 is set forth. By way of example, for a turbocharged engine the exhaust gas bypass valve 138 may be implemented in a wastegate or diverter valve. Some implementations do not have a turbocharger but an exhaust bypass valve or wastegate is used to direct exhaust gasses from the tuned pipe. The exhaust gas bypass valve 138 may be configured in the bypass pipe 136 that connects the exhaust gas from the exhaust manifold 45 and the tuned pipe 47 to an exhaust pipe 142 coupled to the outlet of the turbine portion of the turbocharger 140. Of course, as detailed below, the exhaust gas bypass valve 138 may be used in various positions within the exhaust assembly 44.

The exhaust gas bypass valve 138 has an exhaust gas bypass valve housing 610. The exhaust gas bypass valve housing 610 may have a first flange 612A and a second flange 612B. The flanges 612A, 612B are used for coupling the exhaust gas bypass valve to the respective portions of the bypass pipe 136A, 136B. Of course, direct welding to the tuned pipe or bypass piping may be performed. The housing 610 has an outer wall 611 that is generally cylindrical in shape and has a longitudinal axis 613 which also corresponds to the general direction of flow through the exhaust gas bypass valve housing 610. The outer wall 611 has a thickness T1.

The housing 610 includes a valve plate or valve member 614 that rotates about a rotation axis 616. The rotation axis 616 coincides with an axle 618 that is coupled to the housing 610 so that the valve member 614 rotates thereabout in a direction illustrated by the arrow 620. The valve member 614 is balanced to minimize the operating torque required to open/close the valve member 614. The butterfly arrangement has exhaust gas working on both sides of the valve member 614, which effectively causes the forces to counteract and 'cancel' each other that results in a significantly reduced operating torque. Consequently, the valve member 614 may be sized as wastegate as big as necessary without significantly increasing the operating torque to actuate it. Advantageously a smaller (and likely less expensive) actuator may be utilized.

The housing 610 may include a first valve seat 622 and a second valve seat 624. The seats 622 and 624 are integrally formed with the housing. As is illustrated, the valve seats 622 and 624 are thicker portions of the housing. The valve seats 622, 624 may have a thickness T2 greater than T1. Of course, casting thicknesses may change such as by providing pockets of reduced thickness for weight saving purposes. The valves seats 622, 624 are circumferential about or within the housing 610. However, each of the valve seats 622 and 624 extends about half way around the interior of the housing to accommodate the axle 618.

The valve seats 622, 624 have opposing surfaces 626, 628 that have a planar surface that are parallel to each other. The surfaces 626, 628 contact opposite sides of the valve member 614 in the closed position. This allows the valve member 614 to rest against each valve seat 622, 624 to provide a seal in the closed position. The exhaust gas bypass valve 138 and the valve member 614 therein move in response to movement of an actuator 630. The actuator 630 rotates the valve member 614 about the axis 616 to provide the valve member 614 in an open and a closed position. Of course, various positions between open and closed are available by positioning the actuator 630. As will be further described below, the actuator 630 may actuate the valve member 614, exhaust gas diverter valve 540 and valves 550, 560 as described above. As mention above the surface area of the valve member 614 is the same above and below the axis 616 so that the operating toque is minimized due to the exhaust gas load being distributed evenly on both sides of the axis 616.

The effective cross-sectional area of opening, passage or port P1 available to the exhaust gasses flowing through the interior of the exhaust gas bypass valve is limited by the distance T2 and the valve member 614 and axle 618. After experimentation, it was found that the effective cross-sectional area of the exhaust gas bypass valve 138 may be formed as a function of an exducer of the turbine wheel 520 as is described in greater detail below.

To vary the effective area, the valve member 614 of the exhaust gas bypass valve 138 has different angles $\alpha_1$-$\alpha_4$ illustrated in FIGS. 6B to 6E respectively. The angles $\alpha_1$-$\alpha_4$ progressively increase. The angular opening corresponds directly with the effective area of the exhaust gas bypass valve 138. The angular opening of the exhaust gas bypass valve 138 may be controlled in various ways or in response to various conditions. Although specific angles are illustrated, the exhaust gas bypass valve 138 is infinitely variable between the fully closed position of FIG. 6A and the fully open position of FIG. 6E.

Figure 6C:
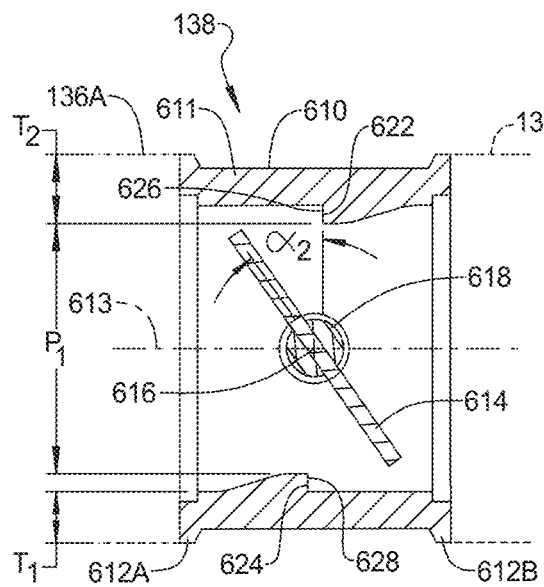
FIG. 6C is the exhaust bypass valve of FIG. 6A in a second open position.
Figure 6D:
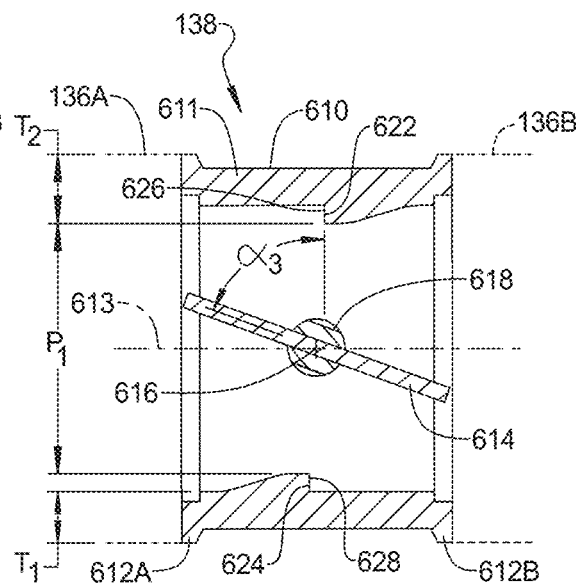
FIG. 6D is the exhaust bypass valve of FIG. 6A in a third open position.
Figure 6E:
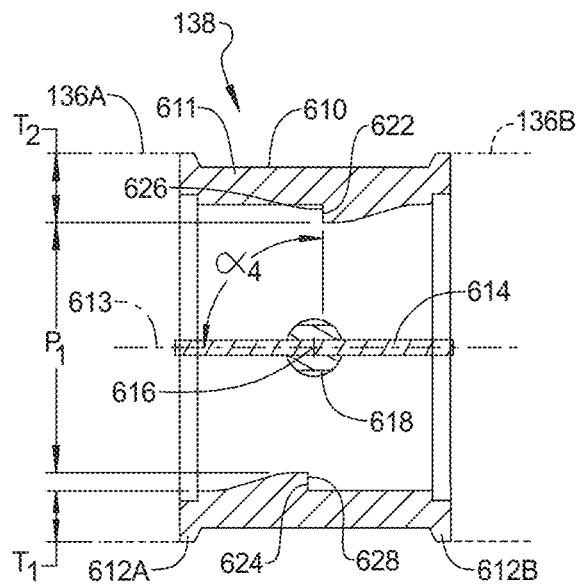
FIG. 6E is the exhaust bypass valve of FIG. 6A in a fully open position.
Figure 6F:
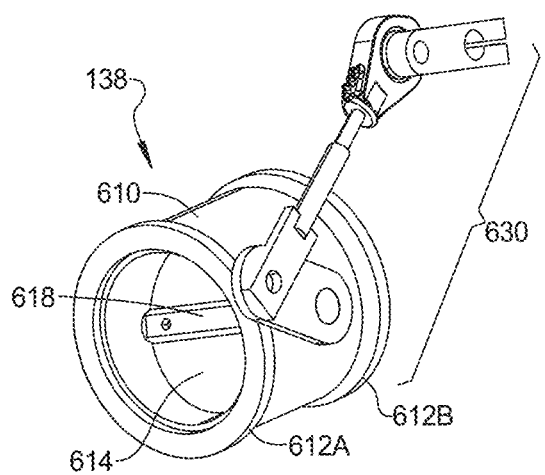
FIG. 6F is a perspective view of the exhaust bypass valve with an actuator arm.
Figure 6G:
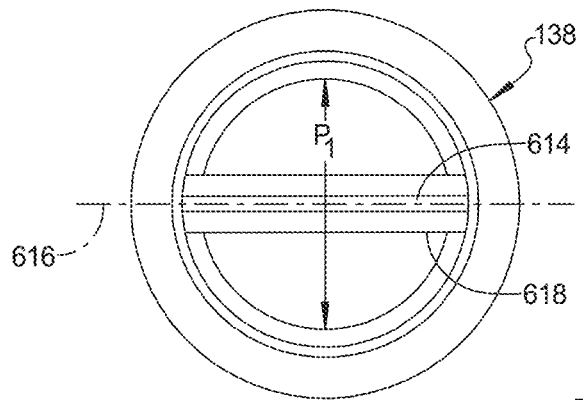
FIG. 6G is an end view of the exhaust bypass valve in the position illustrated in FIG. 6E.

Referring now to FIG. 6G, and end view of the exhaust gas bypass valve 138 is illustrated in the open position corresponding to FIG. 6E.

Figure 6H:
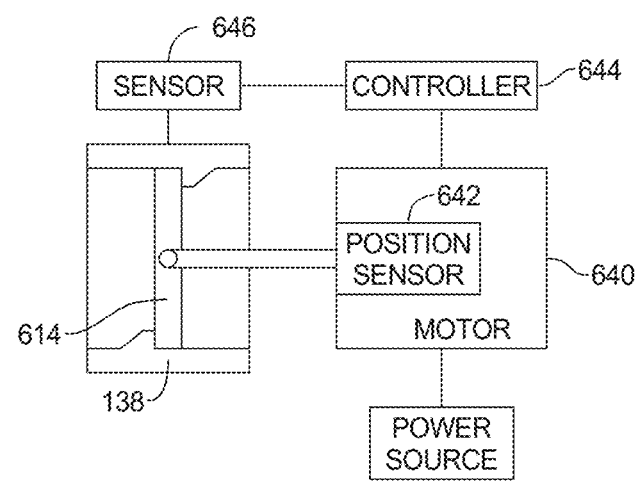
FIG. 6H is a block diagrammatic view of a system for operating the exhaust bypass valve of FIG. 6A.

Referring now to FIG. 6H, the exhaust gas bypass valve 138 may be in communication with an electrical motor 640. The electrical motor 640 has a position sensor 642 that provides feedback to a controller 644. The controller 644 is coupled to a plurality of sensors 646. The sensors provide feedback to the controller 644 to control the position of the valve 614 of the exhaust gas bypass valve 138. The sensors 646 may include a boost pressure sensor, tuned pipe pressure sensor, exhaust manifold pressure sensor and a barometric pressure sensor. Other types of sensors that may be used for controlling the motor may include various types of temperature and pressure sensors for different locations within the vehicle.

Figure 6I:
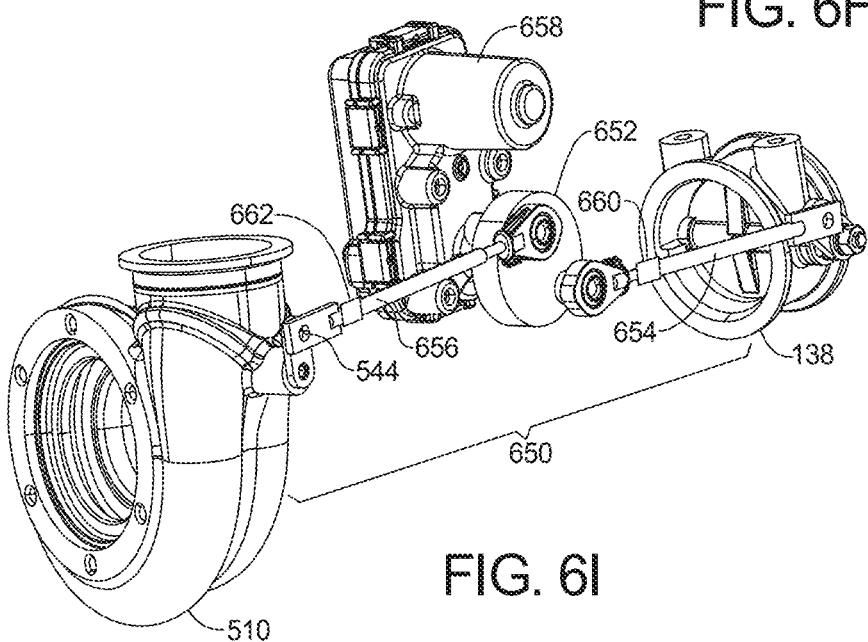
FIG. 6I is a perspective view of an exhaust bypass valve and diverter valve controlled by a common actuator.

Referring now to FIG. 6I, the turbine portion 510 is shown in relation to an exhaust gas bypass valve 138. In this example, a dual actuation system 650 is used to simultaneously move the diverter valves 540, 550 and 560 illustrated above. The diverter valve 540 moves about the pivot pin 544. The exhaust gas bypass valve 138 opens and closes as described above. In this example, a rotating member 652 is coupled to a first actuator arm 654 and a second actuator arm 656. As the rotating member 652 moves under the control of a motor 658, the first actuator arm 654 and the second actuator arm 656 move. According to that described below. Each actuator arm 654 and 656 may have a respective compensator 660, 662. Although the type of movement described by the rotating member is rotating, other types of movement for the actuator arms may be implemented. A compensator 660, 662 may thus be implemented in a plurality of different ways. The compensator 660, 662 may be used to compensate for the type of movement as described below.

In this example, when the rotating member 652 is in a starting or home position, the exhaust gas bypass valve is closed and one scroll in the turbine is closed. As the dual actuation system 650 progresses the turbocharger scroll is opened and the diverter valve is positioned in a center position so that both scrolls are open. As the dual actuation system 650 progresses to the end of travel the exhaust gas bypass valve starts to open until it is fully open at the end of the actuator's travel. The exhaust gas bypass valve 138 does not start to open until the diverter valve is in the neutral position and both scrolls are open. Once both scrolls are opened further actuator movement results in no movement of the diverter valve in the turbo. The compensator 660, 662 may be slots or springs that allow the exhaust gas bypass valve to continue to move. The compensators may also be a stop on the diverter valve so that when a diverter valve hits the center position the stop may prevent the adjacent scroll from being closed. A compression spring or other type of compensator may be used so that when the stop is hit, the actuator rod allows the compensator 662 to compress, thus still allowing the actuator to turn the exhaust gas bypass valve 138. Of course, various types of mechanisms for the dual actuation system 650 may be implemented.

The wastegate may have a housing that is attached to a bracket for supporting the wastegate actuator. The spring maintains the actuator in an open position should there be a mechanical or electrical fault.

Figure 6J:
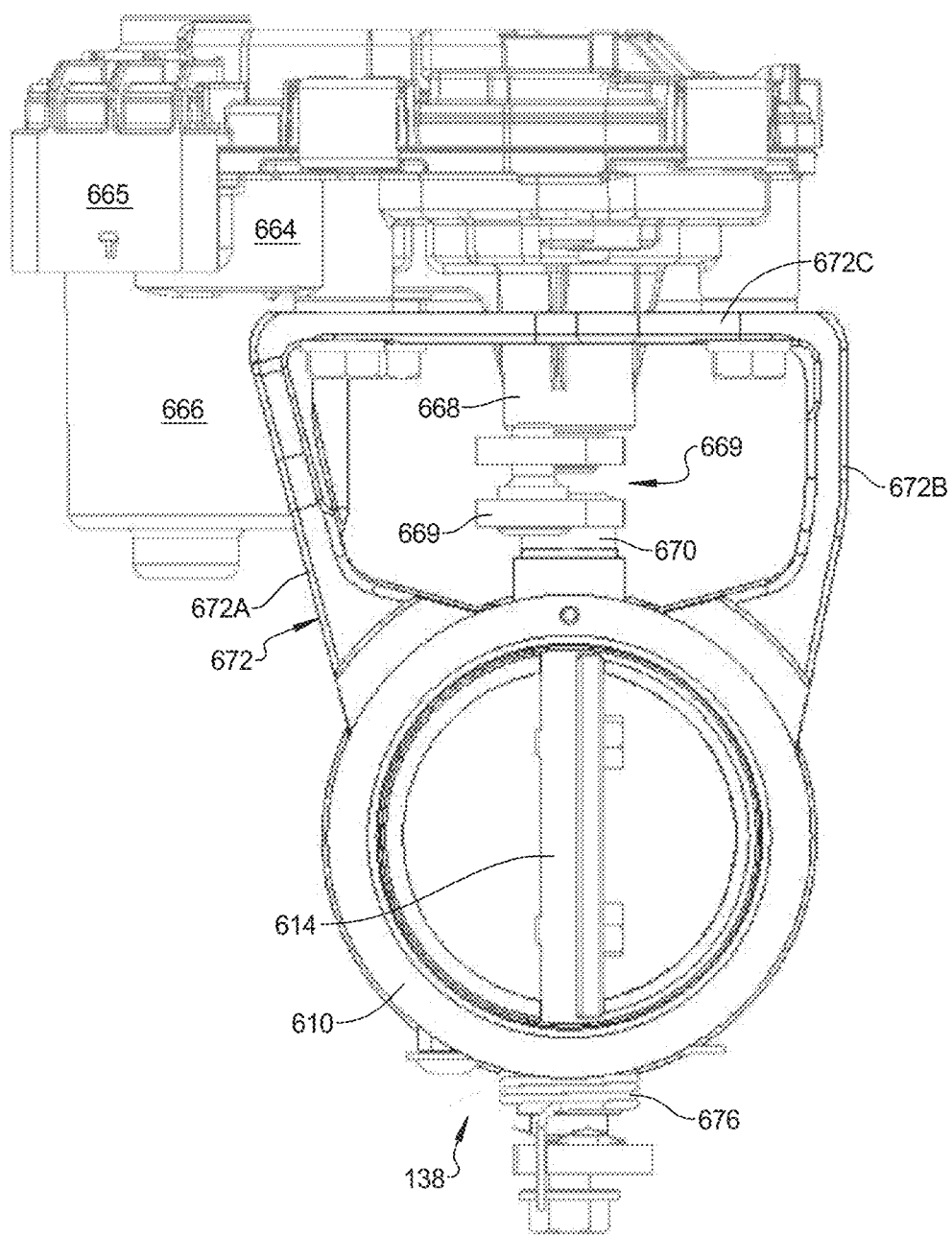
FIG. 6J is a perspective view of a wastegate actuator according to an example of the present disclosure.

Referring now to FIG. 6J, the wastegate housing 610 is illustrated in further detail. The wastegate housing 610 has the valve member 614 rotatably coupled thereto as described above. The valve member 614 has a valve stem 617 on which the valve member 614 rotates. The wastegate housing 610 has a bracket 672 that has a first arm 672A, a second arm 672B and a cross member 672C. The first arm 672A is coupled to the wastegate 610 at a first location spaced apart from a second location at which the arm 672B is coupled to the wastegate housing 610. Bosses 674A, 674B may be integrally formed with the wastegate housing 610 or may be used to receive fasteners (not shown) that couple the respective arm 672A, 674B to the bosses 674A, 674B. Bosses 674A, 674B may be integrally formed with the wastegate housing 610 and are used to receive fasteners 675 that couple the respective arm 672A, 674B to the bosses 674A, 674B. In the present example, the plane of the cross member 672C of the bracket 672 is perpendicular or normal to the axis formed by the valve stem 670.

A spring 676, as described above, may be used to maintain the actuator in a particular position, such as an open position or a closed position, during operation. As the valve member 614 rotates, exhaust gases from the tuned pipe are communicated to bypass the turbocharger.

Figure 6K:
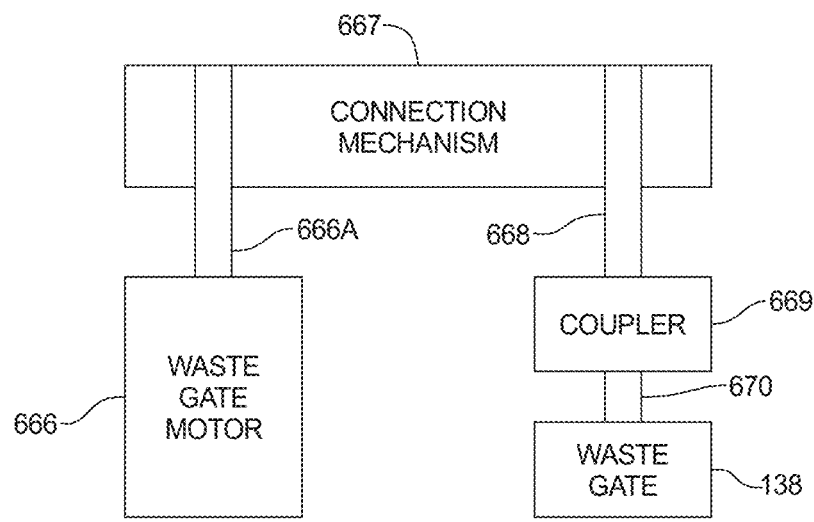
FIG. 6K is a block diagrammatic view of a wastegate actuator and a coupler.
Figure 6L:
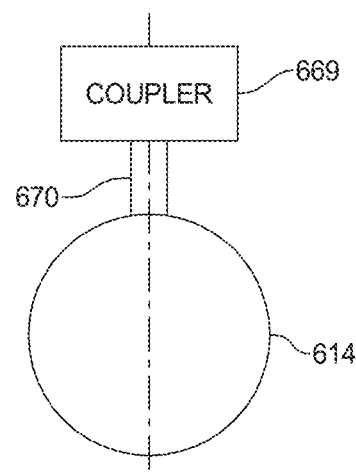
FIG. 6L is another example of a coupler for a wastegate.

A drive housing 664 is coupled to the cross member 672C. The drive housing 664 has a motor 666 with a motor shaft 666A as is best illustrated in FIG. 6K. The motor shaft 666A is coupled to a connection mechanism 667 that ultimately is coupled to a driveshaft 668. The connection mechanism 667 may comprise various types of gears such as spur gears or worm gears. The connection mechanism 667 may also be a belt or a chain drive. As the motor 666 rotates the motor shaft 666A, the connection mechanism 667 translates the motion and rotates the driveshaft 668. The driveshaft 668 is coupled to the valve stem 670 through a coupler 669. The coupler 669 allows the driveshaft 668 to directly move the valve stem 670. A front view of the valve stem 670 coupled to the coupler 669 and the valve member 614 is illustrated in FIG. 6L. In the example illustrated in FIG. 6J, the coupler 669 is disposed between the wastegate housing 610 and the cross member 672C. Although not illustrated, the housing 674 may have a power connector 665 for powering the motor 666.

Figure 6M:
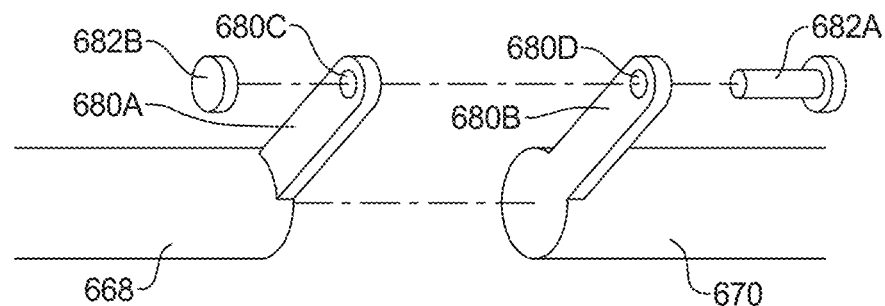
FIG. 6M is a perspective view of a method for joining a coupler.

Referring now to FIGS. 6J and 6M, the coupler 669 may comprise a first lever arm 680A that has an opening 680c therethrough. The coupler 669 may also include a second lever arm 680B that has an opening 680d therethrough. The lever arm 680A is fixedly coupled to the driveshaft 668. The lever arm 680B is fixed coupled to the valve stem 670. A fastener such as a bolt 682A couples the lever arm 680B to the lever arm 680A with the use of a nut 682B. Of course, other fasteners, such as rivet, screw, clip or pin, may be used to couple the lever arms together. When the lever arms 680A and 680B are coupled together, the longitudinal axes of the driveshaft 668 and the valve stem 670 are coaxial. The movement of the lever arms 680A and 680B cause the valve member 614 to rotate into the desired position to allow exhaust gases to be communicated from the pipe. In particular, exhaust gases are communicated from the center portion of the tuned pipe. In other examples, exhaust gases may be communicated in different ways and different positions relative to the engine including other positions of the tuned pipe.

Figure 6O:
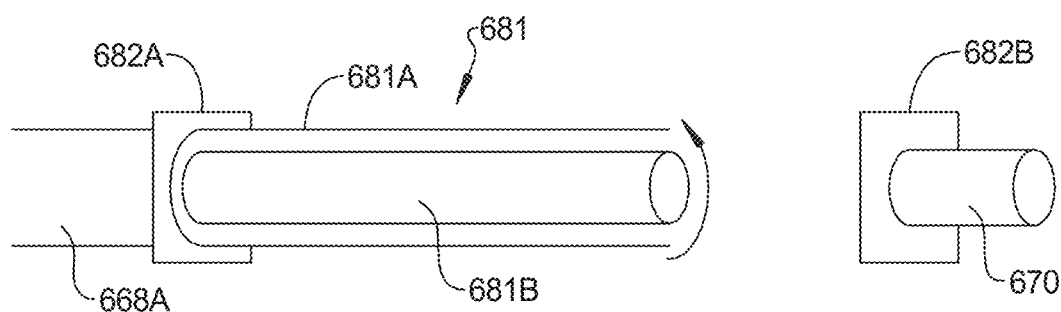
FIG. 6O is a perspective view of a rotating member of the coupler FIG. 6N.
Figure 6N:
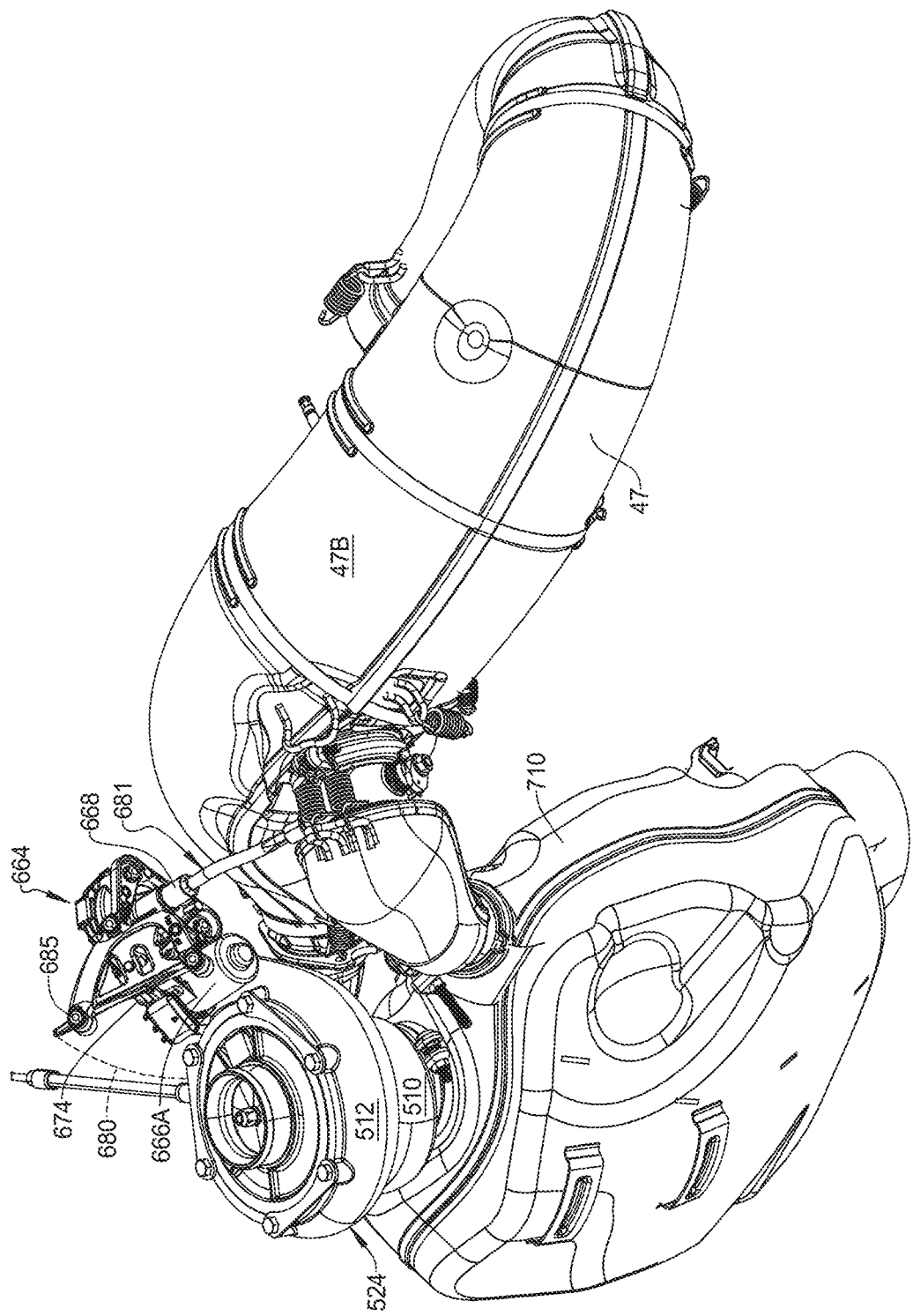
FIG. 6N is a perspective view of a turbocharger system with exhaust bypass valve coupled via flexible shaft to an electronic actuator.

Referring now to FIG. 6N, an alternate location for the drive housing 664 may be coupled to a bracket 680. The bracket 680, in this example, is coupled to the compressor housing or compressor portions 512 of the turbocharger 140. As was described above, a turbine portion 510, which may be referred to as the turbine housing, is coupled to the compressor portion 512. The driveshaft 668 is illustrated coupled to a flexible drive or flexible coupling 681. The flexible coupling 681 is also shown in more detail in FIG. 6O. The flexible coupling 681 has an outer sheath 681A and a rotating member 681B that rotates with the driveshaft 668. A fastener 682A couples the driveshaft 668A to the rotating member 681B. A fastener 682B couples the rotating member 681B to the valve stem 670. Various types of fasteners may be used including but not limited to clips, rivets, screws and combinations thereof. The advantage of using a flexible coupling 681 is the location may be varied. The bracket 680 may also be used in other locations of the vehicle, such as a frame or the like (not shown). This allows the bracket 680 and the drive housing 664 to be mounted in a number of different locations of the vehicle.

Figure 6P:
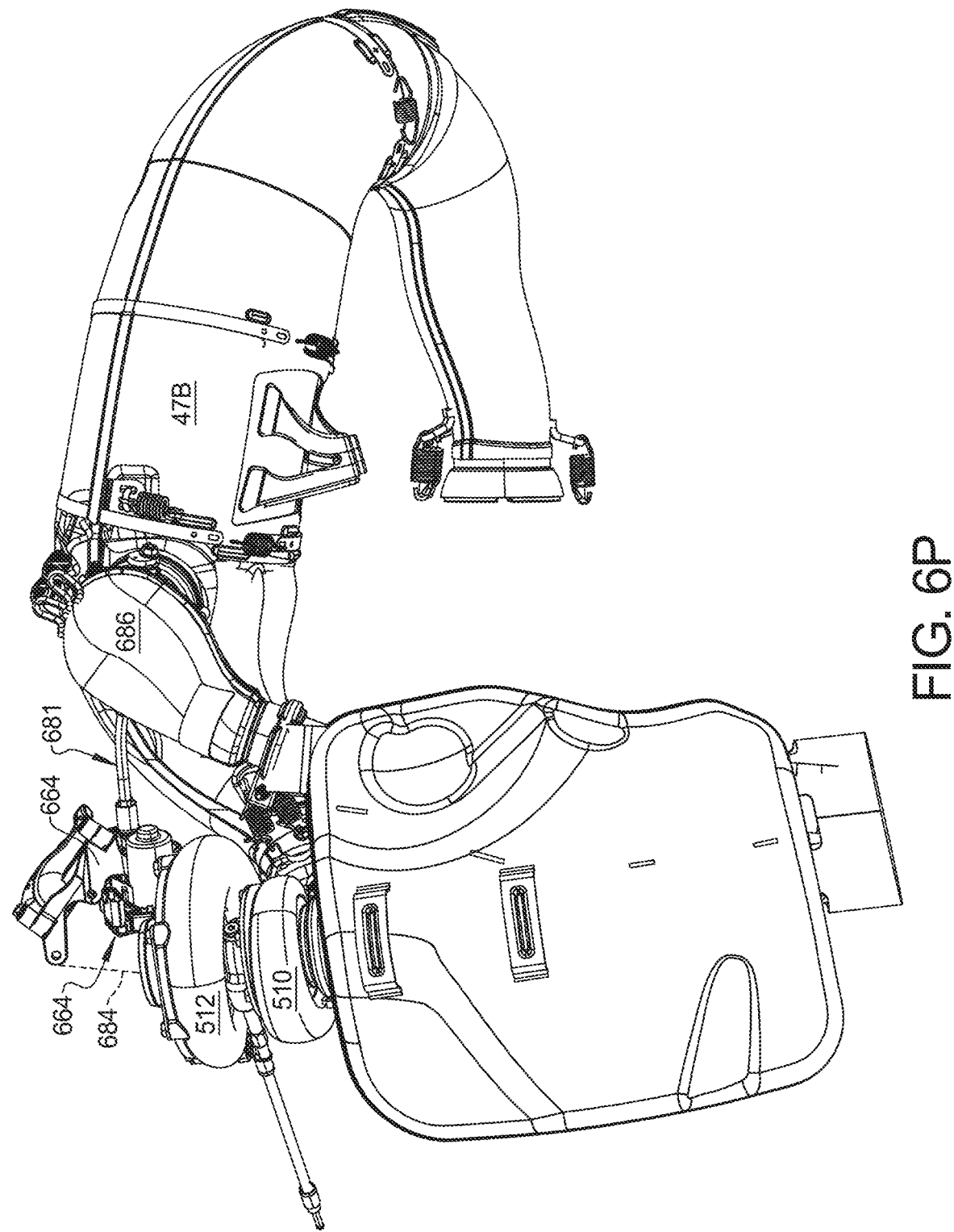
FIG. 6P is a perspective view of a flexible coupler for a wastegate coupled to a wastegate actuator coupled to a bracket formed with the turbocharger.

Referring now to FIG. 6P, another position for a bracket 684 is integrally formed with the compressor housing 612. During the formation or molding of the compressor housing 512, the bracket 684 may be integrally formed therein. The reduces the overall part count of the system. The housing 664 is coupled to the bracket that is integrally formed with the compressor housing 512 using fasteners 685 or the like.

In this example, the exhaust bypass pipe 686 is also illustrated. The exhaust bypass pipe 686 was eliminated for clarity in FIG. 6N. The exhaust bypass pipe communicates exhaust gases from the tuned pipe 47 and in particular the center portion 47B of the tuned pipe 47 to the silencer 710.

Figure 6Q:
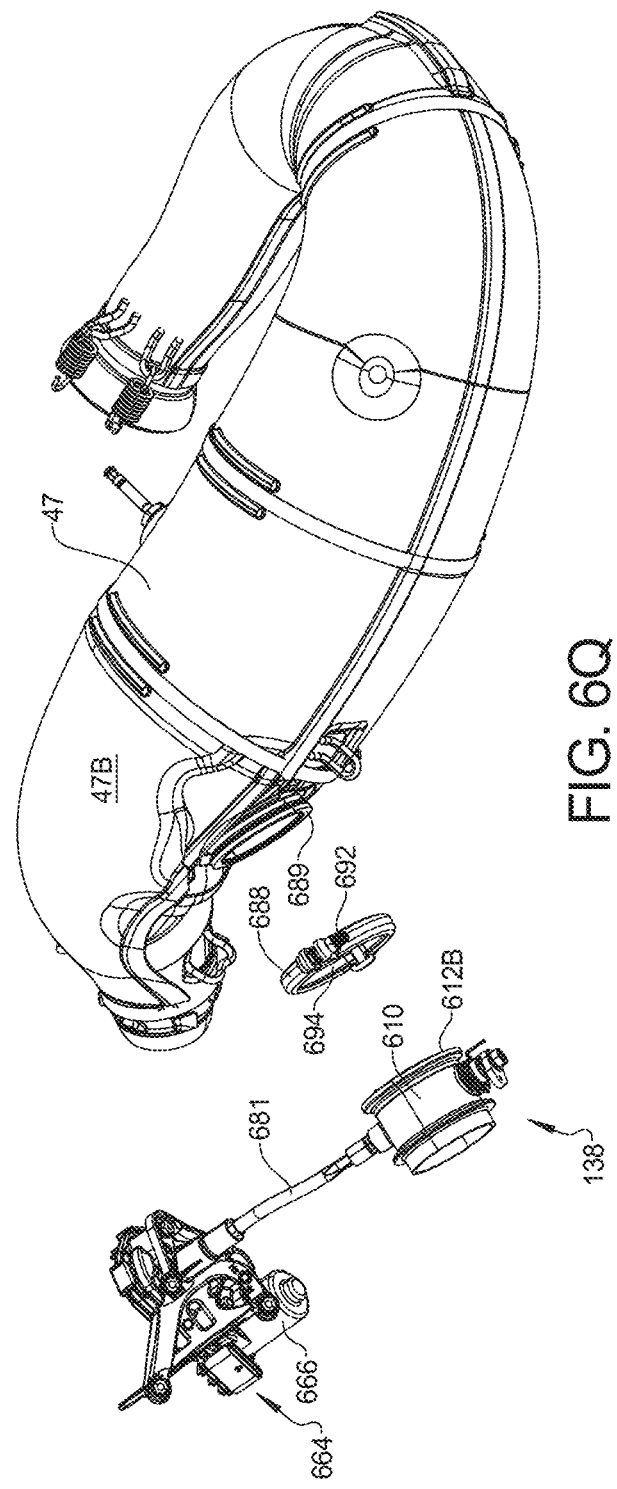
FIG. 6Q is a perspective view of a clamp for clamping a wastegate actuator and wastegate to a tuned pipe.

Referring now to FIG. 6Q, a clamp 688 may be used to couple the wastegate housing 610 to the center portion 47B of the tuned pipe 47. The clamp 688 is coupled to a flange 689 that may be integrally formed with the center portion 47B of the tuned pipe 47. A flange 690 formed on the wastegate housing 610 may also be received in the clamp. A fastener 692 may be used to secure the clamp 688 to the flanges 689 and 690. In particular, a pair of grooves 694 on the internal diameter of the clamp 688 may receive the flanges 689, 690 for securing therein. The fasteners 692 may be tightened to couple the wastegate housing 610 to the flange 689.

Figure 7A:
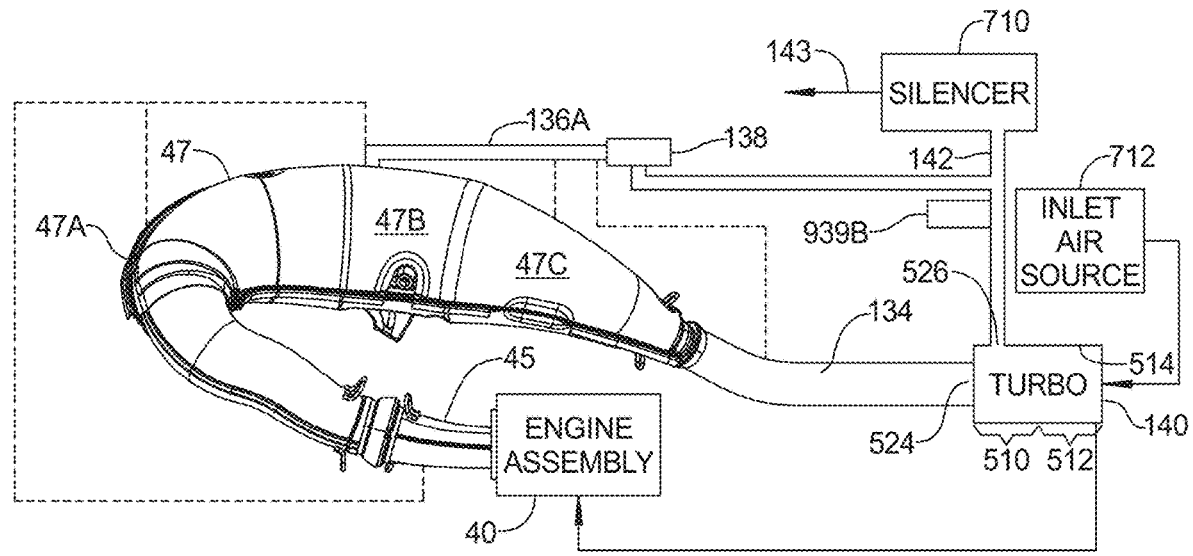
FIG. 7A is a schematic view of a system for bypassing exhaust gas.
Figure 7B:
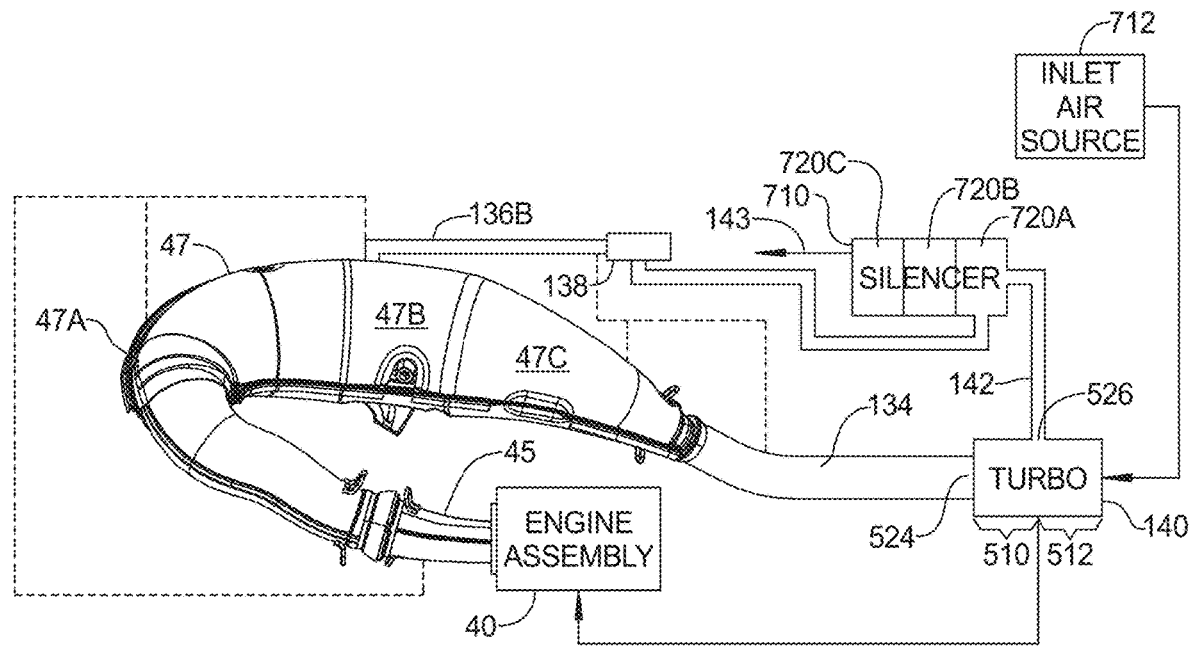
FIG. 7B is a schematic view of a second example for bypassing exhaust gas.
Figure 7C:
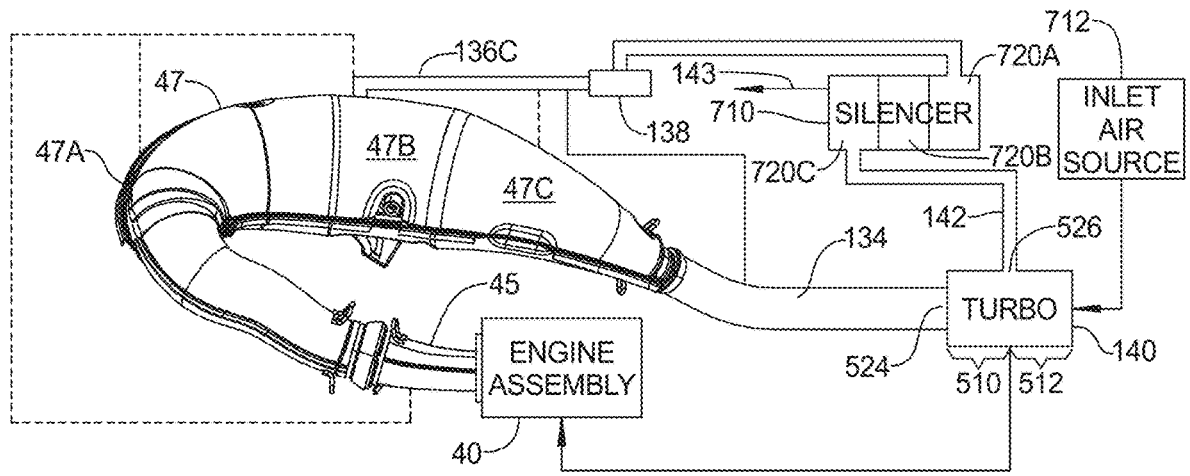
FIG. 7C is a schematic view of a third example of bypassing exhaust gas.

Referring now to FIGS. 7A-7C, the position of the exhaust gas bypass valve 138 relative to the turbocharger and the silencer of the vehicle may be changed. Although the turbocharger 140 is illustrated, the following descriptions may be applied to normally aspirated (non-turbocharged) engines.

Referring now specifically to FIG. 7A, the engine assembly 40 has the exhaust manifold 45 as illustrated above. The tuned pipe 47 communicates exhaust gases from the exhaust manifold 45 to the stinger 134. The stinger 134 is in communication with the turbocharger 140, and in particular the turbine inlet 524 of the turbine portion 510. In a non-turbocharged engine the stinger 134 may be communicated to the silencer 710. Exhaust gases pass through the turbine portion 510 and exit through outlet 526 at a lower total energy. In this example the bypass pipe 136A extends from the tuned pipe 47 to the exhaust pipe 142. In particular, the bypass pipe is illustrated in communication with the center portion 47B of the tuned pipe 47. The exhaust gas bypass valve 138 is positioned within the bypass pipe 136A. The outlet of the bypass pipe 136 communicates with the exhaust pipe 142 before a silencer 710. The silencer 710 has an exhaust outlet 143.

An inlet source 712 communicates air to be compressed to the compressor portion 512 of the turbocharger 140. The compressed air is ultimately provided to the engine assembly 40.

As shown is dotted lines, the bypass pipe 136A may also be coupled to the exhaust manifold 45, the diverging portion 47A of the tuned pipe 47, the converging portion 47C of the tuned pipe or the stinger 134.

Should the turbocharger 140 be removed, the exhaust pipe 142 is connected directly to the stinger 134. The inlet source 712 is not required.

Referring now to FIG. 7B, the silencer 710 may include a plurality of chambers 720A-720C. In the example set forth in FIG. 7B, all of the same reference numerals are used. However, in this example, the bypass pipe 136B communicates exhaust gases around the turbocharger 140 by communicating exhaust gases from the center portion 47B of the tuned pipe 47 through the exhaust gas bypass valve 138 to a first chamber 720A of the silencer 710. It should be noted that the outlet of the bypass pipe 136B is in the same chamber as the exhaust gases entering from the exhaust pipe 142.

As shown in dotted lines, the bypass pipe 136B may also be coupled to the exhaust manifold 45, the diverging portion 47A of the tuned pipe 47, the converging portion 47C of the tuned pipe or the stinger 134.

As in FIG. 7A, should the turbocharger 140 be removed, the exhaust pipe 142 is connected directly to the stinger 134. The inlet source 712 is not required.

Referring now to FIG. 7C, the bypass pipe 136C communicates fluidically from the tuned pipe 47 to a first chamber 720A of the silencer 710. In this example, the first chamber 720A is different than the chamber that the exhaust pipe 142 from the turbocharger entering the silencer 710. That is, the exhaust pipe 142 communicates with a third chamber 720C of the silencer while the bypass pipe 136C communicates with a first chamber 720A of the silencer 710. Of course, multiple chambers may be provided within the silencer 710. The example set forth in FIG. 7C illustrates that a bypass pipe 136C may communicate exhaust gases to a different chamber than the exhaust pipe 142.

As in the above, should the turbocharger 140 be removed, the exhaust pipe 142 is connected directly to the stinger 134. The inlet source 712 is not required.

Figure 7D:
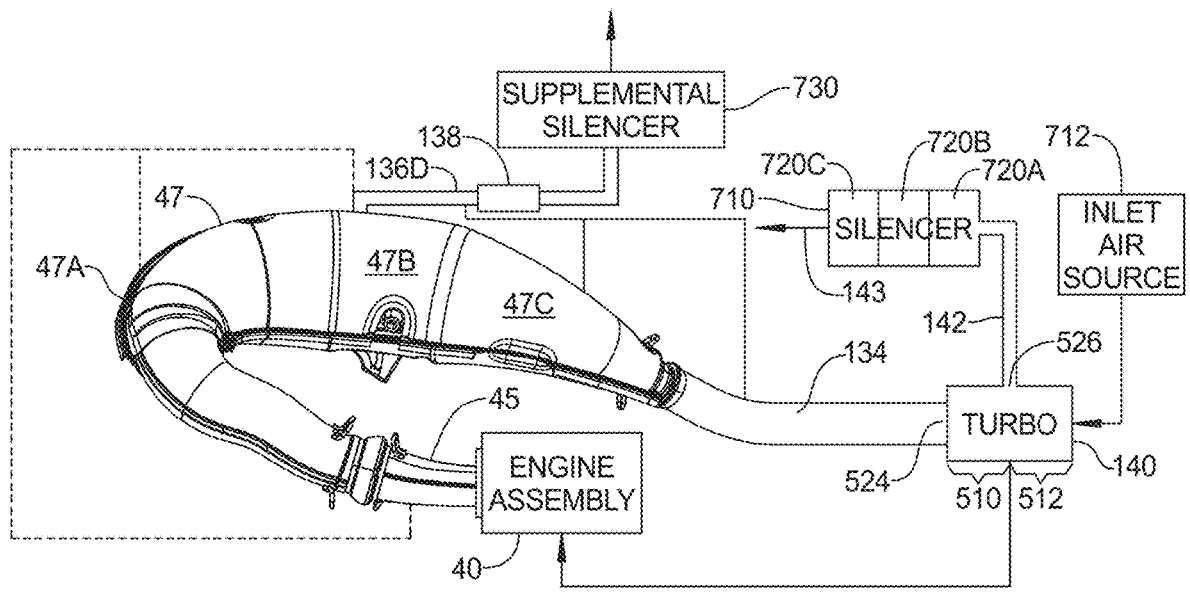
FIG. 7D is a schematic view of a fourth example of bypassing exhaust gas.

Referring now to FIG. 7D, engine assembly 40 is illustrated having a fourth example of an exhaust gas configuration. In this case, bypass pipe 136D does not connect to the exhaust pipe 142. The outlet of the exhaust gas bypass valve 138 connects to the atmosphere directly or through a supplemental silencer 730 then to the atmosphere. The configuration of FIG. 7D is suitable if packaging becomes an issue.

As shown is dotted lines, the bypass pipes 136C, 136D in FIGS. 7C and 7D may also be coupled to the exhaust manifold 45, the diverging portion 47A of the tuned pipe 47, the converging portion 47C of the tuned pipe or the stinger 134.

As in the above, should the turbocharger 140 be removed, the exhaust pipe 142 is connected directly to the stinger 134. The inlet source 712 is not required.

Figure 7E:
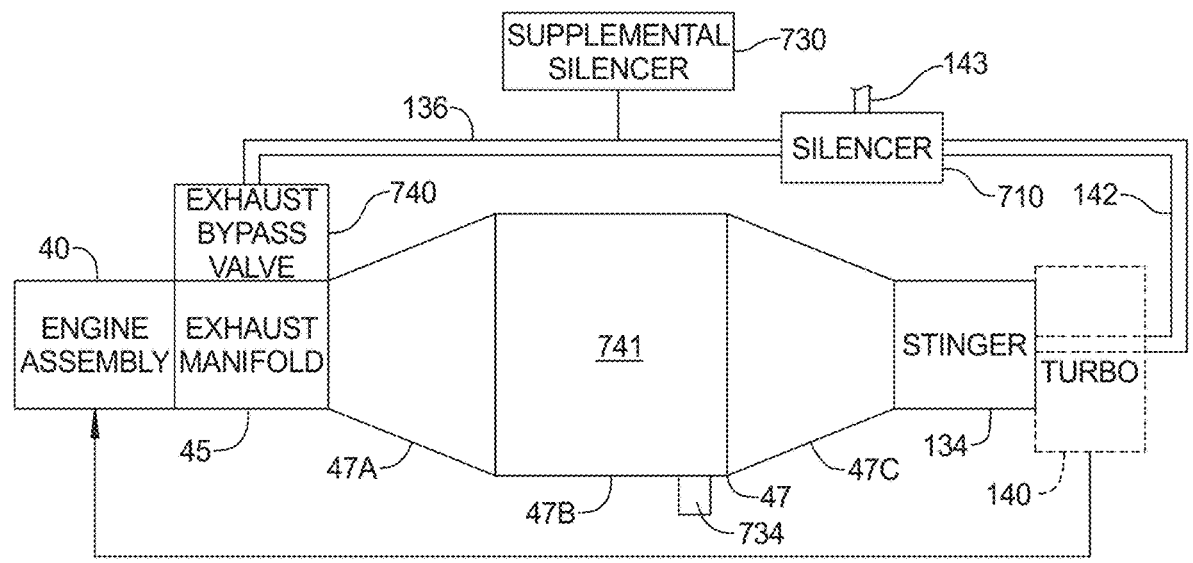
FIG. 7E is a diagrammatic representation of an engine system including exhaust bypass for increasing the stability of a two-stroke engine.

Referring now to FIG. 7E, a two-stroke engine system is set forth. In the present system an engine assembly 40 is coupled to an exhaust manifold 45. The exhaust manifold 45 is in communication with the tuned pipe 47. The tuned pipe 47 has a divergent portion 47A, a center portion 47B and a convergent portion 47C. The divergent portion 47A widens the tuned pipe 47 to the center portion 47B. The center portion 47B may be a relatively straight portion or a portion that has a generally constant cross-sectional area. The convergent portion 47C reduces the diameter of the center portion 47B to a diameter that is in communication with the stinger 134. Exhaust gases from the exhaust manifold 45 travel through the divergent portion 47A and the center portion 47B and the convergent portion 47C in a "tuned" manner. That is, the portions 47A-47C are tuned for the particular design of the engine to provide a certain amount of back pressure. Thus, a certain amount of power and stability is designed into the engine assembly. The exhaust gases travel from the stinger 134 to a silencer 710. As described above a turbocharger 140 may be used to recover some of the energy in the exhaust gases. The tuned pipe 47 has a tuned pipe pressure sensor 734 that is coupled to the tuned pipe 47 to sense the amount of exhaust gas pressure within the tuned pipe 47. The tuned pipe pressure sensor 734 generates a signal corresponding to the exhaust gas pressure within the tuned pipe 47.

An exhaust gas bypass valve 740 in this example is coupled directly to the exhaust manifold 45. The exhaust gas bypass valve 740 provides a bypass path through the bypass pipe 136 which may enter either the silencer 710 or communicate directly to atmosphere through a supplemental silencer 730. Of course, the bypass pipe 136 may be configured as set forth above in the pipe between the turbocharger 140 and the silencer 710. The exhaust gas bypass valve 740 may be electrically coupled to a controller as will be described further below. Based upon various engine system sensor signals, exhaust gas bypass valve 740 may be selectively opened to provide an increase in power and or stability for the engine assembly 40. The exhaust gas bypass valve 740 changes the pressure within the tuned pipe 47 so the airflow through the engine is increased or decreased, by changing the differential pressure across the engine. A change in the airflow may be perceived as an increase in power, engine stability or improved combustion stability or a combination thereof.

Figure 7F:
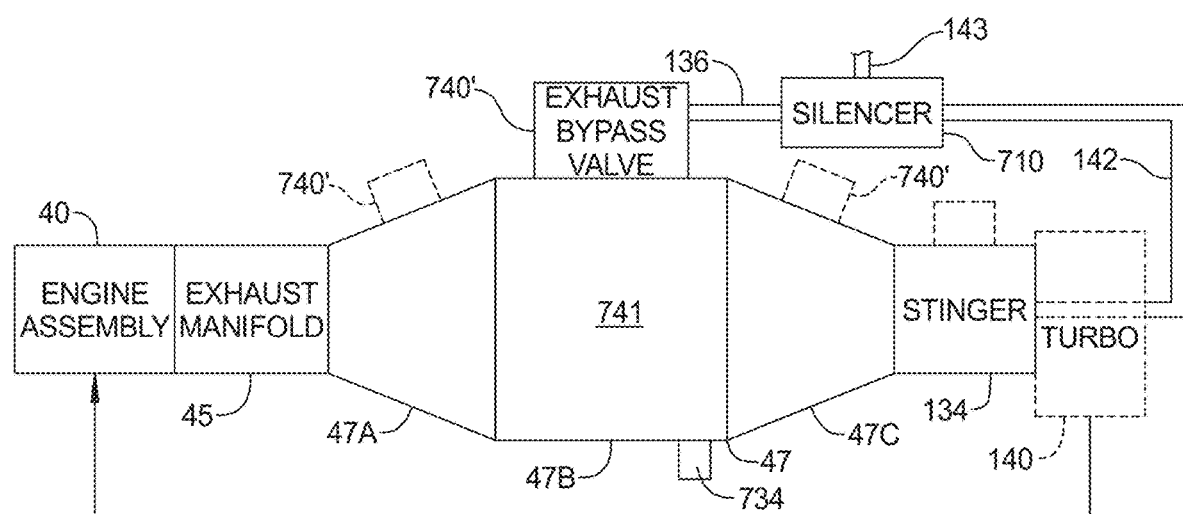
FIG. 7F is a diagrammatic representation of an engine assembly comprising a second example of increasing the stability of a two stoke engine.

Referring now to FIG. 7F, the exhaust gas bypass valve 740' may be disposed on the center portion 47B of the tuned pipe 47. However, the exhaust gas bypass valve 740' may also be located on the divergent portion 47A or the convergent portion 47C as illustrated in dotted lines. In the example set forth in FIG. 7F the exhaust gas bypass valve 740' is mounted directly to the outer wall 741 of the center portion 47B of the tuned pipe 47. The exhaust gas bypass valve 740' may also be coupled to the stinger 134 also as illustrated in dotted lines.

Figure 7G:
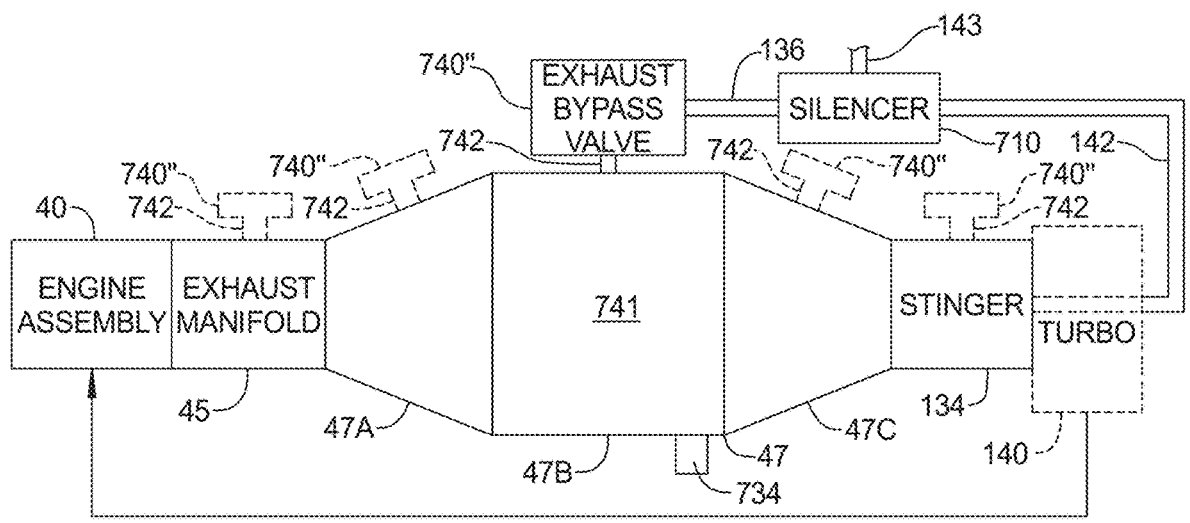
FIG. 7G is a diagrammatic representation of an engine assembly having a third example of an exhaust bypass valve for increasing the stability of a two-stroke engine alternate positions of the exhaust bypass valve are illuminated.

Referring now to FIG. 7G, the exhaust gas bypass valve 740" may be positioned away from the outer wall 741 of the tuned pipe 47 by a standoff pipe 742. The standoff pipe 742 may be very short such as a few inches. That is, the standoff pipe 742 may be less than six inches. Thus, the exhaust gas bypass valve 740" may be positioned in a desirable location by the standoff pipe 742 due to various considerations such as packaging.

In this example standoff pipe 742 and hence the exhaust gas bypass valve 740" is coupled to the center portion 47B of the tuned pipe 47. However, as illustrated in dotted lines, the standoff pipe 742 may be may be coupled to the exhaust manifold 45, the diverging portion 47A, the converging portion 47C or the stinger 134.

The valve 740''' may also be located within the center portion 47B of the tuned pipe 47. The valve 740''' may also be located within the divergent portion 47A or the convergent portion 47C or in the exhaust manifold as illustrated in dotted lines.

Figure 7H:
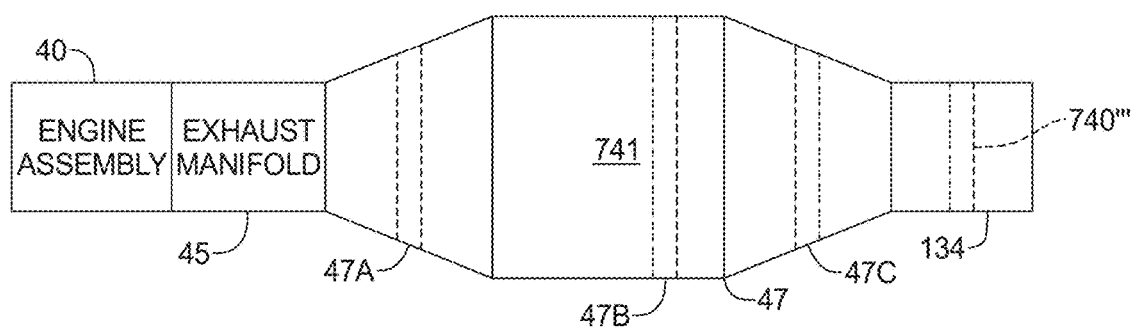
FIG. 7H is a diagrammatic representation of a control valve within a stinger of the exhaust system of a normally aspirated two-stroke engine assembly.

Referring now to FIG. 7H, a control valve 740''' may be disposed within the stinger 134. The valve 740''' may not communicate bypass exhaust gasses out of the exhaust stream but the control valve 740''' may be configured in a similar manner as the exhaust gas bypass valves described above with controlled flow therethrough. Valve 740''' may be partially opened in the most closed position to allow some exhaust gasses to flow there through. Although the valve 740''' may be used in a turbocharged application, a normally aspirated engine application may be suitable as well. The valve 740''' may open in response to various conditions so that the power output of the engine may be adjusted depending on such inputs as throttle, load engine speed, tuned pipe pressure and temperature, exhaust pressure and temperature. Other location of the control valve 740''' are also illustrated in the diverging portion 47A of the tuned pipe 47, the middle portion 47B and the converging portion 47C of the tuned pipe.

The exhaust gas bypass valves 740, 740', 740" and 740''' may have various types of configurations. In one example the exhaust gas bypass valve 740-740''' may be configured as an exhaust gas bypass valve similar to that set forth above and used to bypass the turbocharger 140. The structural configuration of the valves 740-740''' may include but are not limited to a butterfly valve, a slide valve, a poppet valve, a ball valve or another type of valve.

Figure 7I:
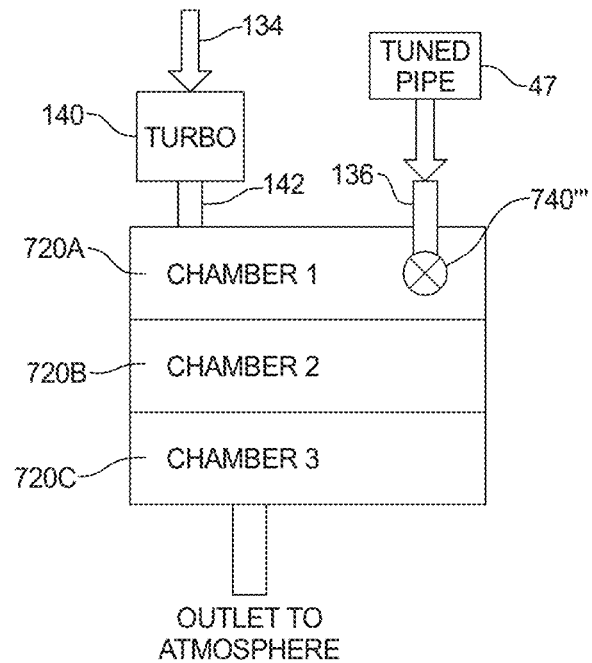
FIG. 7I is a diagrammatic representation of a control valve within a silencer.

Referring now to FIG. 7I, the exhaust bypass valve 740 illustrated above may be implemented within a first chamber 720A of the silencer 710. In this example, the tuned pipe 47 communicates exhaust gasses to the silencer 710. The tuned pipe 47 may communicate exhaust gasses from a first portion 747A, a center portion 747B, or a third portion 747C. These are illustrated in the above examples. The exhaust bypass valve 740''' is disposed within one of the chambers 720A-720C. In this example, the exhaust bypass valve 740''' is disposed within the first chamber 720A. In this example, the turbocharger 140 communicates exhaust gasses to the silencer through the pipe 142. In this example, the turbocharger 140 is coupled to the pipe 142 which is in communication with the first chamber 720A. However, any one of the chambers 720A-720C may receive exhaust gasses from the turbocharger 140 through the pipe 142.

Figure 7J:
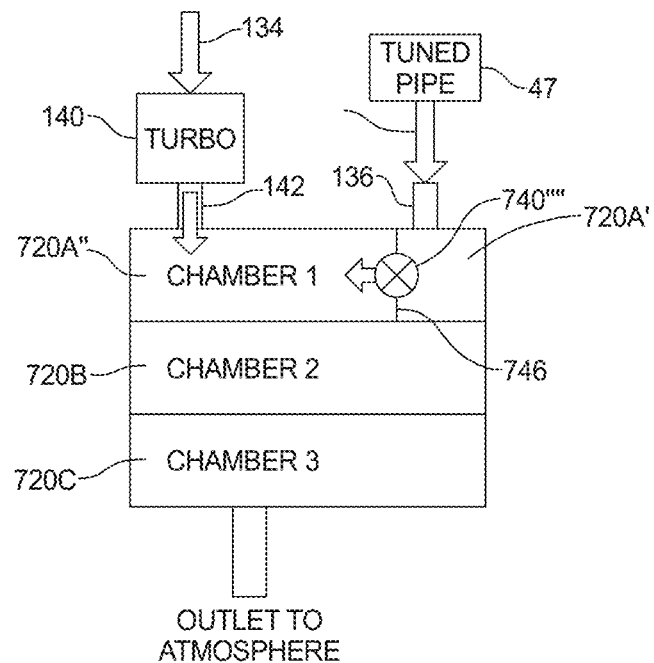
FIG. 7J is a diagrammatic representation of a control valve within a sub-chamber of a silencer.

Referring now to FIG. 7J, the chamber 720A illustrated in FIG. 1 is divided into a first chamber portion 720A' and a second chamber portion 720A" which are separated by a wall 746. Exhaust gasses are communicated between the first chamber portion 720A' and the second chamber portion 720A" through the exhaust bypass valve $740^{IV}$.

The valve 740''' and $740^{IV}$ are provided to control the amount of pressure in various tuning characteristics of the tuned pipe 47. In FIG. 7J, the turbocharger 140 may be in communication with any one of the chambers 720A", chamber 720B, and chamber 720C.

Any of the chambers 720A-C may be divided into two chambers.

Figure 7K:
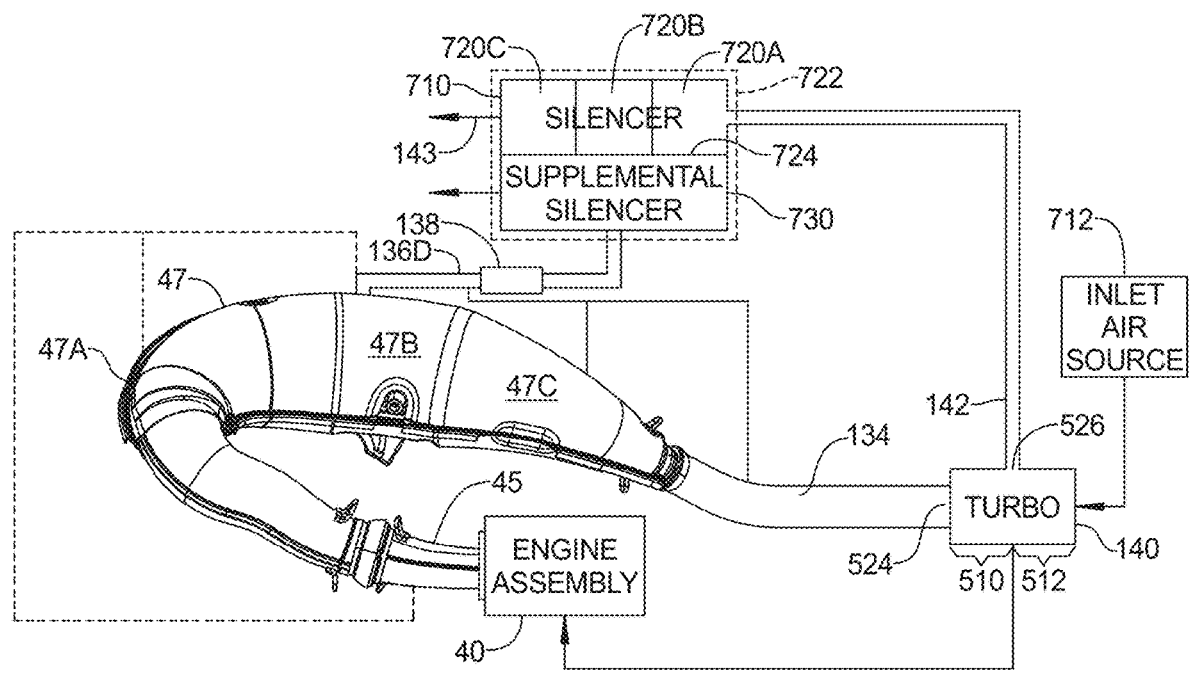
FIG. 7K is a schematic view of another example of bypassing exhaust gas using a silencer and supplemental silencer with a common wall.

Referring now to FIG. 7K, the supplemental silencer 730 and the silencer 710 may be disposed as a single unit. The supplemental silencer 730 may be disposed in a common housing but maintain separate flow paths from the valve 138 and the turbocharger 140. The silencer 710 and the supplemental silencer 730 may have a common wall 724 therebetween. The common wall reduces manufacturing costs and vehicle weight by reducing the amount of wall material.

Figures 7L, 7M, 7N:
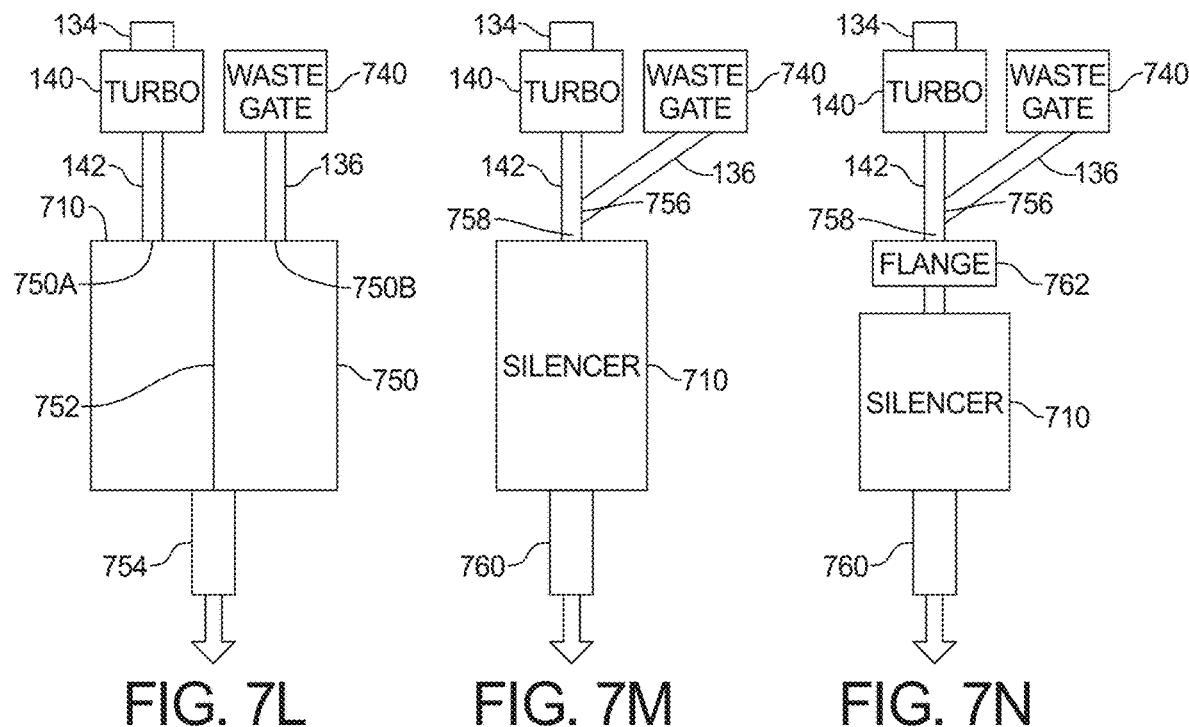
FIG. 7L is a schematic view of two part muffler with a common wall therebetween having two inputs and a single exhaust pipe receiving exhaust gasses from both parts of the muffler.
FIG. 7M is a schematic view of a pipe from a turbocharger and pipe from a wastegate joined at a Y-joint before the silencer.
FIG. 7N is a schematic view of the pipe coupled to a flange prior to entering the silencer wherein the flange and joint may all be formed as one component.

Referring now to FIG. 7L, a simplified version of FIGS. 7A through 7K is set forth. In FIGS. 7L through 7N, components such as the engine assembly and all of the piping is eliminated for simplicity purposes. Of course, although the turbocharger 140 is illustrated, the turbocharger 140 in FIGS. 7L through 7N correspond to the turbine portion of the turbocharger 140.

Referring now specifically to FIG. 7L, the turbocharger 140 receives exhaust gases from the stinger and tuned pipe which originated from the engine. The wastegate 740 receives bypass exhaust gases from the tuned pipe. The muffler 750 receives exhaust gases from the pipe 142 at port 750A and exhaust gases from pipes 136D at port 750B. The muffler 750 may be one singular muffler or may include a separate wall 752 to keep the exhaust gases separate. That is, wall 752 is an optional component. A pipe 754 is coupled to both sides of the wall 752 and receive exhaust gases from each side of the muffler 750. That is, exhaust gases that originated at port 750A and 750B are ultimately combined in the pipe 754.

Referring now to FIG. 7M, pipe 142 from turbocharger 140 and pipe 136D from the wastegate 740 are joined together at a joint 756. The joint is a Y-joint that comes together before the silencer 710. Ultimately, the silencer 710 so that the silencer 3 710 includes one inlet pipe 758 and one outlet pipe 760.

Referring now FIG. 7N, the pipe 758 is coupled to a flange 762 prior to entering the silencer 710. In a practical example, the flange 762 and the joint 756 may all be formed as one component. The flange 762 may be used to increase the manufacturability of the configuration.

Figure 7O:
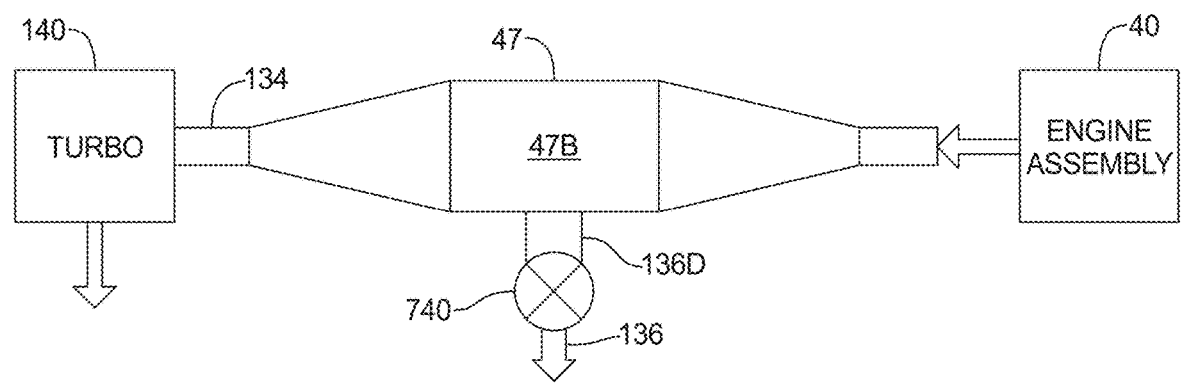
FIG. 7O is a schematic view of the engine assembly, the tuned pipe and the turbocharger wherein the effective area of cross-sectional flow of the wastegate or exhaust bypass valve is greater than the cross-section flow area of the stinger.

Referring now to FIG. 7O, the engine assembly 40, the tuned pipe 47 and the turbocharger 140 are all illustrated. The wastegate or exhaust bypass valve 740 is illustrated coupled to the center section 47B. In this example, the effective area of cross-sectional flow of the wastegate or exhaust bypass valve 740 is greater than the cross-section flow area of the stinger 134. Correspondingly, the cross-sectional flow area of the pipes 136D and 136 also have a cross-sectional flow area about or greater than that of the cross-sectional flow area of the wastegate or exhaust bypass valve 740.

Figure 8A:
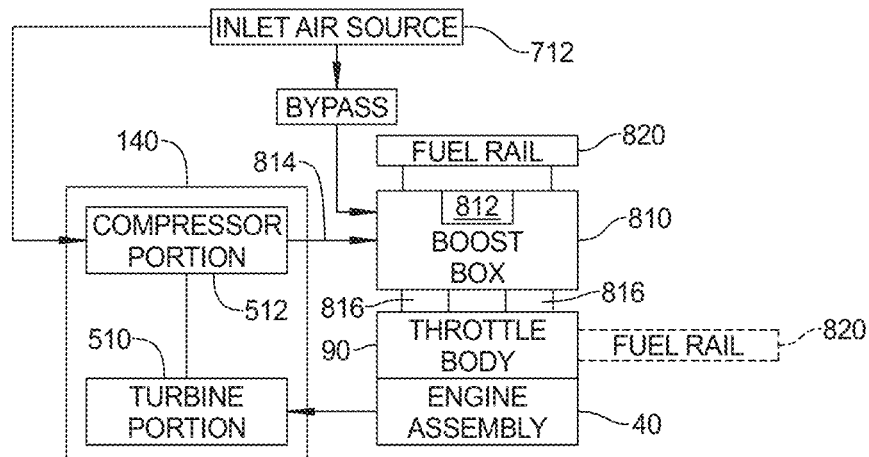
FIG. 8A is a schematic view of a system for bypassing the compressor of a turbocharged engine to provide airflow to the engine.

Referring now to FIG. 8A, schematic view of an engine air system that a boost box 810 is illustrated. The boost box 810 has a one-way valve 812 coupled therein. The valve 812 may be an active valve such as a motor controlled valve or a passive valve such as a reed valve. When a lower pressure is present in the boost box 810 than the ambient pressure outside the boost box 810, the valve 812 opens and allows air to bypass the compressor portion 512 of the turbocharger 140. That is, a bypass path is established through the boost box from the valve 812 through boost box 810 to the engine. That is, the air through the valve 812 bypasses the compressor portion 512 of the turbocharger 140 and the air in boost box 810 is directed to the air intake or throttle body of the engine assembly 40.

Figure 8F:
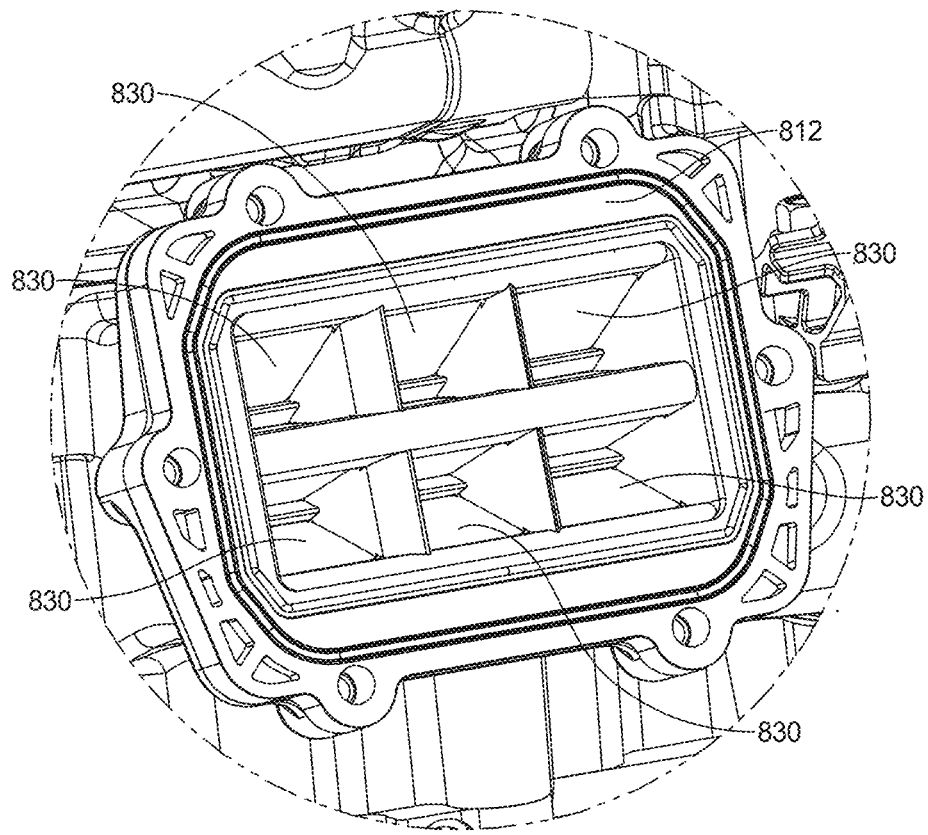
FIG. 8F is an enlarged view of the one-way valve of FIG. 8A.

The one-way valve 812 may be a reed valve as illustrated in further detail in FIG. 8F. By using a one-way valve 812, engine response is improved to activate turbocharger 140 sooner. When the engine response is improved the turbocharger lag is reduced by allowing the engine to generate exhaust mass flow quicker, in turn forcing the turbine wheel speed to accelerate quicker. When the compressor portion 512 of the turbocharger 140 builds positive pressure the one-way valve 812 closes. When implemented, a decrease in the amplitude and duration of the vacuum present in the boost box 810 was achieved. In response, the engine speed increased sooner, and the compressor built positive pressure sooner.

Referring now to FIGS. 8A-8F, the boost box 810 has the one-way valve 812 as described above. The one-way valve 812 allows air into the boost box 810 while preventing air from leaving the boost box 810. The boost box 810 also includes a compressor outlet 814. The compressor outlet 814 receives pressurized air from the compressor portion 512 of the turbocharger 140. However, due to turbocharger lag the compressor takes some time to accelerate and provide positive pressure to the boost box 810 particularly when wide open throttle is demanded suddenly from a closed or highly throttled position.

The boost box 810 also includes a pair of intake manifold pipes 816 that couple to the throttle body 90 of the engine assembly 40.

A portion of a fuel rail 820 is also illustrated. The fuel rail 820 may be coupled to fuel injectors 822 that inject fuel into the boost box 810 or throttle body 90. The fuel rail 820 and fuel injectors 822 may also be coupled directly to the throttle body 90.

A pressure sensor 824 may also be coupled to the boost box 810 to generate an electrical signal corresponding to the amount of pressure in the boost box 810, which also corresponds to the boost provided from the compressor portion 512 of the turbocharger 140. The boost box pressure sensor signal takes into account the boost pressure and the barometric pressure. That is the boost box pressure sensor signal is a function of both the boost pressure and the barometric pressure.

Referring now to FIG. 8F, the one-way valve 812 is illustrated in further detail. The one-way valve 812 may include a plurality of ports 830 that receive air from outside of the boost box 810 and allow air to flow into the boost box 810. That is, when a lower pressure is developed within the boost box 810 such as under high acceleration or load, the turbocharger 140 is not able to provide instantaneous boost and thus air to the engine is provided through the one-way valve 812 to reduce or eliminate any negative pressure, relative to ambient pressure outside the boost box, within the boost box 810. When compressor portion 512 of the turbocharger 140 has reached operating speed and is pressurizing the boost box 810, the pressure in the boost box 810 increases and the one-way valve 812 closed. That is, the ports 830 all close when pressure within the boost box 810 is higher than the ambient pressure outside the boost box.

Referring now to FIG. 8G, the boost box 810 is illustrated within an engine compartment 832. The engine compartment 832 roughly illustrates the engine assembly 40 and the turbocharger 140. In this example the one-way valve 812 is illustrated rearward relative to the front of the vehicle. The position of the one-way valve 812 allows cooler air to be drawn into the boost box 810.

Figure 8H:
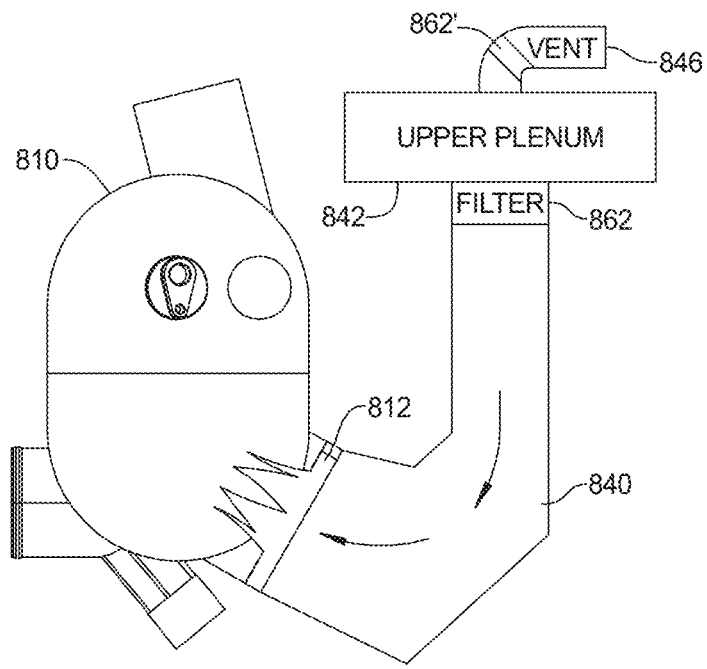
FIG. 8H is a side view of a boost box coupled to a duct.

Referring now to FIG. 8H, the one-way valve 812 may be coupled to a duct 840. The duct 840 allows cooler air to be drawn into the boost box 810 from a remote location. In this example, an upper plenum 842 is coupled to the duct 840. The upper plenum may pass the air through a filter 862, such as a screen or fine mesh, prior to being drawn into the boost box 810. The filter 862 may filter large particles and prevent damage to the boost box 810 and the one-way valve 812. The upper plenum receives air from a vent 846. A filter 862' may be located at the vent 846 or between the vent 846 and upper plenum 842. Of course, in one system one filter 862 or the other filter 862' may be provided.

The vent 846 may be located in various places on the vehicle. For example, the vent 846 may draw air externally though the hood of the vehicle, the console of the vehicle or from a location under the hood that has clean and cool air.

Figure 8I:
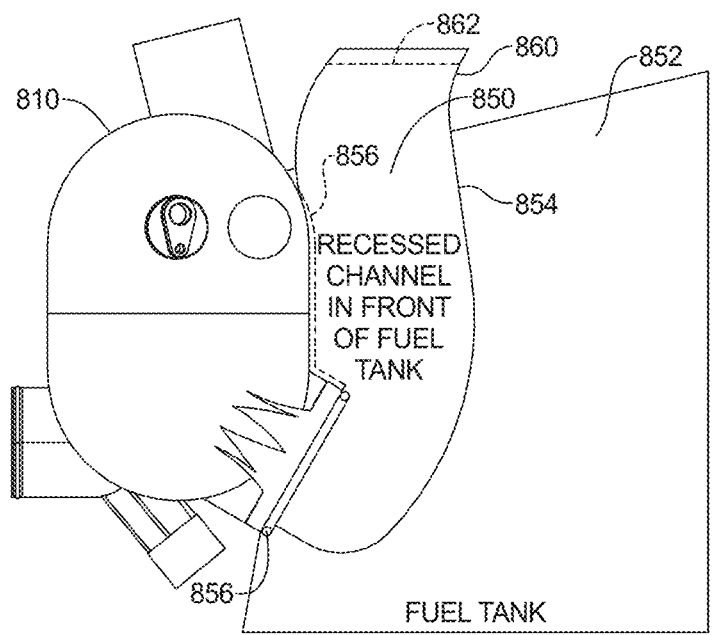
FIG. 8I is a side view of the boost box coupled to a channel integrally formed with a fuel tank.

Referring now to FIG. 8I, a channel 850 may be formed in the fuel tank 852. That is, the channel 850 may act as the duct 840 illustrated above in FIG. 8H. The channel 850 may be integrally formed into the outer walls 854 of the fuel tank. The boost box 810 may be attached to the fuel tank 852 so that the air drawn into the boost box 810 is received through the channel 850. A seal 856 may be used between the boost box and the fuel tank 852 so that the air is completely drawn through the channel 850. Various types of seals may be used. Rubber, foam, thermoplastics are some examples. The seal 856 may be a gasket. A duct 860 may be coupled between the fuel tank 852 and the boost box 810 to receive air from a remote location such as the vent 846 illustrated in FIG. 8H or another location within the engine compartment 832 of the vehicle. Of course, the duct 860 may draw air from other portions of the vehicle or outside the vehicle. A filter or screen 862 may be used to prevent debris from entering the channel 850.

Figure 9A:
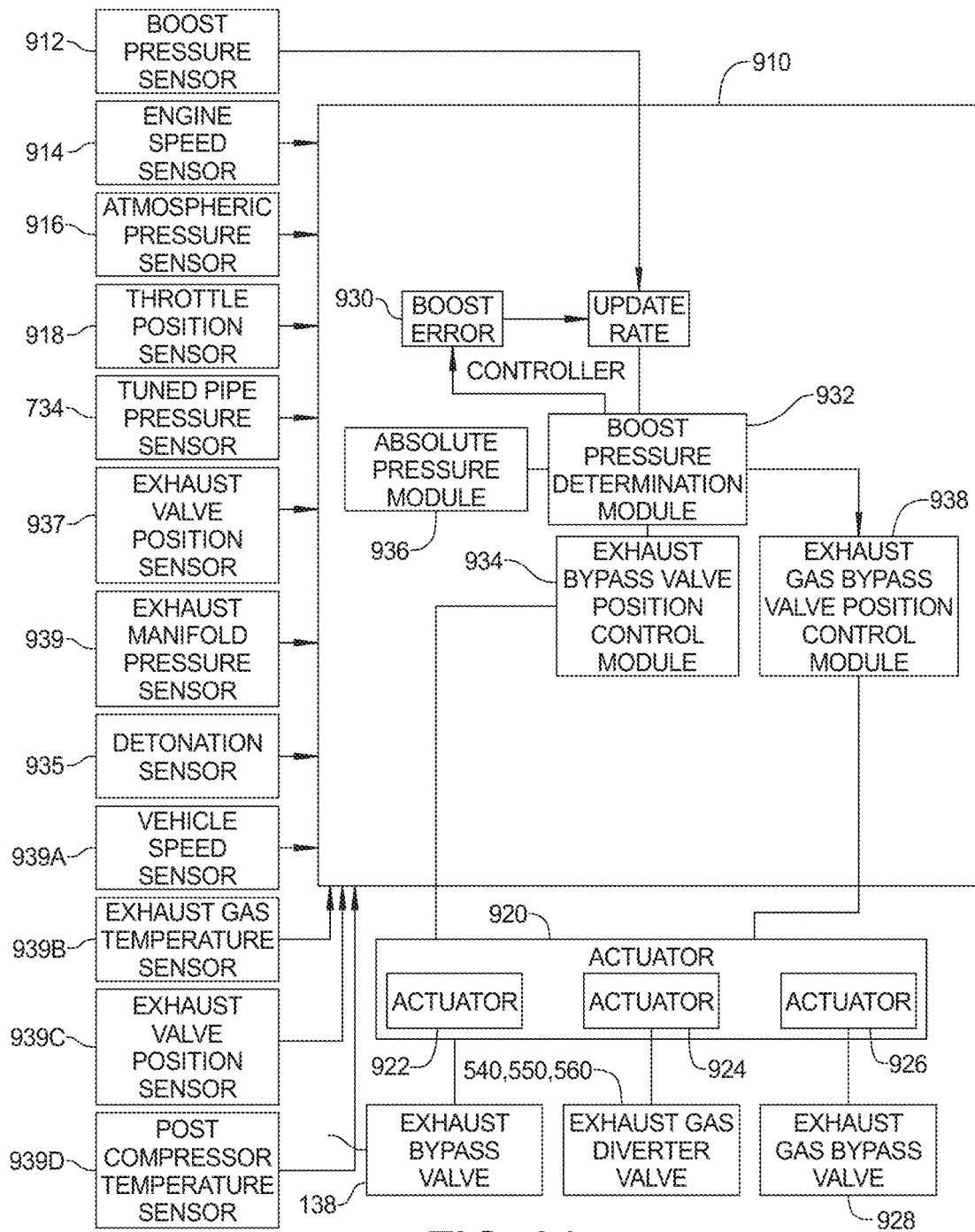
FIG. 9A is a block diagrammatic view of a system for controlling an exhaust bypass valve.

Referring now to FIG. 9A, a block diagrammatic view of a control system for a two-stroke turbocharged engine is set forth. In this example a controller 910 is in communication with a plurality of sensors. The sensors include but are not limited to a boost pressure sensor 912, an engine speed sensor 914, an atmospheric (altitude or barometric) pressure sensor 916, a throttle position sensor, tuned pipe pressure sensor 734, an exhaust valve position sensor 937 and an exhaust manifold pressure sensor. Each sensor generates an electrical signal that corresponds to the sensed condition. By way of example, the boost pressure sensor 912 generates a boost pressure sensor signal corresponding to an amount of boost pressure. The engine speed sensor 914 generates an engine speed signal corresponding to a rotational speed of the crankshaft of the engine and the atmospheric or barometric pressure sensor 916 generates a barometric pressure signal corresponding to the atmospheric ambient pressure.

The tuned pipe pressure sensor 734 may also be in communication with the controller 910. The tuned pipe pressure sensor 734 generates a tuned pipe pressure signal corresponding to the exhaust pressure within the tuned pipe 47 as described above. The exhaust valve position sensor 937 generates an exhaust valve position signal corresponding to the position of the exhaust valve. The exhaust manifold pressure sensor 939 generates a signal corresponding to the pressure in the exhaust manifold. A vehicle speed sensor 939A generates a speed signal corresponding to the speed of the vehicle. An exhaust gas temperature sensor 939B generates an exhaust gas temperature signal, an exhaust valve position sensor 939C generates an exhaust valve position signal, and a post compressor temperature sensor 939D generates a temperature signal of the temperature of the exhaust after the compressor.

The controller 910 is used to control an actuator 920 which may be comprised of an exhaust gas bypass valve actuator 922 and exhaust gas diverter valve actuator 924. An example of the actuator is illustrated in FIG. 6I above. Of course, as mentioned above, the actuators may be one single actuator. The actuator 922 is in communication with the exhaust gas bypass valve 138. The actuator 924 is in communication with the exhaust gas diverter valve 540. The controller 910 ultimately may be used to determine an absolute pressure or a desired boost pressure.

A boost error determination module 930 is used to determine a boost error. The boost error is determined from the boost pressure sensor 912 in comparison with the desired boost pressure from the boost pressure determination module 932. The boost pressure error in the boost pressure determination module 930 is used to change an update rate for determining the boost pressure for the system. That is, the boost error determination is determined at a first predetermined interval and may be changed as the boost error changes. That is, the system may ultimately be used to determine an update rate at a faster rate and, as the boost pressure error is lower, the boost pressure determination may determine the desired boost pressures at a lower or slower rate. This will be described in further detail below. This is in contrast to typical systems which operate a PID control system at a constant update rate. Ultimately, the determined update rate is used to control the exhaust gas bypass valve using an exhaust gas bypass valve position module 934 which ultimately controls the actuator 920 or actuator 922 depending if there is a dedicated actuator for the exhaust gas bypass valve 138. By determining the boost target in the boost pressure determination module 932, the update rate may be changed depending on the amount of boost error. By slowing the calculations, and subsequent system response, during the approach of the target boost value, overshoot is controlled and may be reduced. Also, the update rate may be increased to improve system response when large boost errors are observed.

The controller 910 may be coupled to a detonation sensor 935. The detonation sensor 935 detects detonation in the engine. Detonation may be referred to as knock. The detonation sensor 935 may detect an audible signal.

The controller 910 may also include an absolute pressure module 936 that keeps the engine output constant at varying elevations. That is, by comparing the altitude or barometric pressure from the atmospheric pressure sensor 916, the boost pressure may be increased as the elevation of the vehicle increases, as well as to compensate for increased intake air charge temperature due to increased boost pressure to maintain constant engine power output. This is due to the barometric pressure reducing as the altitude increases. Details of this will be set forth below.

The controller 910 may also include a second exhaust gas bypass valve position control module 938. The exhaust gas bypass valve position control module 938 is used to control the exhaust gas bypass valve and position the actuator 926 which may include a motor or one of the other types of valve described above. The exhaust gas bypass valve position control module 938 may be in communication with the sensors 912-918, 935 and 734. The amount of pressure within the tuned pipe may affect the stability and power of the engine. Various combinations of the signals may be used to control the opening of the exhaust gas bypass valve 740-740". The exhaust gas bypass valves 740-740" may, for example, be controlled by feedback from the tuned pipe pressure sensor 734. The tuned pipe pressure sensor signal may be windowed or averaged to obtain the pressure in the tuned pipe as a result of the opening or closing of the exhaust gas bypass valve 740-740". The tuned pipe pressure sensor 734 may be used in combination with one or more of the other sensors 912-918, 734 and others to control the opening and closing of the exhaust gas bypass valve 740-740". The boost pressure or average boost pressure from the boost pressure sensor 912 may also be used to control the exhaust gas bypass valves 740-740". The boost pressure determination module 932 may provide input to the exhaust gas bypass valve position control module 938 to control the exhaust gas bypass valve based upon the boost pressure from the boost pressure determination module 932 as described above.

A map may also be used to control the specific position of the exhaust gas bypass valve 740-740". For example, the engine speed signal, the throttle position signal and/or the barometric pressure signal may all be used together or alone to open or close the exhaust gas bypass valve 740-740" based on specific values stored within a pre-populated map.

Figure 9B:
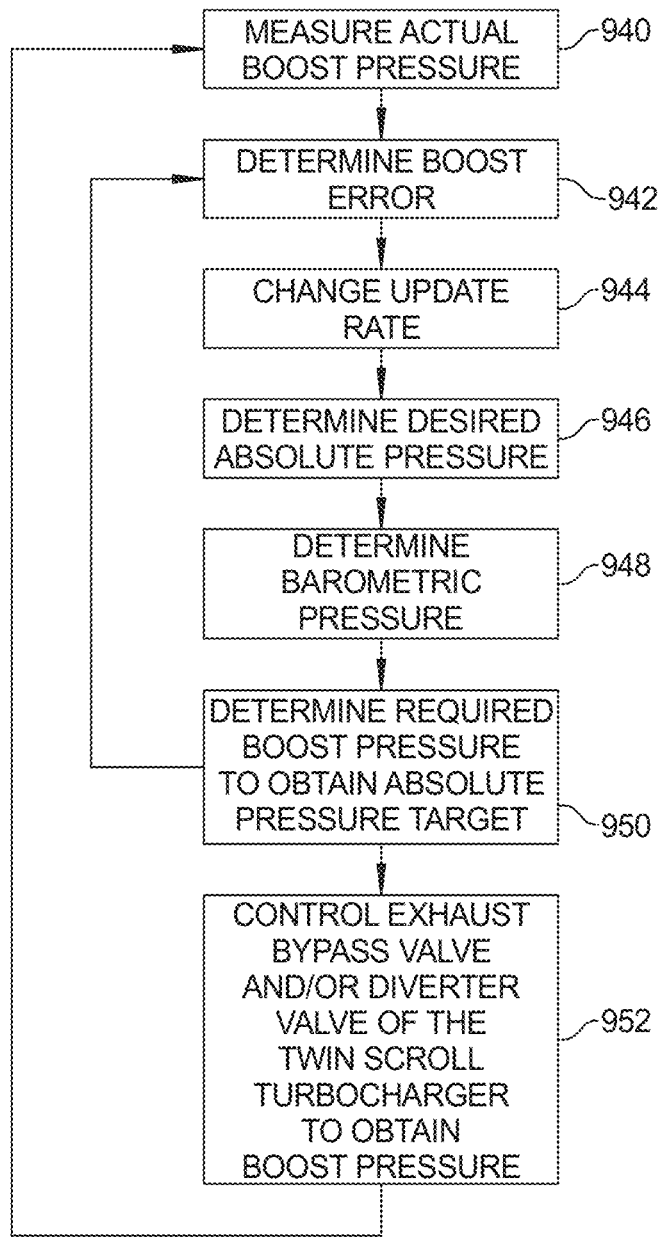
FIG. 9B is a flowchart of a method for controlling the exhaust gas bypass valve.

Referring now to FIG. 9B, in step 940 the actual boost pressure is measured by the boost pressure sensor 912 as mentioned above. In step 942 a boost pressure error is determined. Because this is an iterative process, the boost error is determined by the difference between the target boost and the actual boost pressure. Once the process is cycled through once, a boost error will be provided to step 942.

Referring to step 944, the update interval is changed based upon the boost error determination in step 942. That is, the boost error is used to determine the update rate of the exhaust gas bypass valve control method. That is, the update rate corresponds to how fast the method of determining error, then moving the exhaust gas bypass valve actuator, and determine timing of the next cycle is performed. As mentioned above, as the actual boost or measured boost pressure becomes closer to the target boost pressure the update rate is reduced in response to the observed boost error.

In step 946 a desired absolute pressure is established. Step 946 may be established by the manufacturer during the vehicle development. The desired absolute pressure may be a design parameter. In step 948 the barometric pressure of the vehicle is determined. The barometric pressure corresponds to the altitude of the vehicle. In step 950 a required boost pressure to obtain the absolute pressure and overcome additional system losses due to elevation is determined. That is, the barometric pressure is subtracted from the required absolute pressure to determine the desired boost pressure. In step 952 the exhaust gas bypass valve and/or the exhaust gas diverter valve for the twin scroll turbocharger is controlled to obtain the desired boost pressure. Because of the mechanical system the desired boost pressure is not obtained instantaneously and thus the process is an iterative process. That is, the required boost pressure from step 950 is fed back to step 942 in which the boost error is determined. Further, the after step 952 step 940 is repeated. This process may be continually repeated during the operation of the vehicle.

Referring now to FIG. 9C, a throttle position sensor 918 may provide input to the controller 910. The throttle position sensor signal 954 is illustrated in FIG. 9C. The engine speed signal 960 is also illustrated. The signal 958 illustrates the position of the exhaust gas bypass valve. The signal 956 illustrates the amount of boost error.

Figure 9D:
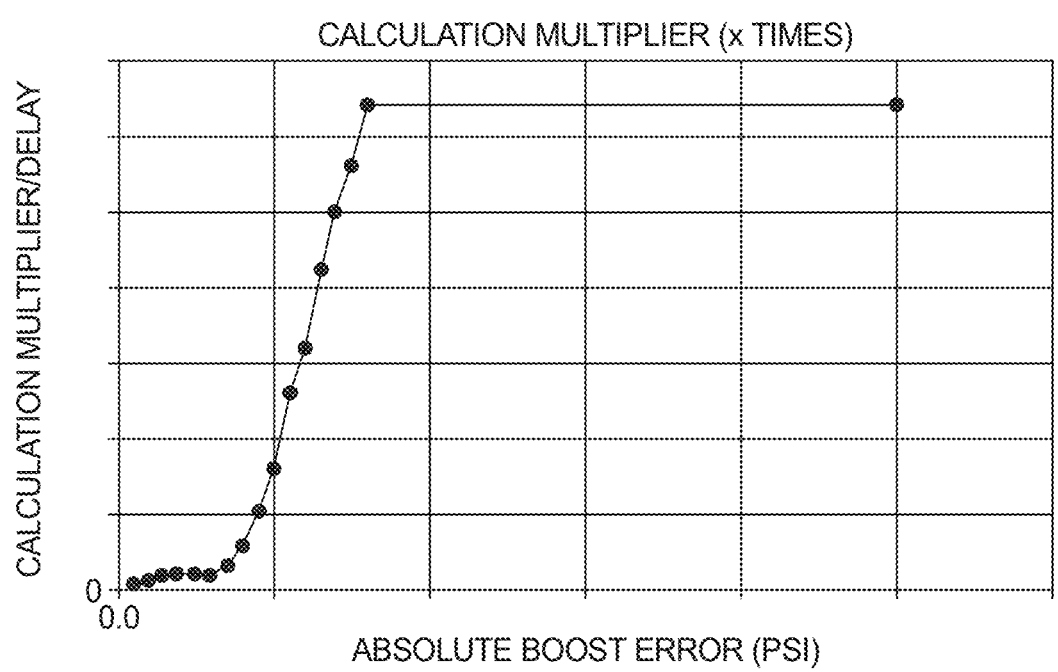
FIG. 9D is a plot of the calculation multiplier versus boost error.

Referring now to FIG. 9D, a plot of a calculation multiplier delay versus the absolute boost error pressure is set forth. As can be seen as the boost error decreases the frequency of calculations decreases. That is, as the boost error increases the frequency of calculations increases.

Figure 9E:
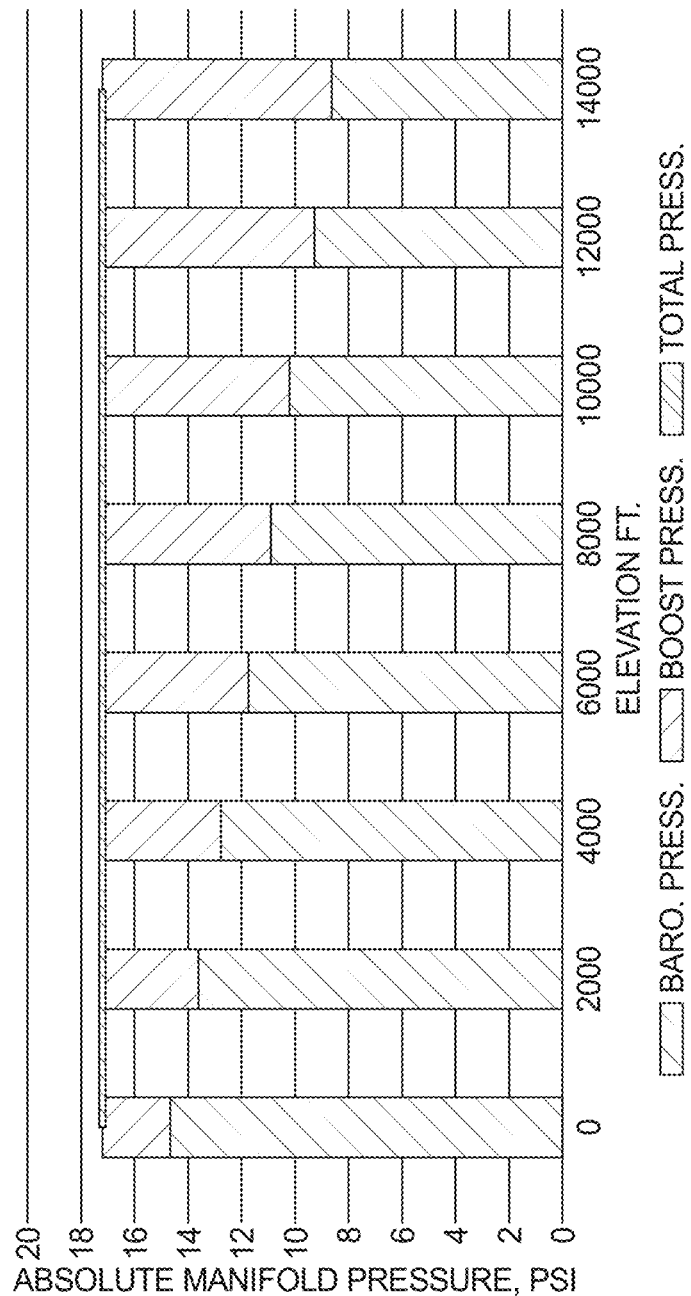
FIG. 9E is a graph illustrating the absolute pressure and changes over various altitudes.

Referring now to FIG. 9E, a plot of absolute manifold pressure versus elevation is set forth. The barometric pressure and the boost pressure change to obtain the total engine power or target absolute pressure. That is, the absolute pressure is a design factor that is kept relatively constant during the operation of the vehicle. As the elevation increases the amount of boost pressure also increases to compensate for the lower barometric pressure at higher elevations as well as increased intake air temperature.

Figure 9F:
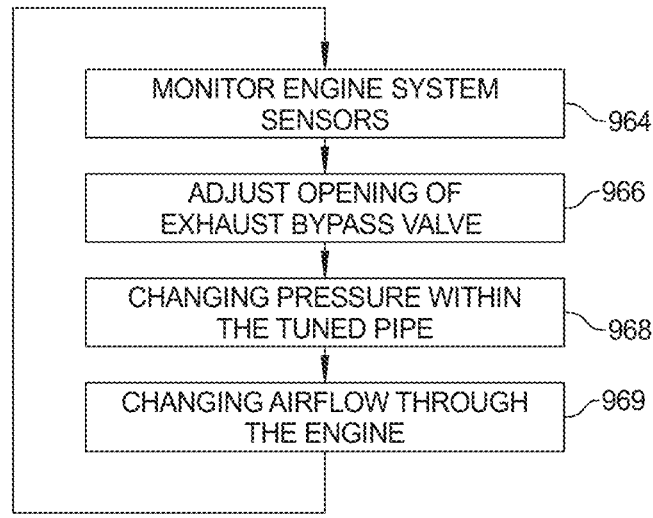
FIG. 9F is a flowchart of a method for controlling an exhaust gas bypass valve to increase power or stability of a two-stroke engine.

Referring now to FIG. 9F, a method for operating the exhaust gas bypass valve 740-740" is set forth. In this example the various engine system sensors are monitored in step 964. The engine sensors include but are not limited to the boost sensor 912, the engine speed sensor 914, the altitude/barometric pressure sensor 916, the throttle position sensor 918 and the tuned pipe pressure sensor 734.

In step 966 the exhaust gas bypass valve 740-740" is adjusted based upon the sensed signals from the sensors. The adjustment of the opening in step 966 may be calibrated based upon the engine system sensors during development of the engine. Depending upon the desired use, the load and other types of conditions, various engine system sensors change and thus the amount of stability and power may also be changed by adjusting the opening of the exhaust gas bypass valve.

In step 968, the pressure within the tuned pipe is changed in response to adjusting the opening of the exhaust gas bypass valve 740-740". In response to changing the pressure within the tuned pipe, the airflow through the engine is changed in step 969. When the airflow through the engine is changed the stability of the engine, the power output of the engine or the combustion stability or combinations thereof may also be improved. It should be noted that the opening of the exhaust gas bypass valve 740-740" refers to the airflow though the exhaust gas bypass valve 740-740". Thus, the opening may be opened and closed in response to the engine system sensors.

Figure 9G:
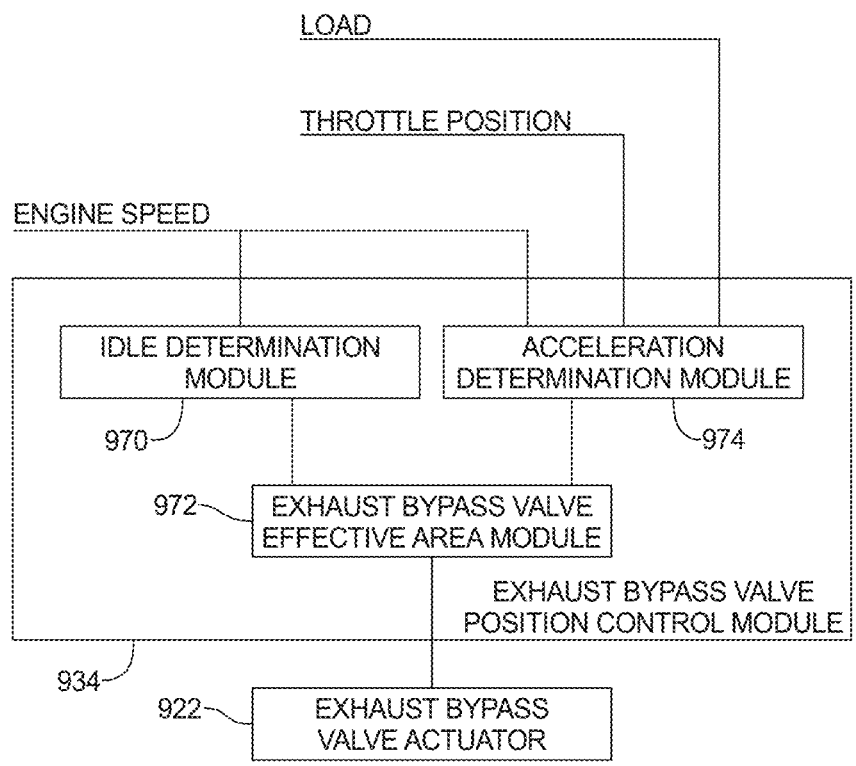
FIG. 9G is a block diagrammatic view of a first example of the exhaust gas bypass valve position control module.

Referring now to FIG. 9G, the exhaust gas bypass valve position control module 934 is illustrated in further detail. As mentioned above, the exhaust gas bypass valve effective area may be varied depending on various operating conditions. The addition of a turbocharger to a two-stroke engine adds the restriction of the turbine which causes the engine to respond slower than a naturally aspirated engine of similar displacement. The loss of response caused from the turbine may be viewed by a vehicle operator as turbocharger lag.

The exhaust gas bypass valve position module 934 is illustrated having various components used for controlling the exhaust gas bypass valve. An idle determination module 970 is used to receive the engine speed signal. The idle determination module may determine that the engine speed is below a predetermined speed. A range of speeds may be used to determine whether or not the engine is at idle. For example, a range between about 1000 and 2000 rpms may allow the idle determination module 970 to determine the engine is within or at an idle speed. Idle speeds vary depending on the engine configuration and various other design parameters. Once the engine is determined to be at idle the exhaust gas bypass valve effective area module 972 determines the desired effective exhaust gas bypass valve area for the exhaust gas bypass valve. The exhaust gas bypass valve effective area module 972 determines the opening or effective area of the exhaust gas bypass valve for the desired control parameter. For idle speed, a first effective exhaust gas bypass valve area may be controlled. That is, one effective exhaust gas bypass valve area may be used for idle speed determination. Once the exhaust gas bypass valve area is determined the exhaust gas bypass valve actuator 922 may be controlled to open the exhaust gas bypass valve a first predetermined amount. The exhaust gas bypass valve for idle may be opened a small effective area. That is, the exhaust gas bypass valve may be opened further than a fully closed position but less than a fully opened position. For exhaust gas bypass valve such as those illustrated in FIG. 6 above about twenty degrees of opening may be commanded during the idling of the two-stroke engine. By opening the exhaust gas bypass valve a predetermined amount some of the exhaust gases are bypassed around both the turbine portion 510 of the turbocharger 140 and the stinger 134 at the end of the tuned pipe. The effective predetermined area may change depending on various sensors including but limited to in response to one or more of the engine speed from the engine speed sensor, throttle position from the throttle position sensor or a detonation from the detonation sensor.

The exhaust gas bypass valve position control module 934 may also control the exhaust gas bypass valve position during acceleration or to improve engine stability. Acceleration of the engine may be determined in various ways including monitoring the change in engine speed, monitoring the throttle position or monitoring the load on the engine. Of course, combinations of all three may be used to determine the engine is accelerating. When the engine is accelerating as determined in the acceleration determination module 974 the exhaust gas bypass valve effective area module 972 may hold the exhaust gas bypass valve open a predetermined amount. The predetermined amount may be the same or different than the predetermined amount used for the engine idle. Again, some of the exhaust gases are bypassed around the stinger 134 and the turbine portion 510 of the turbocharger 140. The determined exhaust gas bypass valve effective area is then commanded by the exhaust gas bypass valve effective area module 972 to control the exhaust gas bypass valve actuator module 922. In a similar manner, the engine sensor may be used to monitor engine stability. In response, the wastegate may open for various amounts of time to increase engine stability.

Figure 9H:
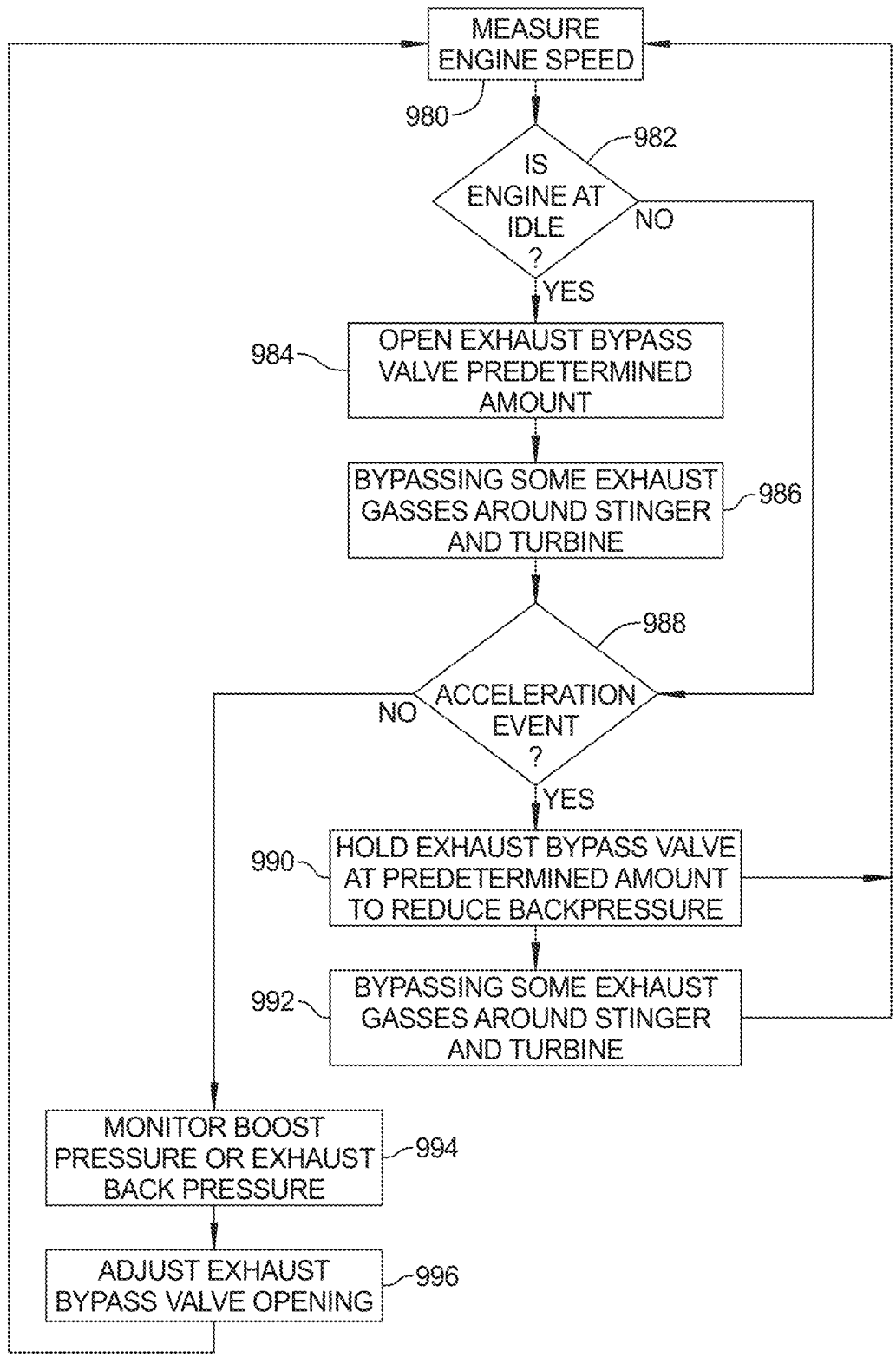
FIG. 9H is a flowchart of a method for operating the exhaust gas bypass valve in response to an idle and acceleration event.

Referring now to FIG. 9H, a method for operating the exhaust gas bypass valve in response to acceleration and idle is set forth. In step 980 the engine speed is determined. As mentioned above, the crankshaft speed may be used to determine the speed of the engine. In step 982 is to determine whether the engine is at idle. Determining the engine is at idle may be performed by comparing the engine speed to an engine speed threshold or thresholds. When the engine speed is below the engine speed threshold or between two different engine speed thresholds, the engine is at idle. When the engine is at idle, step 984 determines an effective area for the exhaust gas bypass valve and opens the exhaust gas bypass valve accordingly. In step 986 some of the exhaust gases are bypassed around the stinger 134 and the turbine portion 510 as described above.

When the engine is not at idle in step 982 and after step 986, step 988 determines whether the engine is in an acceleration event. As mentioned above, the acceleration event may be determined by engine speed alone, load alone or the throttle position or combinations of one or more of the three. When the engine is in an acceleration event step 990 holds the exhaust gas bypass valve to a predetermined amount to reduce the backpressure. The predetermined amount may be the same predetermined amount determined in step 984. The effective area may be controlled by the valve in the exhaust gas bypass valve or another type of opening control in a different type of exhaust gas bypass valve. In step 992 some of the exhaust gases are bypassed around the stinger 134 and turbine portion 510.

Referring back to step 988, if the engine is not in an acceleration event the engine operates in a normal manner. That is, in step 994 the boost pressure or exhaust backpressure is determined. In step 996 the exhaust gas bypass valve opening is adjusted based upon the boost pressure, the exhaust backpressure or both. After step 996 and step 992 the process repeats itself in step 980.

Referring now to FIGS. 10A, 10B, 10C and 10D, the compressor wheel 519, the turbine wheel 520 and the shaft 521 are illustrated in further detail. The compressor wheel 519 is used to compress fresh air into pressurized fresh air. The compressor wheel 519 includes an inducer diameter 1010 and an exducer diameter 1012. The inducer diameter 1010 is the narrow diameter of the compressor wheel. The exducer diameter 1012 is the widest diameter of the compressor wheel 519.

Figure 10A:
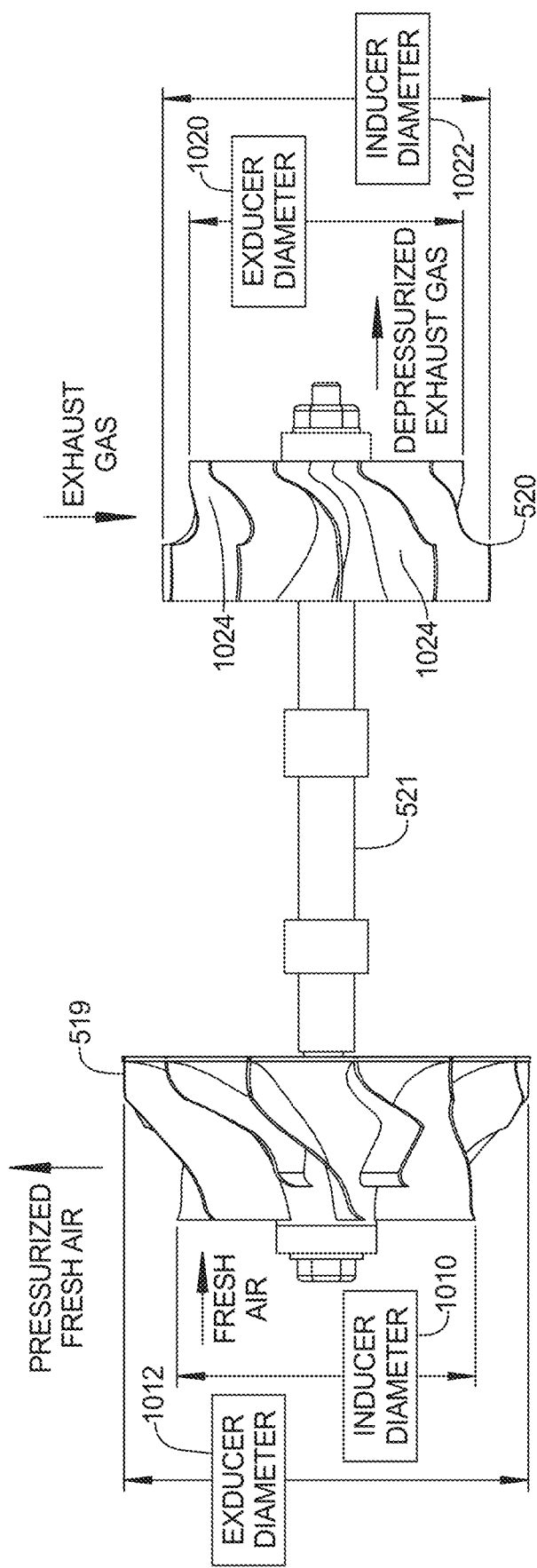
FIG. 10A is a side view of a rotor of a turbocharger.
Figure 10B:
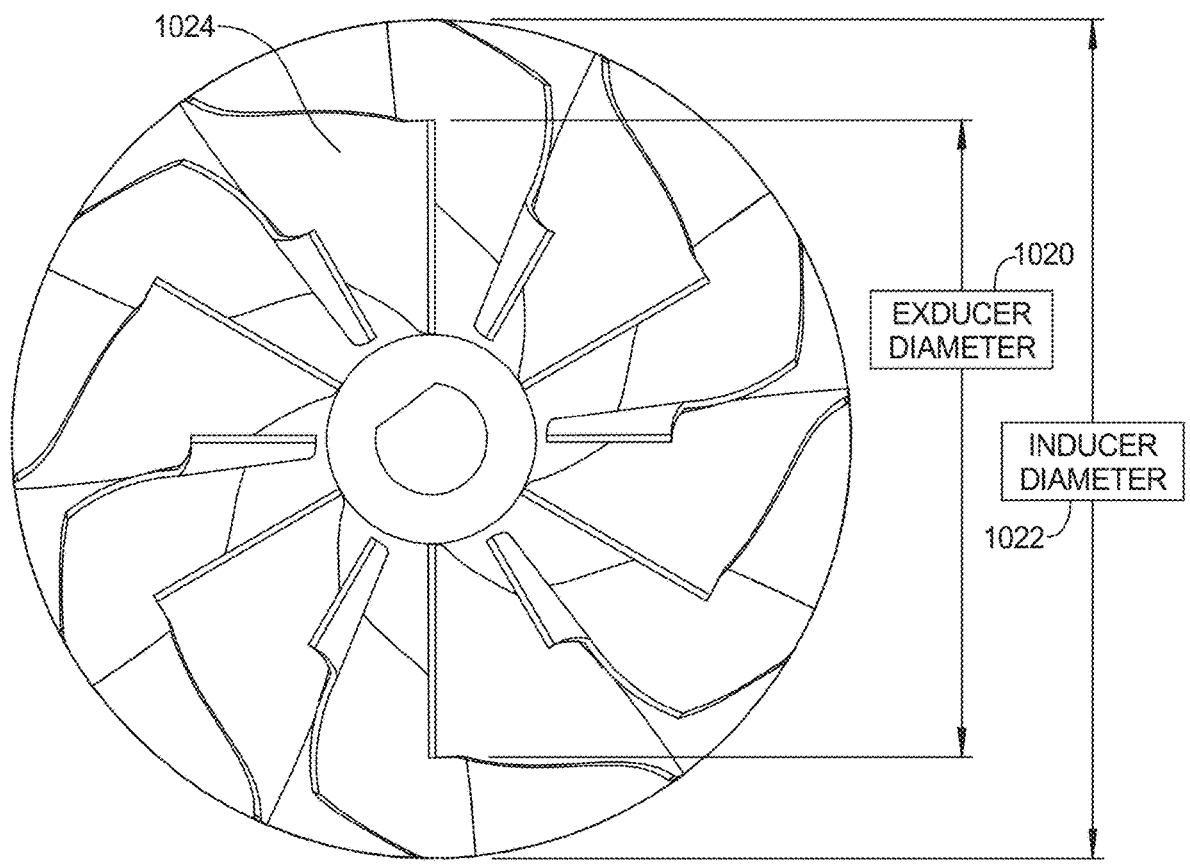
FIG. 10B is an end view of the rotor of FIG. 10A.
Figure 10C:
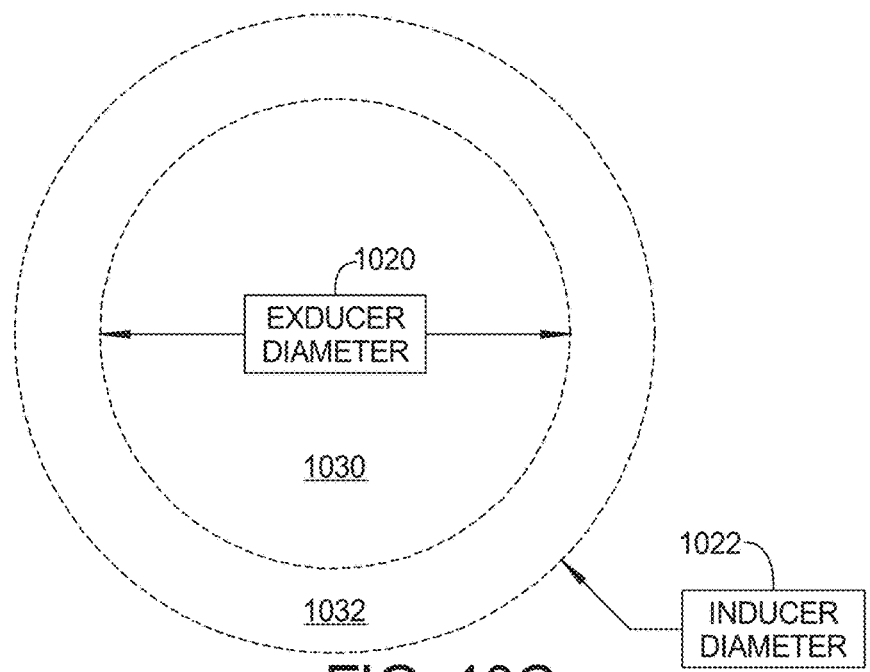
FIG. 10C is a diagrammatic representation of the exducer area.

The turbine wheel 520 includes an exducer diameter 1020 and an inducer diameter 1022. The exducer diameter 1020 is the small diameter of the turbine wheel 520. The inducer diameter 1022 is the widest diameter of the turbine wheel 520. That is, the top of the blades 1024 have the exducer diameter 1020 and the lower portion of the blades 1024 have the inducer diameter 1022. The exducer diameter 1020 is smaller than the inducer diameter 1022. The area swept by the blades 1024 is best illustrated in FIG. 10C which shows the exducer area 1030 and the inducer area 1032. The area of the port of the exhaust gas bypass valve was described above relative to FIG. 6G. The port area is the amount of area available when the valve member 614 is fully open. By sizing the area of the exhaust gas bypass valve port in a desirable way the operation of the two-stroke engine performance is increased. As has been experimentally found, relating the exhaust gas bypass valve effective area (port area) to the area of the turbine wheel exducer is advantageous. The exducer area 1030 may be determined by the geometric relation π times half of the exducer diameter squared. By way of a first example, the port area for a two-stroke engine may be greater than about thirty-five percent of the exducer area. The port area of the exhaust gas bypass valve may be greater than about fifty percent of the exducer area. In other examples the port area of the exhaust gas bypass valve may be greater than about sixty percent of the exducer area. In another example the port area of the exhaust gas bypass valve may be greater than about sixty-five percent of the exducer area. In yet another example the port area of the exhaust gas bypass valve may be greater than about sixty-five percent and less than about ninety percent of the exducer area. In another example the port area of the exhaust gas bypass valve may be greater than about sixty-five percent and less than about eighty percent of the exducer area. In yet another example the port area of the exhaust gas bypass valve may be greater than about seventy percent and less than about eighty percent of the exducer area. In yet another example the port area of the exhaust gas bypass valve may be greater than about seventy-five percent and less than about eighty percent of the exducer area.

As is mentioned above, the exhaust gas bypass valve may be incorporated into a two-stroke engine. The exhaust gas bypass valve may be in communication with the tuned pipe 47 and bypassing the turbocharger through a bypass pipe 136. The exhaust gas bypass valve 138 may be coupled to the center portion of the tuned pipe 47 The effective area of the port is determined using the diameter P1 shown in FIG. 6G and subtracting the area of the valve member 614 and the axle 618.

Figure 10D:
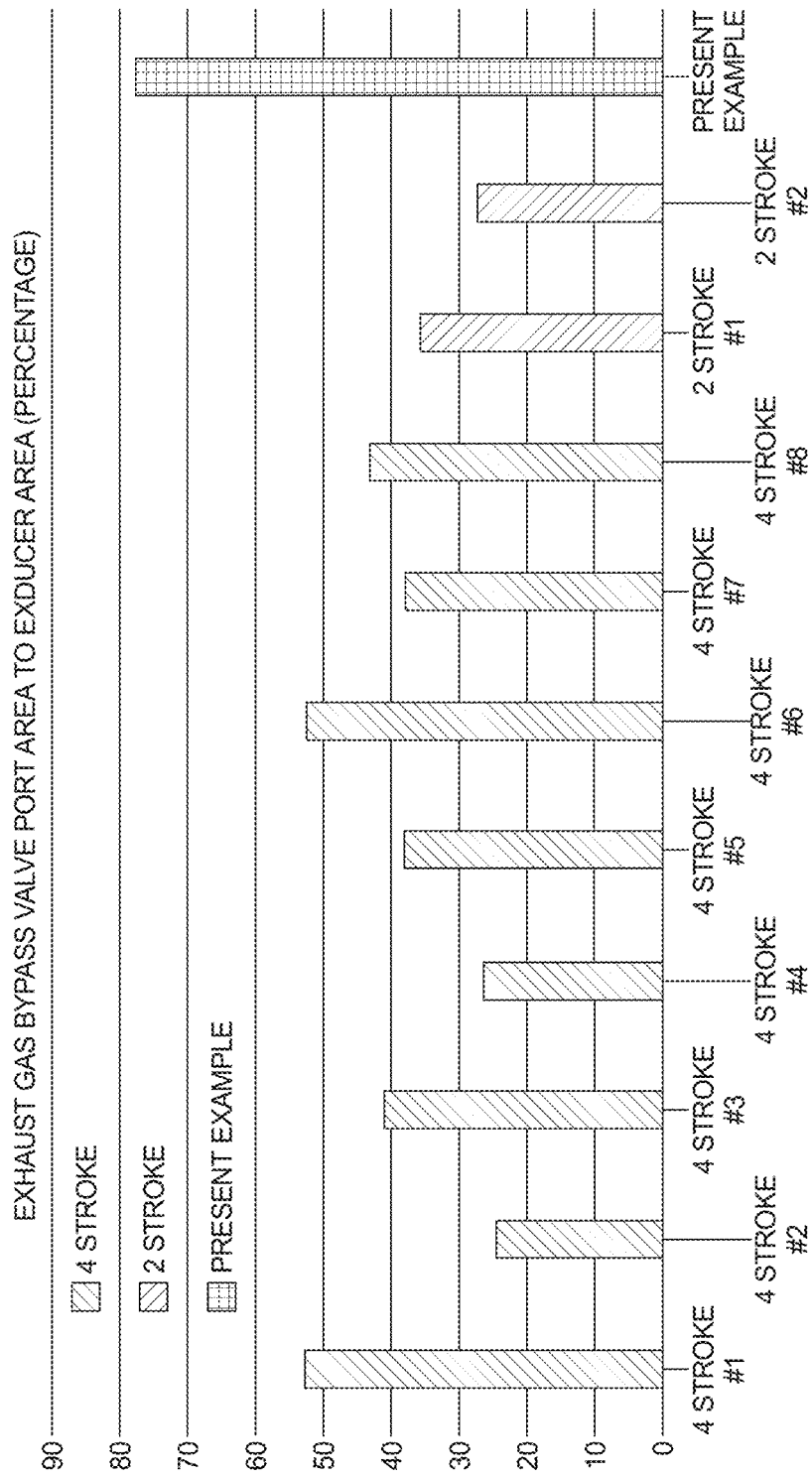
FIG. 10D is a plot of the ratio of exhaust gas bypass valve or bypass valve area to exducer area for known four stroke engines, two stroke engines and the present example.

Referring now to FIG. 10D, a plot of the ratio/percentage of exhaust gas bypass valve or bypass valve area to exducer area for known four stroke engines, two stroke engines and the present example are illustrated. As was observed, providing a higher ratio improved engine performance. The ratios or percentages may be used is four stroke and two stroke engines. From the data set forth is FIG. 10D, four stoke engines have a maximum ratio of the port area to the exducer area of 0.5274 or 52.74 percent and for two stroke engines a 35.54 percentage port area to exducer area was found.

Referring now to FIG. 11A, a portion of the controller 910 illustrated in FIG. 9A is set forth. One or more sensors 1110 are used to generate sensors signals that are communicated to a boost pressure set point 1112. The sensors 1110 may include one or more of the sensors illustrated in FIG. 9A such as the boost pressure sensor 912, the engine speed sensor 914, the atmospheric pressure sensor 916, the throttle position sensor 918, the tuned pipe pressure sensor 734, the exhaust valve position sensor 937, the exhaust manifold pressure sensor 939 and the denotation sensor 935. In particular, the sensors such as the engine speed sensor 914, the throttle position sensor 918, the exhaust manifold pressure sensor 939, the vehicle speed sensor 939A, the exhaust gas temperature sensor 939B, the exhaust valve position sensor 939C, and the post compressor temperature sensor 939D may be used to determine a boost pressure set point. The measured boost pressure from the boost pressure sensor 912 is communicated to a summation block 1114. From this, a boost error is determined.

Minimizing actuator movement at the boost target set point is important for engine performance because it creates a constant and predictable airflow through the bypass system for consistent engine speed and minimizes wear to the electronic actuator. A PID controller 1116 may be part of the controller 910. The PID controller uses the boost error to determine the gains to be used to change the position of the wastegate actuator. Ultimately, the gain Kp, Ki and Kd are determined at blocks 1118, 1120 and 1122, respectively. The gains are determined from a look-up table 1124 in one example. Other examples for determining the gains are provided below. As set forth in more detail below, the distance from the set point or a threshold or thresholds may be used to compare to the boost error determined in the boost error determination module 930. The gains determined in boxes 1118-1122 are used as part of the system transfer function 1130. Ultimately, the exhaust valve position control module 934 uses the gains to determine an amount of wastegate position change that is desired from the current position. The change of the wastegate position is ultimately measured by the boost pressure sensor error 912.

Referring now also to FIG. 11B, the boost pressure set point 1112 is illustrated graphically relative to a first boost pressure threshold 1140 and a second boost pressure threshold 1142. The boost error may be a positive number or a negative number. That is, error is the boost pressure minus the target pressure. When the boost pressure is greater than the target value at a value above the threshold 1140, high gains may be provided. The high gain corresponds to a high wastegate position change. When the target pressure is much greater than the boost pressure, the value might be significantly negative and therefore past or lower than the threshold 1142. A high gain with a high wastegate position change may be provided. In the area between the first threshold 1140 and the second threshold 1142, low wastegate change may be provided. That is, only a small amount of wastegate position change may be desired in the area between the thresholds 1140 and 1142. This helps mitigate over-boost or over-shoot situations on a transient response. The system is used for a two stroke application in which it is desirable to have a fast response and stable actuator movement between near the set point. A typical PID controller may present an undesirable situation in trying to balance two competing requirements. The use of variable gains allows a more flexible pressure control loop to provide fast pressure response on transient situations while providing exceptional PID control stability at the set point due to the reduced gains which translate to smaller wastegate positions changes. The use of variable gains may also be gradual in the look-up table. That is, as the distance from the boost set point increases, the amount of change may increase in the positive and negative directions. This control system also reduces the need for individual term dead-bands near the set point because the gains can be brought to near zero to prevent cycling about the set point on a highly unstable airflow system. The pressure stability is also increased because undershoot and over compensation of PID control near the set point is prevented.

Figure 11C:
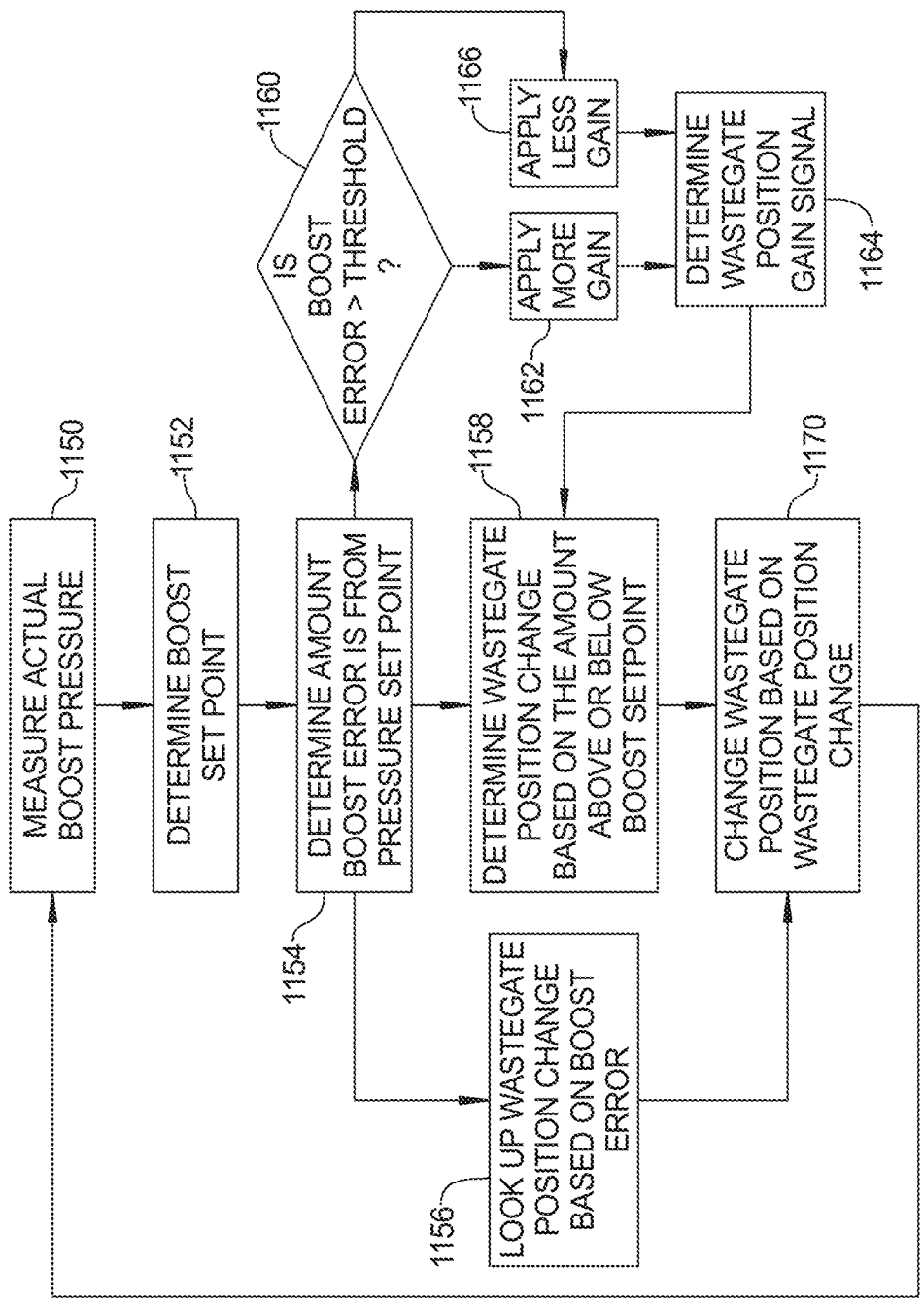
FIG. 11C is a flowchart of a method for changing the wastegate position.

Referring now to FIG. 11C, a method of operating the system is set forth. In this example, the actual boost pressure is measured at step 1150. In step 1152, the boost set point is determined. The boost set point may be determined from various sensors including sensors indicative of the desired response from the system operator including the throttle position. In step 1154, the boost error is determined by comparing or subtracting the actual boost pressure and the boost set point. After step 1154, three alternatives are provided for ultimately changing the wastegate position based upon the wastegate position change signal as is determined. In step 1156, the wastegate position change signal that is based on the boost error signal is derived from the look-up table. As mentioned above, a low amount of gain or a low amount of wastegate position change is determined close to the set point. After step 1156, the wastegate position based on the wastegate position change signal is generated. Ultimately, the system continually repeats at step 1150. In step 1158, the wastegate position may be based upon the amount of distance above or below a set point. The amount of wastegate position change may be directly calculated based upon the boost pressure amount above or below a boost set point. This may be a linear or non-linear function. In step 1160, it is determined whether the boost error is greater than a threshold. The boost error may be an absolute value of the boost error because the boost error may be above or below the set point, thus being a negative number. When the boost error is greater than the threshold, meaning above the first threshold 1140 or below the second threshold 1142 in step 1160, step 1164 determines the wastegate position gain signal or the wastegate change signal accordingly. It should be noted that the thresholds 1140, 1142 may be different distances from the boost set point. Therefore, step 1160 may be replaced by determining whether the boost is above the first boost threshold 1140 or below the set threshold 1142 illustrates in FIG. 11B.

When the boost error is not greater than the boost error threshold in step 1160, step 1166 applies less gain which is used in step 1164 to calculate the wastegate position gain signal or the wastegate change signal. After step 1164, step 1158 is again performed to determine the wastegate position that is based upon the amount of distance above or below a set point. The amount of wastegate position change may be directly calculated based upon the boost pressure amount above or below a boost set point. Thereafter, step 1170 the wastegate position is changed based upon the wastegate position change signal. Ultimately, this system continually repeats to reposition the wastegate based upon the various sensors.

Figure 12A:
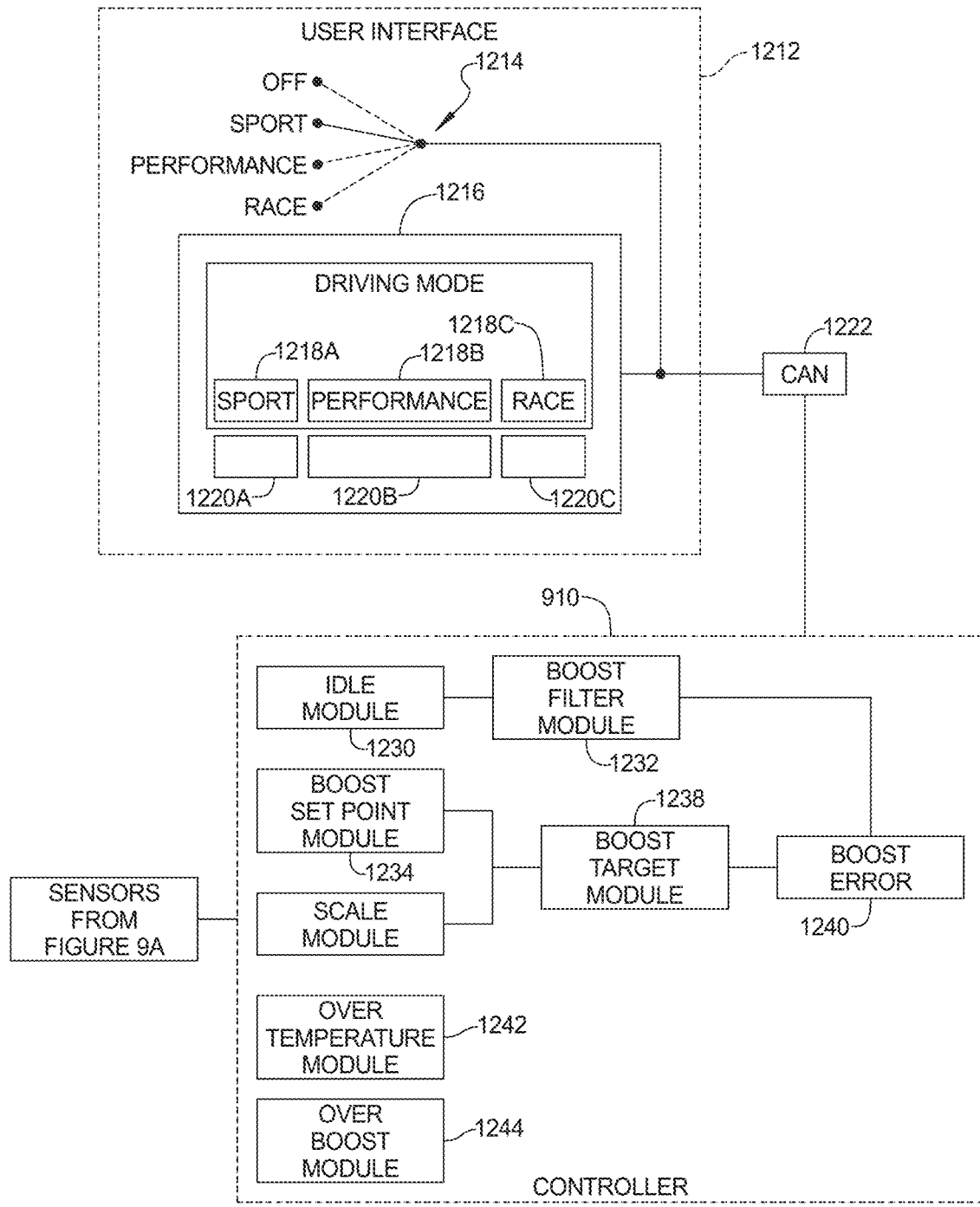
FIG. 12A is a block diagrammatic view of a system for allowing the user to select a boost mode.

Referring now to FIG. 12A, turbocharged two-stroke engines create substantially more power in higher elevations than naturally aspirated snowmobile engines which leads to a more difficult operating experience because the power delivery may be too much for an unskilled operator. Aftermarket turbocharger kits are difficult to handle in challenging situations. Riders of different skill levels desire different performance characteristics so they do not feel overwhelmed. In the following example, the controller 910 of FIG. 9A is illustrated in further detail. For simplicity sake, the sensors 912-918, 734, 937, 939, 935, 939A,939B, 939C, and 939D are not set forth but are incorporated by reference. In this example, an user interface 1212 is shown as a switch 1214 that has various positions such as an off position, a sport position, a performance position and a race position. Of course, those skilled in the art will recognize that the names and the number of selectable features may be varied. In addition, a touch screen user interface 1216 is illustrated. The touch screen user interface 1216 includes touch screen button 1218A that corresponds to a sport mode, touch screen button 1218B that corresponds to a performance mode and touch screen button 1218C that corresponds to a race mode. Of course, the touch screen interface may also include physical buttons 1220A-1220C that correspond to the sport, performance and race modes, respectively. Further, a separate "off" button may be provided. Of course a second selection of the touch screen buttons 1218A-C or physical buttons 1220A-C may turn the particular mode off. As mentioned above, the wording or descriptors of the various modes and the number of modes may change. Also, in a constructed example, one of the switch 1214, the touch screen user interface 1216 or the physical buttons 1220A-1220C may be provided.

The user interface 1212 is coupled to the controller 910 through a controller area network 1222. The controller area network communicates the signals corresponding to the switches that provides a mode signal to the controller 910.

The controller 910 includes an idle module 1230 that determines whether the vehicle is idling. The idle module communicates signals to a boost filter module 1232. A boost set point module 1234 and a scale module 1236 communicates signals to the boost target module 1238. The boost target module 1238 communicates a signal to the boost error module 1240 which, in turn, receives signals from the boost filter module 1232. An overtemperature module 1242 may also be included within the controller 910. The overtemperature module 1242 provides correction for the condition where overtemperature is determined. An overboost module 1244 provides the controller 910 with a correction for overboost.

Figure 12B:
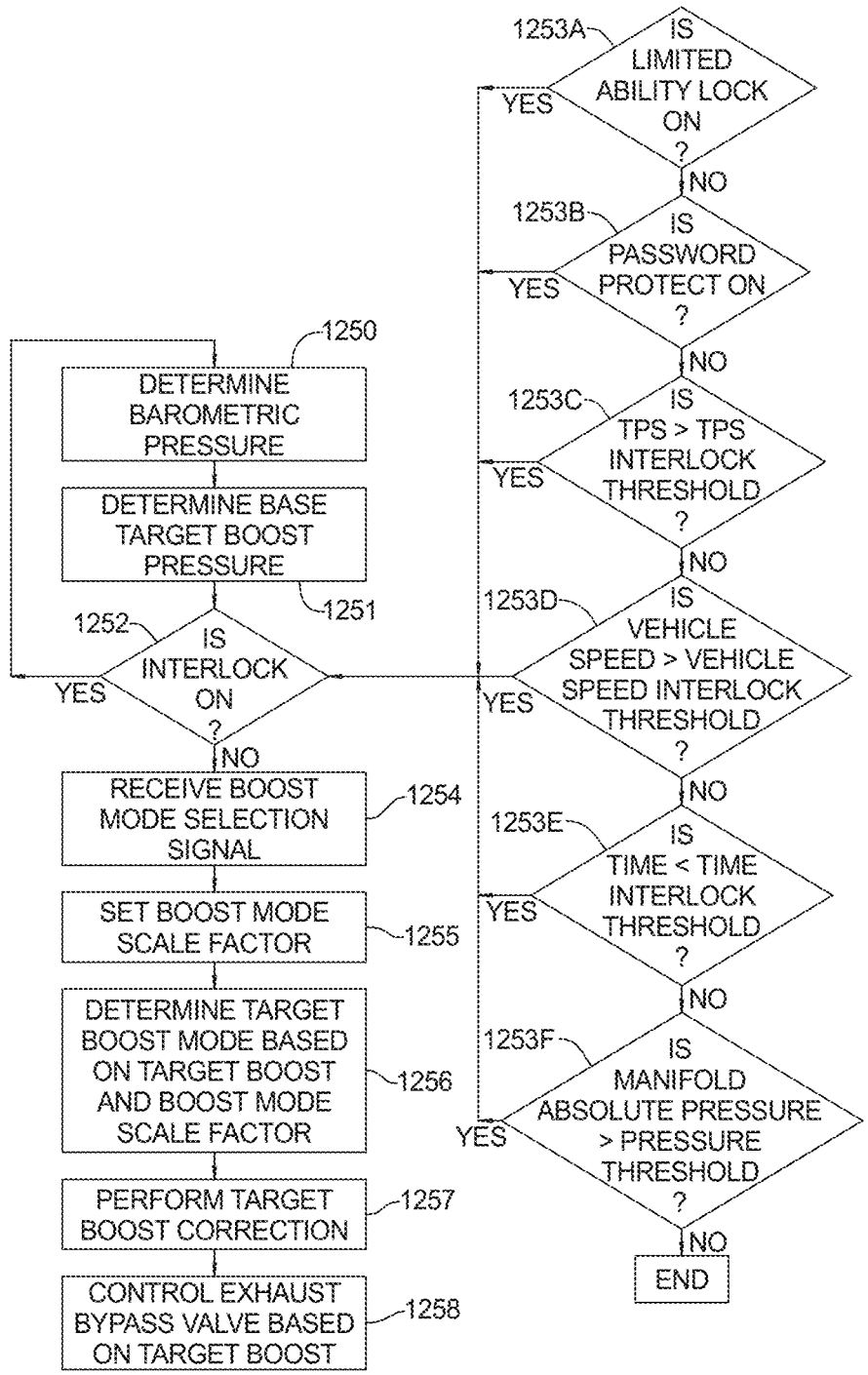
FIG. 12B is a flowchart of a method for allowing a user to select a boost mode.

Referring now to FIG. 12B, a method for controlling the system according to the user selectable interface is set forth. In step 1250, the barometric pressure is determined. In step 1251, the base target boost pressure is determined. In step 1252, it is determined whether an interlock is engaged. When an interlock is engaged in step 1252, step 1250 is again performed. The interlocks are set forth in steps 1253A-1253F. Various types of interlocks may prevent the user interface selection from being used to control the vehicle. For example, 1253A allows a limited ability user lock to be enabled. The limited ability user lock may be enabled by the user interface menus in which a limited ability user lock interface code or password may be set. Without knowing the password, the limited ability lock may prevent the system from using the user selectable modes. The limited ability user lock may also be referred to as a child lock. A password protection may also be provided in step 1253B. When a password is provided, the boost modes may not be selectable. Such a condition is suitable for the rental market in which certain modes may not be desirable for various users. In step 1253C, whether the throttle position sensor is generating a signal greater than the throttle position sensor interlock threshold is determined. That is, when the throttle position is high, meaning the throttle position is opened past an idle state or other threshold, the throttle position interlock threshold may prevent the system from being scaled according to the user interface. Likewise, in step 1253D, when the vehicle speed is greater than a vehicle speed interlock threshold, the scaling of the boost modes may not be performed. in step 1253E, the time may also be a factor for interlocking the system. That is, when the time is less than a time interlock threshold, the system may not allow for the user boost to be changed. In a similar manner, step 1253 prevents the user boost mode from activating when the absolute manifold pressure is greater than a pressure threshold. When at least one of the steps 1253A-1253F are true, the interlock is engaged. When the interlock is not engaged in step 1252, step 1254 receives a boost mode selection. As illustrated in FIG. 12A, the controller area network may provide the selection signal from the user interface. A boost mode scale factor is set in step 1255 according to the selection signal. In step 1256, the target boost mode based upon the target boost and the boost model scale factor is determined. In step 1257, the target boost correction is performed. The exhaust bypass valve is controlled based upon the target boost in step 1258.

Figure 12C:
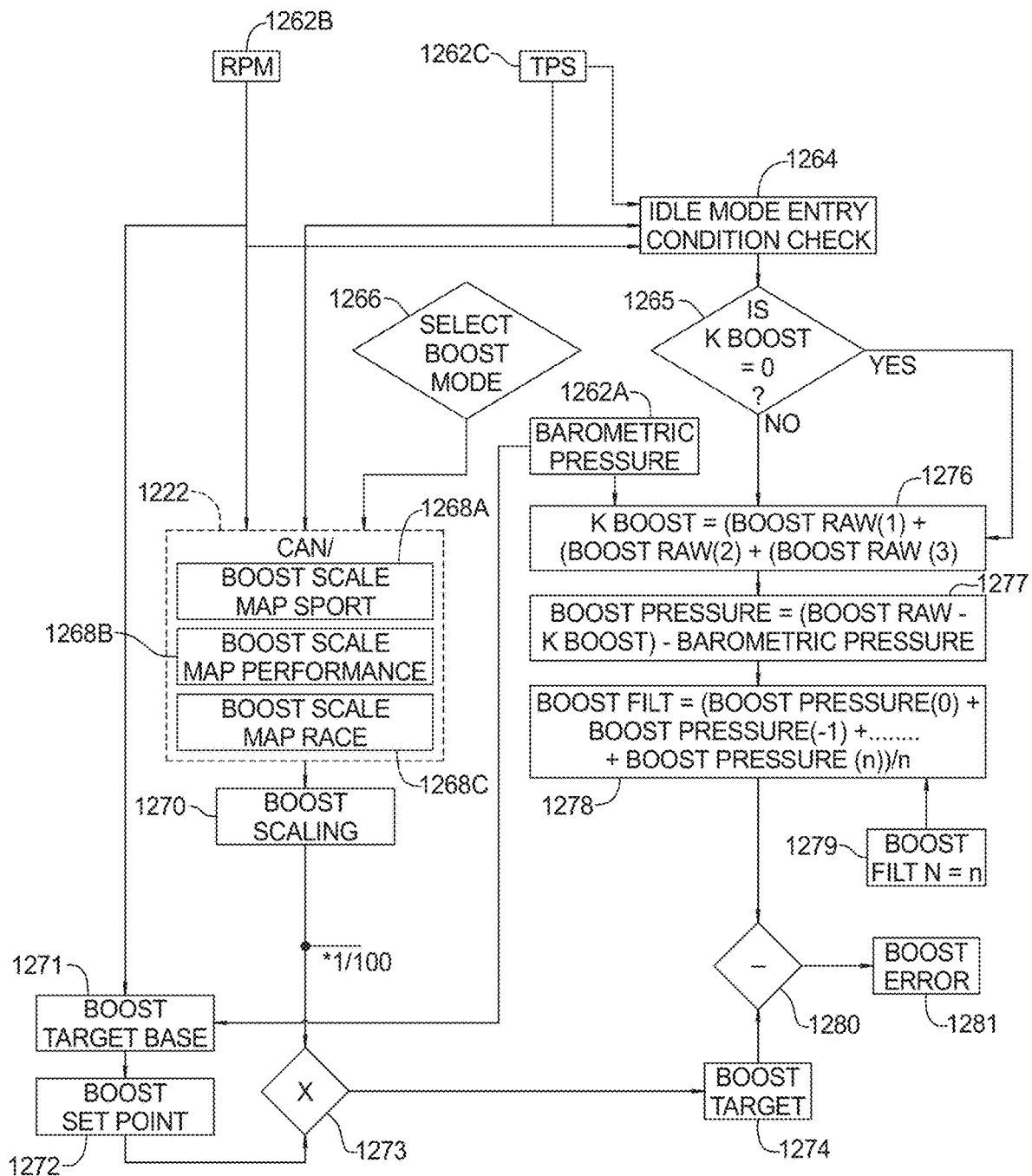
FIG. 12C is a flowchart of the control strategy of FIG. 12B.

Referring now to FIG. 12C, further details of the method for operating is set forth. In this example, the barometric pressure is determined in step 1262A, the engine speed is determined in step 1262B and the throttle position sensor signal that corresponds to the throttle position is determined in step 1262C. The throttle position is used to determine whether the idle mode is engaged. In step 1264, it is determined whether the idle model entry conditions are determined based upon the engine speed from step 1262B and the throttle position from step 1262C. After step 1264, step 1265 sets the parameter "Kboost" to 0 indicating the system is at idle mode. Kboost is determined once at startup and cleared when the engine is shut down.

In step 1266, determines the boost mode that is selected by the user interface. The user selection from step 1266, the throttle position from step 1262C and the engine speed from step 1262B are provided through the controller area network 1222. The scaling factor from the sport module 1268A, the performance module 1268B or the race module 1268C is provided to a boost scaling step 1270. The boost target base is determined in step 1271. The boost set point is determined in step 1272. The boost set point of step 1272 is determined from the boost target base in step 1271 which is determined from the barometric pressure from step 1262A and the engine speed from step 1262B. Of course, other factors described below may be used to change the boost target base. Ultimately, the boost scaling from step 1270 and the boost set point from step 1272 are combined in step 1273 and ultimately used to determine the boost target in step 1274. The vehicle is controlled using the boost target determined in step 1274.

Referring back to step 1265, the boost pressure readings in step 1276 are zeroed based upon three consecutive raw boost determinations. The boost pressure for idle uses the raw boost with the Kboost determined in step 1276. The boost pressure from step 1277 is used by step 1278 to determine the boost filter value. The boost filter value in this example uses a number of sample values from step 1277. In step 1279, the number of values used in step 1278 is provided. A differential block 1280 receives the filtered boost pressure and the target boost pressure in step 1274 to determine a boost pressure error in step 1281. The difference between the boost target pressure of step 1274 and the boost filter value of step 1278 that is calculated versus the scale boost value determines the boost error in step 1281.

It should be noted that when the boost scaling is performed in step 1270, the amount of scaling varies depending upon the user's selections. The amount of scaling may, for example, take place as a percentage of the set point.

Figure 13A:
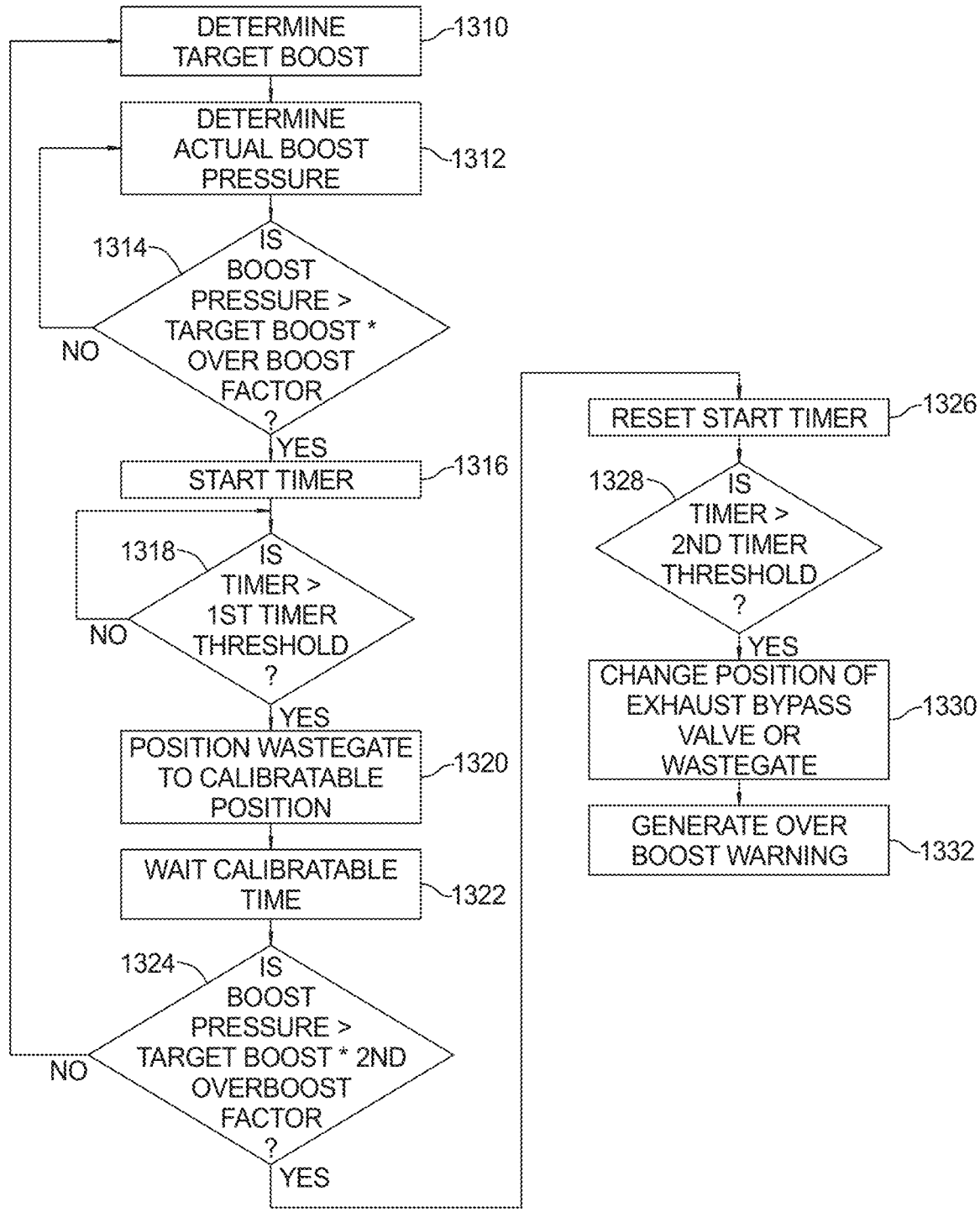
FIG. 13A is a flowchart of a method for preventing overboost in an engine.
Figure 13B:
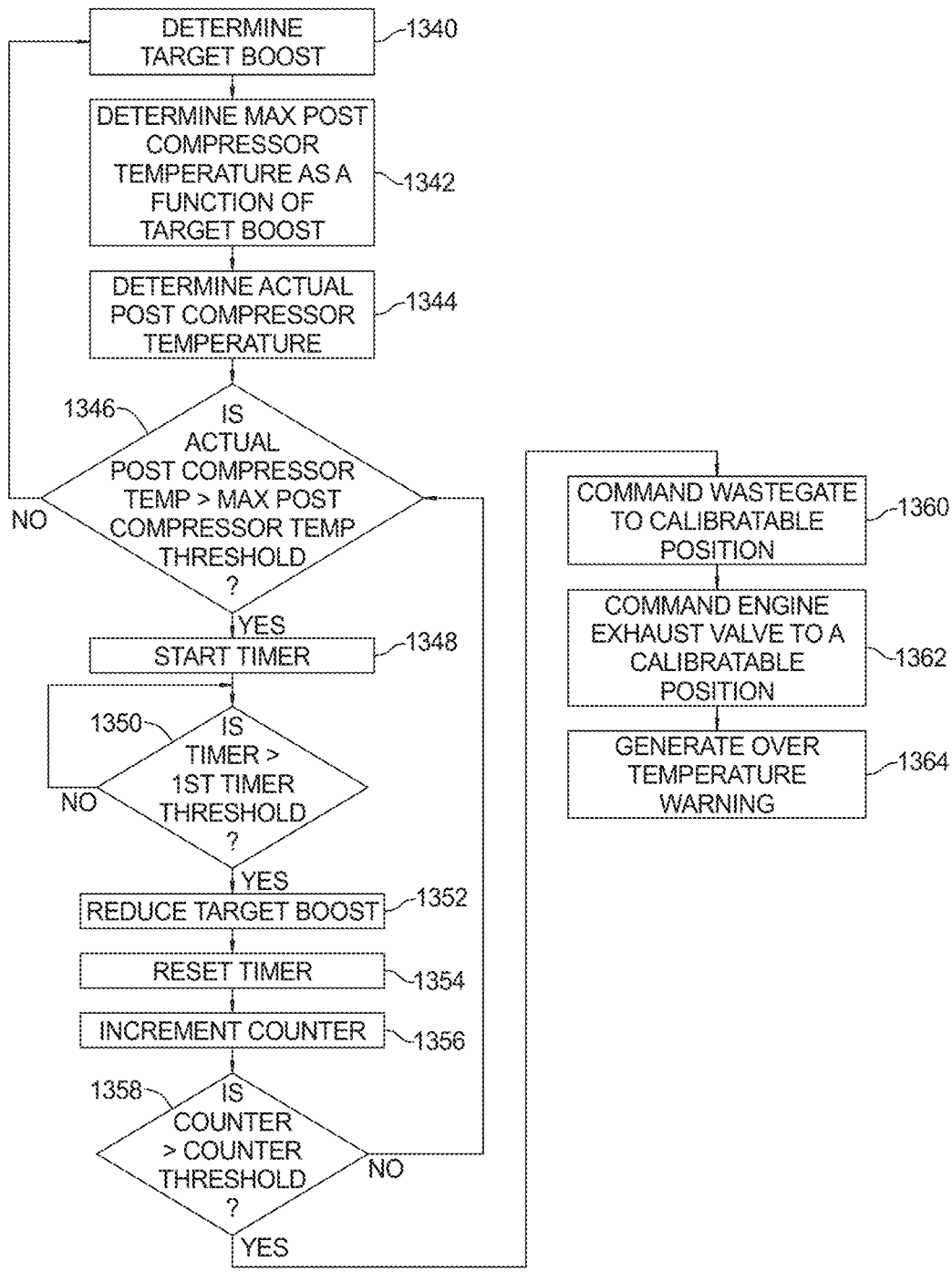
FIG. 13B is a flowchart of a method for preventing overtemperature in an engine.

Referring now to FIG. 13A, the operation of the overboost module 1244 of FIG. 12A is set forth. In FIGS. 13A and 13B, the control of the engine to prevent overboost or high post-compressor temperatures is set forth. This allows the engine to be protected without being very intrusive. That is, abrupt changes in the boost level are avoided. The low inertia and low weight of a snow vehicle is significantly impacted by the amount of power delivery of the engine. Abrupt changes in the amount of power provided leads to a feeling of instability and may ultimately lead to the vehicle being stuck.

In step 1310, the target boost is determined. As mentioned above, the target boost may be determined as described in reference to FIGS. 12B and 12C. In step 1312, the actual boost pressure is measured by a pressure sensor. In step 1314, when the boost pressure is greater than the target boost multiplied by a first overboost factor, step 1316 is performed. When the boost pressure is not greater than the target boost with the overboost factor, step 1312 is performed. The overboost factor is a predetermined amount that is calibratable by the system designer. The overboost factor is a numeric factor that allows the boost pressure to exceed the target boost by a predetermined amount. The overboost factor may be greater than one so that the target boost may be exceeded by a predetermined amount or percentage.

In step 1316, a timer is started. When the timer is greater than a first threshold in step 1318, step 1320 positions the wastegate to a calibratable position in step 1320. In step 1322, a calibratable time delay is waited.

In step 1324, if the boost pressure is not greater than the target boost with the overboost factor, step 1310 is again performed. In step 1324 when the boost pressure is greater than the target boost multiplied by a second overboost factor, step 1326 resets the timer and initiates the second timing process. The second overboost factor may be different than the first overboost factor of step 1314. In step 1328, if the timer is greater than a second timer threshold, step 1330 changes the position of the exhaust bypass valve or wastegate. The timer in step 1316 and 1326 allow a predetermined amount of time to pass before the values are changed. In step 1330, the amount of opening of the exhaust bypass valve or wastegate is changed. This may vary depending upon the difference between the boost pressure and the target boost or the target boost with the overboost factor. In step 1332, an overboost warning may be provided after the second attempt to change the boost pressure. The time delay in step 1322 and step 1326 is calibratable so that the air flow to the engine and therefore the power output of the engine has enough time to show some change. This allows the engine to be protected without being intrusive to the rider or leaving the rider stranded.

Referring now to FIG. 13B, a method for operating the overtemperature module 1242 of FIG. 12A is set forth. In this example, the target boost is determined in step 1340. In step 1342, the maximum post compressor temperature as a function of the target boost is determined. This may be a calibrated factor determined during development that may provided in a lookup table. In step 1344, the actual post compressor temperature is determined. The post compressor temperature may be determined by the post compressor temperature sensor 939D illustrated in FIG. 9A. In step 1346, the actual post compressor temperature is compared to the maximum post compressor temperature threshold. When the actual post compressor temperature is not greater than the maximum post compressor temperature threshold, step 1340 is again performed. In step 1346, when the actual post compressor temperature is greater than the maximum post compressor temperature threshold, step 1348 is performed in which a timer is started. In step 1350, the timer value is compared to a first time threshold. When the timer is greater than the first time threshold in step 1350, step 1352 reduces the target boost and resets the timer in step 1354. A counter is incremented in step 1356. When the counter is not greater than a counter threshold, step 1346 is again performed. In step 1358, when the counter is greater than the counter threshold, step 1360 commands the wastegate to a calibratable position. In step 1362, the electronically controlled engine exhaust valve or valves on a multicylinder engine is commanded to a calibratable position. In step 1364, an overtemperature warning is generated. The overtemperature warning may be an indicator light provided on the display of the vehicle. In the foregoing example, the first response loop continues for the calibratable number of loops and can continuously drop the target boost pressure until either the post compressor temperature drops below the above mentioned calibratable limit or the loop count reaches a calibratable value. When the loop count reaches the calibratable value, the system enters a second state of response in which the wastegate valve is commanded to a calibratable position and the exhaust valves of the engine are commanded to a calibratable position to protect the engine.

Figure 14A:
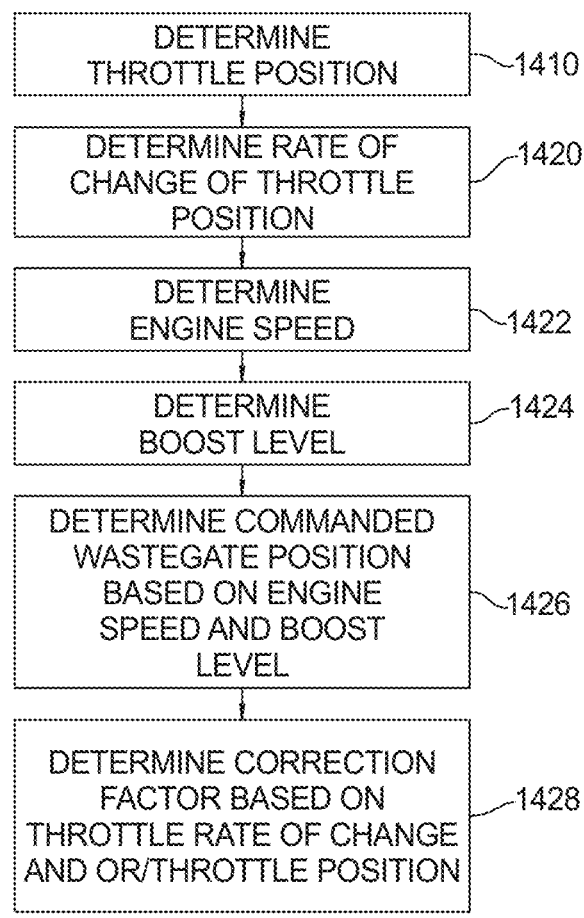
FIG. 14A is a flowchart of a method for controlling the wastegate based upon deceleration.

Referring now to FIG. 14A, a method for controlling the wastegate during deceleration of the vehicle is set forth. In the following example, the wastegate position is moved based upon the throttle position or the rate of change of the throttle or both. The method purposely opens the wastegate prior to a condition of overboost and may more fully open the wastegate than in an overboost condition as described above in FIG. 13A. This allows the overboost condition to be reduced and prevents poor scavenging through the engine that is caused by high exhaust pressure. Poor scavenging causes poor running quality and possible knock or denotation, or hesitation.

Figure 14B:
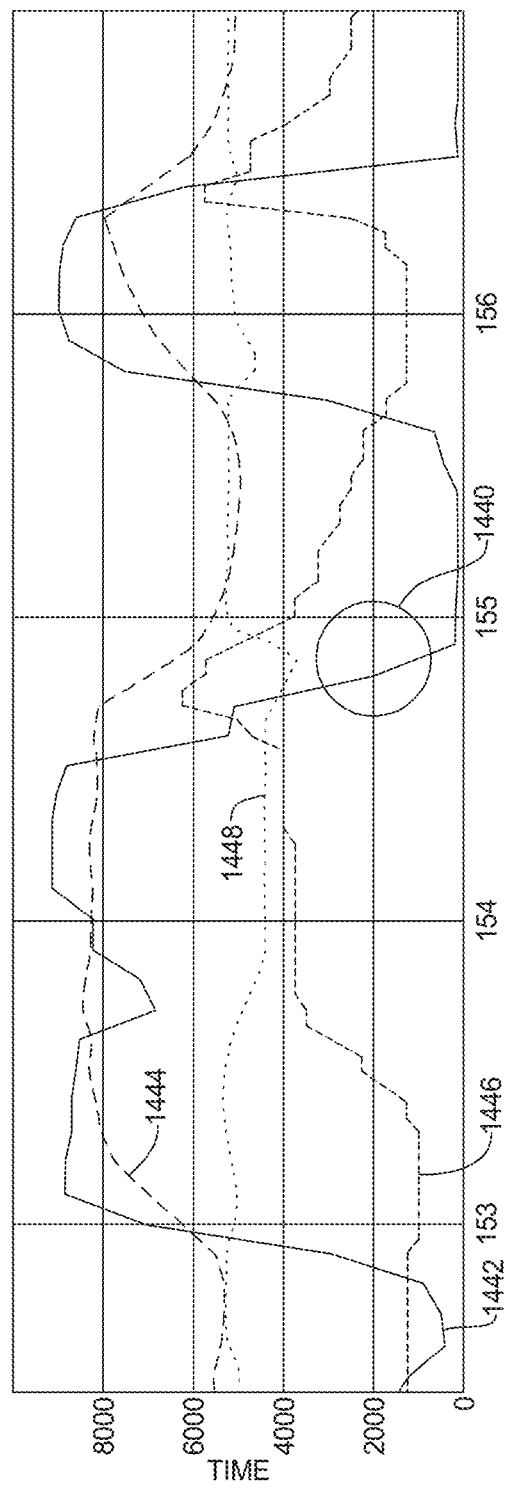
FIG. 14B is a signal diagram that shows the wastegate opening slightly based upon an overboost condition.
Figure 14C:
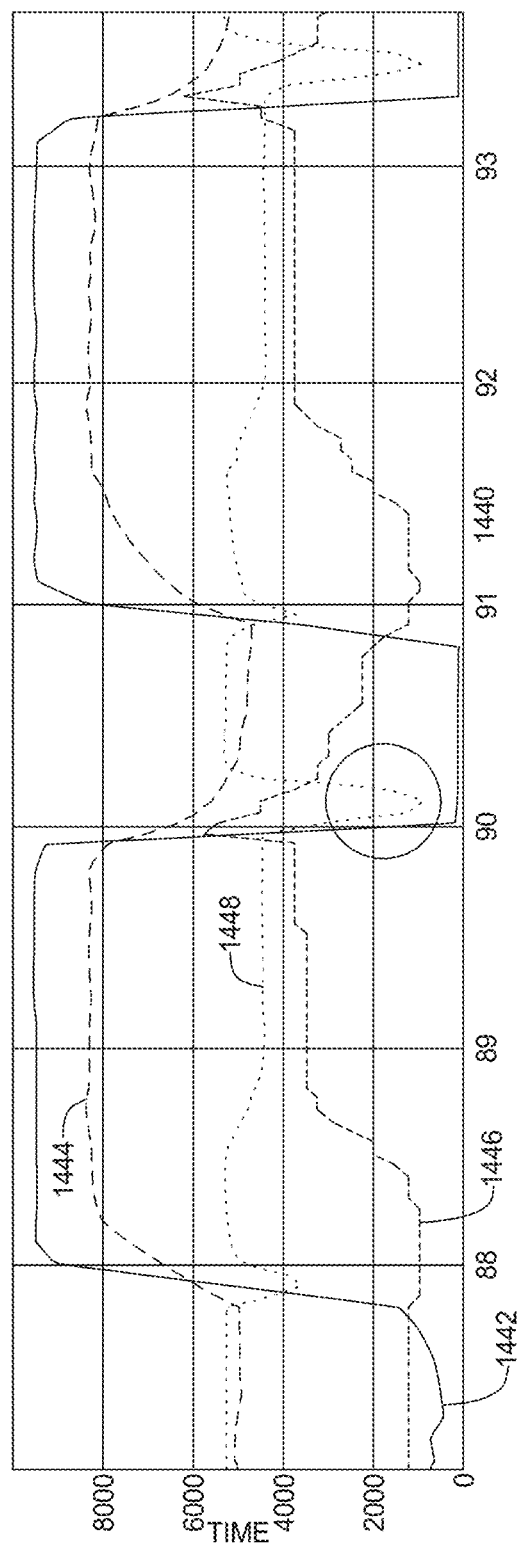
FIG. 14C is a signal diagram that shows driving the wastegate more fully opened based upon deceleration.

In step 1410, the throttle position is determined. in step 1420, the rate of change of the throttle position is determined. In step 1422, the engine speed is determined. A boost level is determined in step 1424. The boost level may be determined in various ways including that set forth in FIGS. 12A-12C. In step 1426, the commanded wastegate position is determined based upon the engine speed and the boost level. In step 1428, a correction factor is determined based on the throttle rate of change or the throttle position In FIG. 14B, the wastegate opens slightly based on an overboost condition in the region set forth in the area circled by the area 1440. The area 1440 circled is the throttle position sensor signal 1442. The engine speed is signal 1444 and the boost pressure is 1446. The wastegate actuator position is signal 1448. In FIG. 14C, the wastegate actuator position illustrated by signal 1448 is purposely driven to more fully open based upon the declining engine speed represented by the signal 1444. As can be seen by contrasting FIGS. 14B and 14C, the boost pressure 1446 does not obtain such a high level as that illustrated in FIG. 14B.

Figure 15A:
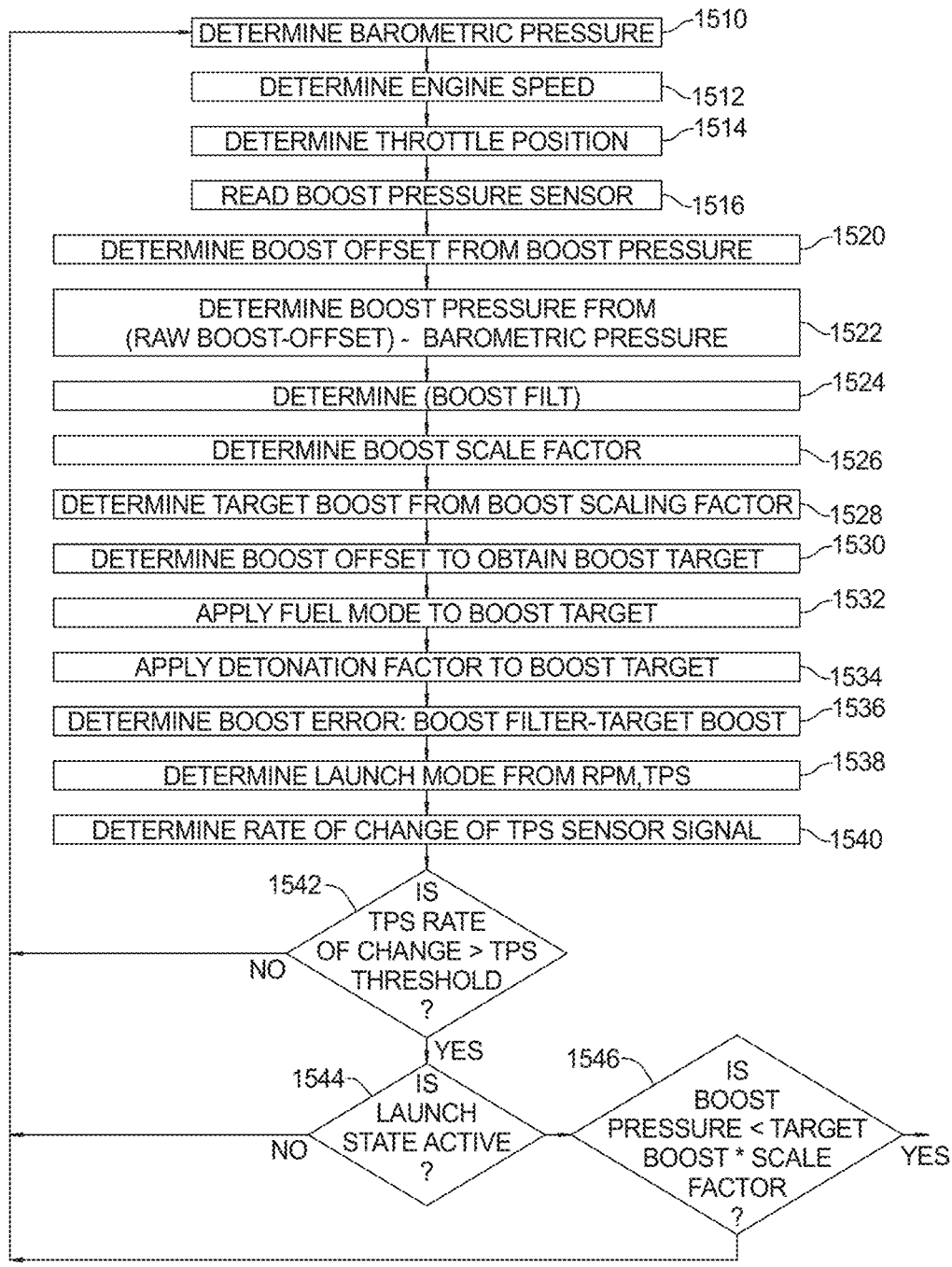
FIGS. 15A and 15B are flowcharts of a method for controlling the engine in an acceleration mode.
Figure 15B:
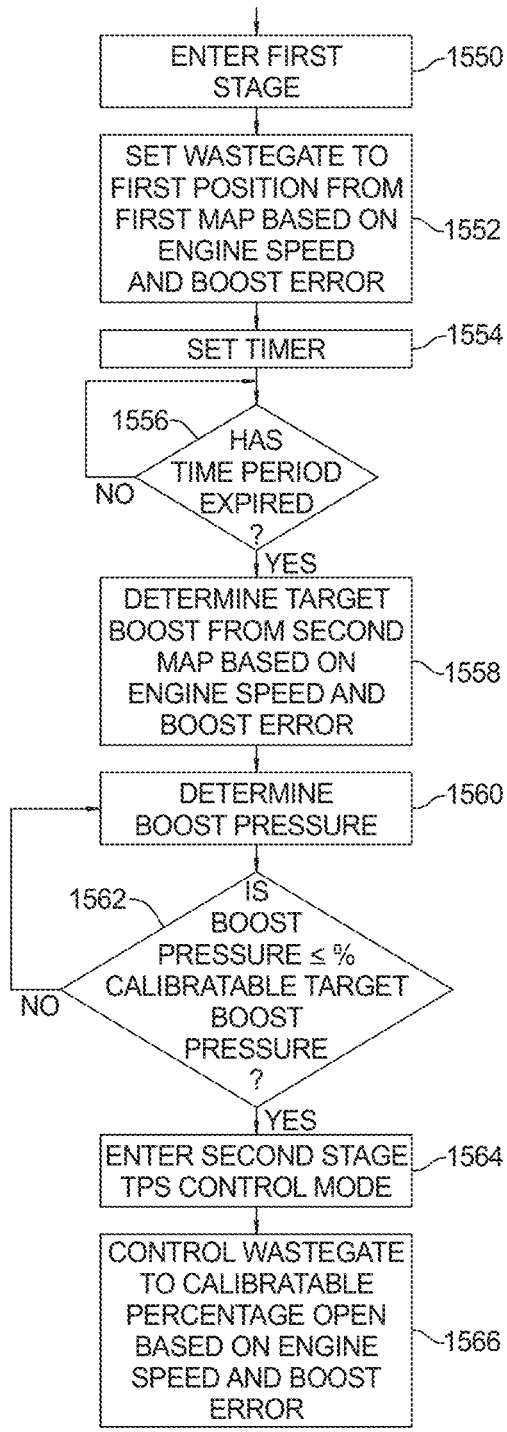

Referring now to FIG. 15A, one drawback to turbocharged snowmobiles is the time delay associated with the turbocharger building boost for the engine to accelerate. The use of a bypass control wastegate creates a parallel path from the tuned pipe to the silencer that allows for significant improvements in the off boost engine speed response. However, under very fast transients when the pipe pressure remains high and the turbocharger speed is low, the engine response requires a different amount of bypass airflow then it would during a slower transient response. In the following method, a two-stage specific wastegate control based on the engine speed and the boost error are used until the engine has reached a target boost set point.

Figure 15C:
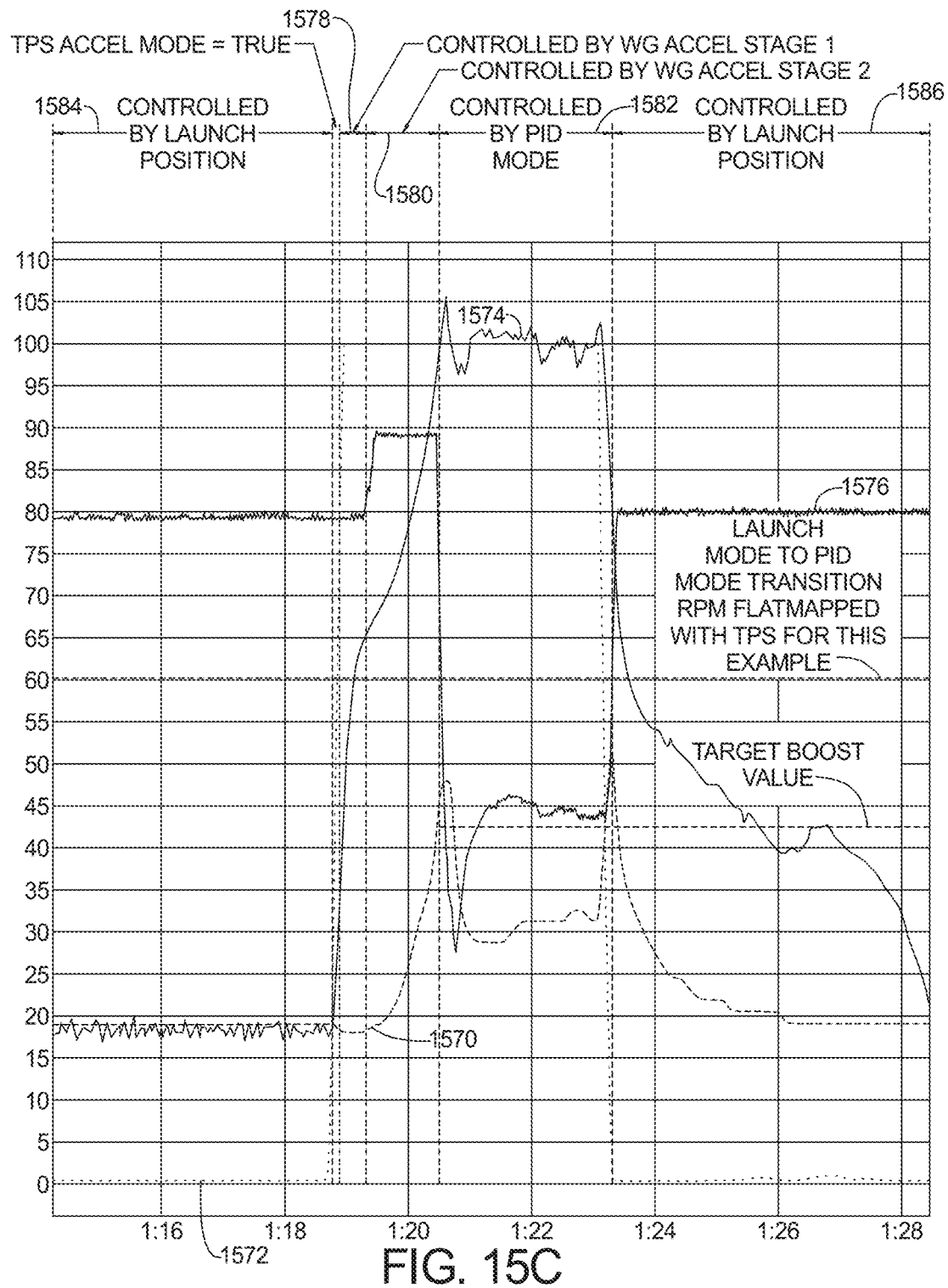
FIG. 15C is a signal diagram showing the engine when controlled for an acceleration mode.

In step 1510, the barometric pressure is determined from a barometric pressure sensor. In step 1512, the engine speed is generated from an engine speed sensor. In step 1514, the throttle position is determined from a throttle position sensor. In step 1516, the boost pressure is determined from a boost pressure sensor. It should be noted that step 1510 through 1516 are continually performed during the operation of the engine. In step 1518, the boost offset of Step 1520 is performed once when the engine is in an idle state upon power up of the engine controller (ECU) and stored therein. In step 1520, the boost offset is determined in a similar manner to that described above. The boost offset is used for zeroing using an average to get (Kboost). In step 1522, the boost offset and the raw boost from step 1516 are used together with a barometric pressure to determine the boost pressure. That is, the raw boost with the offset removed and the barometric pressure removed is used to obtain the boost pressure. A filtered boost pressure is determined in step 1524 which uses a number of boost pressure readings. That is, a number of samples may be averaged for the boost pressure reading to obtain the filtered boost pressure reading. In step 1526, a scale factor may be determined from the user settings as described above in FIGS. 12A-12C. In step 1528, a target boost from the boost scaling is generated. In step 1530, the boost offset is used to obtain the boost target. The fuel mode may also be used for changing the boost target in step 1532. Depending upon the type of fuel, a lookup table may be used for determining a fuel mode correction. In step 1534, a detonation factor may be used to adjust the boost target. In step 1536, a boost error, which is the filtered boost minus the target boost, is determined. In step 1538, based upon engine speed and the throttle position, a launch mode is determined. Launch mode is determined based upon the engine speed and the throttle position. This may be performed by referring to a table using a one or zero that defines whether the PID control of the wastegate is active at the operating point. In step 1540, it is determined what the rate of change of the throttle position sensor is. In step 1542, when the throttle position rate of change is greater than a throttle position rate of change threshold, step 1544 is performed. When the throttle position rate of change is not greater than the throttle position rate of change threshold, step 1510 is performed. In step 1544, when the launch state is not active, step 1510 is performed. When the launch state is active, the fixed position PID control is enabled. This is in contrast to when the boost error PID mode is activated. Thus, when the fixed position PID control is activated, the launch state is active and step 1546 is performed. Step 1546 determines whether the boost pressure is less than the target boost times a scale factor. Thus, when all three conditions of steps 1542-1546 are performed, step 1550 enters a first stage of acceleration mode. The wastegate enters a fixed position PID control stage that controls the wastegate position to a desired percentage opened based upon the engine speed and the boost error in step 1552. In step 1554, a timer is initiated. In step 1556, when the timer period has not expired, step 1556 is again performed. In step 1556, when the time has expired, step 1558 is performed to determine the target boost from a second map based upon the engine speed and boost error. In step 1560, the boost pressure is determined. In step 1562, if the boost pressure is below the target boost pressure multiplied by a scaling factor, then a second stage PID control mode is entered in step 1564. The second stage will be activated as long as the condition in step 1562 is true. In the second stage of 1564, step 1566 controls the wastegate to a calibratable percentage opened based upon the engine speed and the boost error. A separate control map different than the control map used in the first stage may be used. The control maps are determined during the development process. By implementing the multi-stage acceleration function, fast engine and turbocharger response is created and thus faster acceleration is achieved. Quicker acceleration for normally aspirated engines is achieved during a high rate of transients. The drivability of such a system in high-speed throttle drop conditions, which are common in tree riding, is achieved. Smoother transitions from a fixed state PID control to a boost pressure PID is achieved. The flexibility for acceleration control with distinct maps between stages is also achieved. The transition from the second stage boost PID to a target boost scaling conditional parameter in the second stage is performed while in the loop. A reduction in underboost condition is also achieved with low initial turbocharger speeds. Referring now to FIG. 15C, the engine speed signal is signal 1570. The throttle position is signal 1572. The boost pressure is signal 1574 and the wastegate position is 1576. The various stages of wastegate control are illustrated. A first region 1578 shows a first stage control. Region 1580 is controlled by the second stage. Region three is controlled in a PID mode at 1582.

Figure 16A:
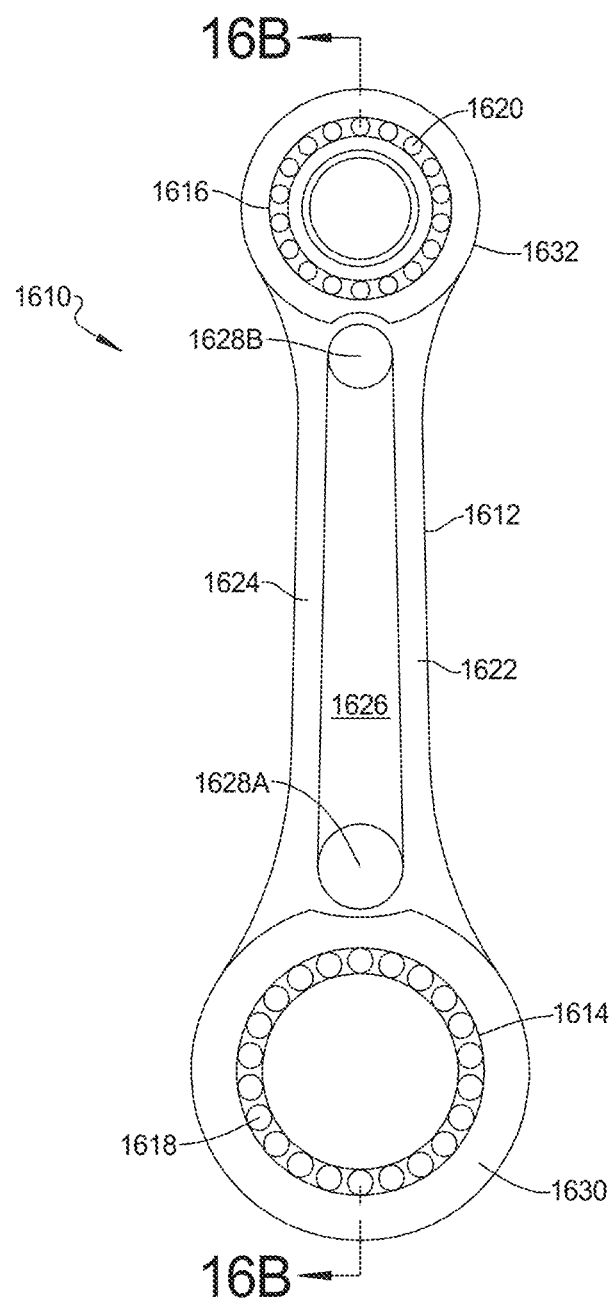
FIG. 16A is a front view of a connecting rod according to the present disclosure.
Figure 16B:
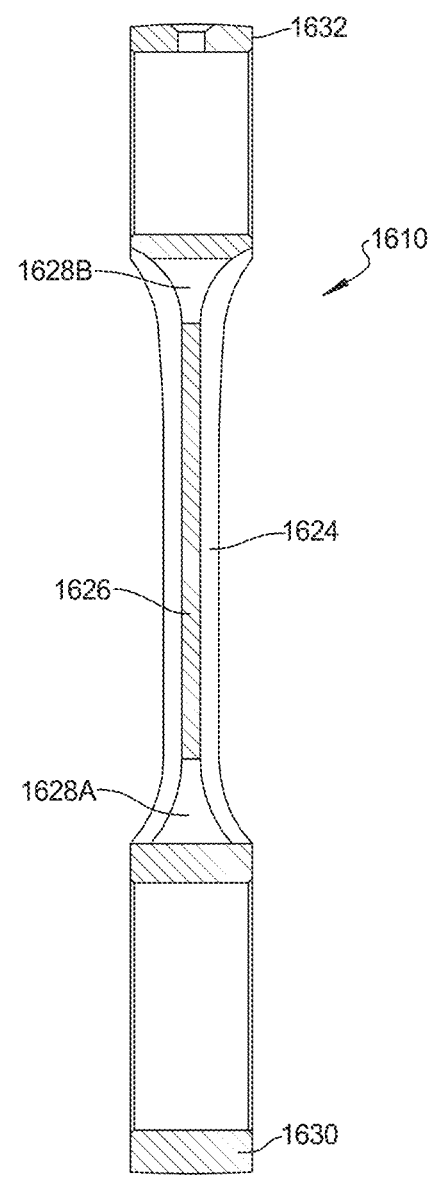
FIG. 16B is a cross-sectional view of the connecting rod.

Referring now to FIGS. 16A and 16B, a connecting rod 1610 is illustrated having a shank 1612 having a first bearing bore 1614 and a second bearing bore 1616, the first bearing bore 1614 has a first roller bearing 1618 disposed therein. A second roller bearing 1620 is disposed in the second bearing bore 1616. A description of one suitable example of a roller bearing is set forth below.

The shank 1612 has a first web portion 1622, a second web portion 1624 and a center portion 1626 disposed between the first web portion 1622 and the second web portion 1624. As is best illustrated in FIG. 16B, the thickness of the center portion 1626 is less than the thickness of the first web portion 1622 and the second web portion 1624. A first hole 1628A is disposed through the center portion 1626 adjacent to wall 1630 defining the first bearing bores 1614. A second hole 1628B is disposed within the center portion 1626 adjacent to the wall 1632 that defines the second bearing bore 1616. The holes reduce the stiffness near the bores, which balances the bearing roller forces to improve bearing life. Since the stiffness of the connecting rod 1610 at each end near the bores are difficult to affect with forging geometry changes, a machined hole or a plurality of holes after forging allows the desired stiffness to be achieved. The reduced stiffness in the shank near the bore balances the bearing roller forces and reduces the peak roller force during a compressive load due to distortion of the bearing bore. High roller forces in a needle roller bearing used in a connecting rod of a two-stroke engine causes spalling as well as overheating of the bearing. The high roller forces are due to the connecting rod stiffness preventing it from conforming to the shape of the bearing with a necessary clearance, which loads some rollers much more than others. The stiffness of the connecting rod in each end of the bore is difficult to affect with forging geometry changes. Ultimately, the reduction in stiffness causes the bearings to have increased life. The holes also reduce the connecting rod mass, which is highly desirable. The size and the location of the holes may be changed to balance the roller forces and optimize the weight.

Referring now to FIG. 16C, a combustion event having the forces on the roller bearing is illustrated. Plot 1650 shows roller forces on a connecting rod without a hole. Plot 1652 shows the plot of the roller forces with the holes. The peak roller force is thus reduced by marking a comparison and the forces are more balanced around the perimeter of the bearing bore.

Referring now to FIG. 16D, a plot of the inertia direction forces without the holes illustrated by lines 1654 and with the holes illustrated by lines 1656 are nearly identical and thus the inertia direction forces are unchanged.

Figure 17:
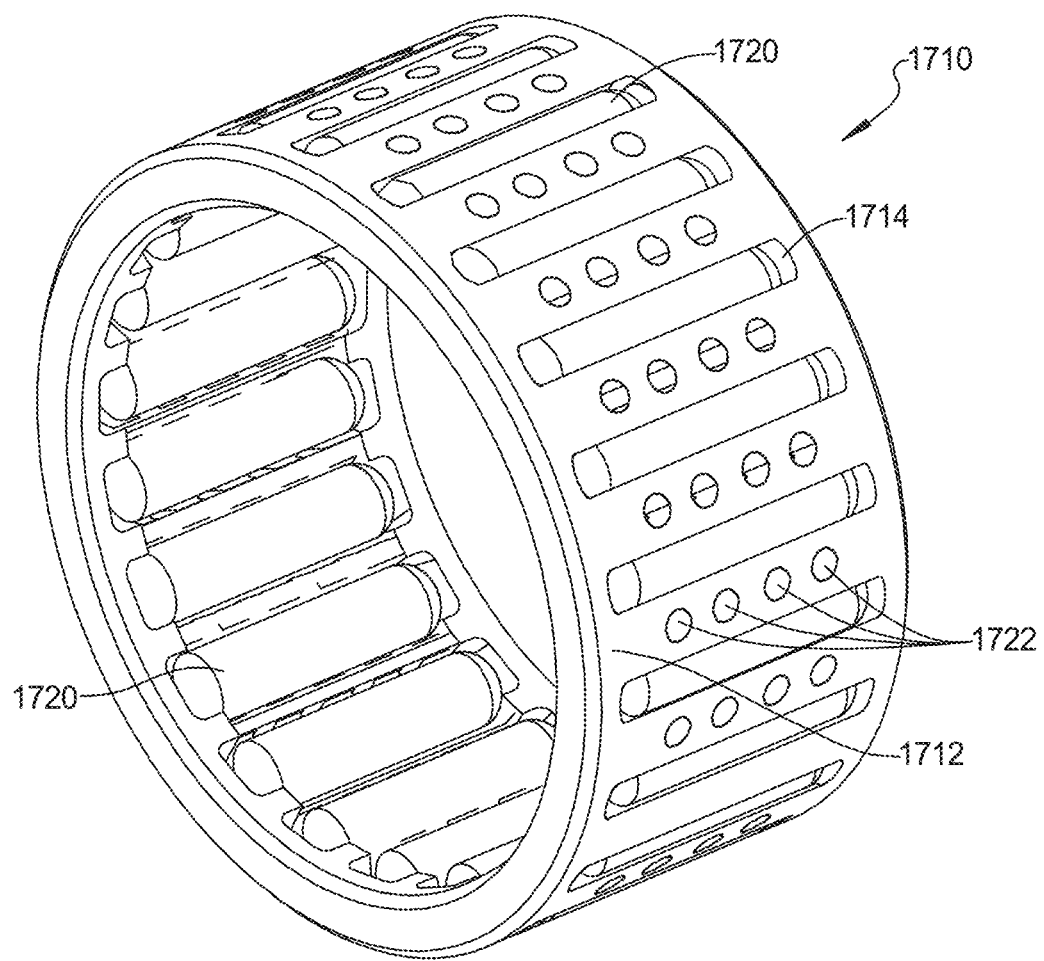
FIG. 17 is a perspective view of roller bearings according to the present disclosure.

Referring now to FIG. 17, a roller bearing 1710 suitable for use as roller bearing 1618 or 1620 of FIG. 16A is set forth. The roller bearings 1710 may be three dimensionally metal printed in a first half and a second half. The roller bearing 1710 has a cage 1712 with a plurality of longitudinal extending slots 1714. The longitudinally extending slots 1714 do not extend all the way to the furthest width or ends of the cage 1712. The cage may be printed with the needle rollers 1720 incorporated therein. This allows the needle roller 1720 to be encapsulated in the cage with no additional processing required. Holes 1722 through the space or longitudinally extending walls 1724 allow oil to pass through the cage. The cage 1712 may also be printed in halves for split rod bearing designs. Hollow sections are used to reduce the weight of the bearing with the process. The steel cage 1712 may be thinly coated with copper or silver during the printing process to reduce friction on all the surfaces. This eliminates the need for further processing or coating of the part after it is formed. As mentioned above, the needle roller bearing cage 1712 may be used in various locations on a vehicle, especially in a two-stroke engines where needle roller bearings are typically used.

In previous roller bearings with stamped bearing cages, the cage was crimped to encapsulate the rollers. Deformation caused by the process affected the roundness of the cage. The present process of three-dimensional printing reduces the deformation of the bearing cage. The lubricating holes allow more oil to pass through the bearing and increase the life of the bearing.

Figure 18:
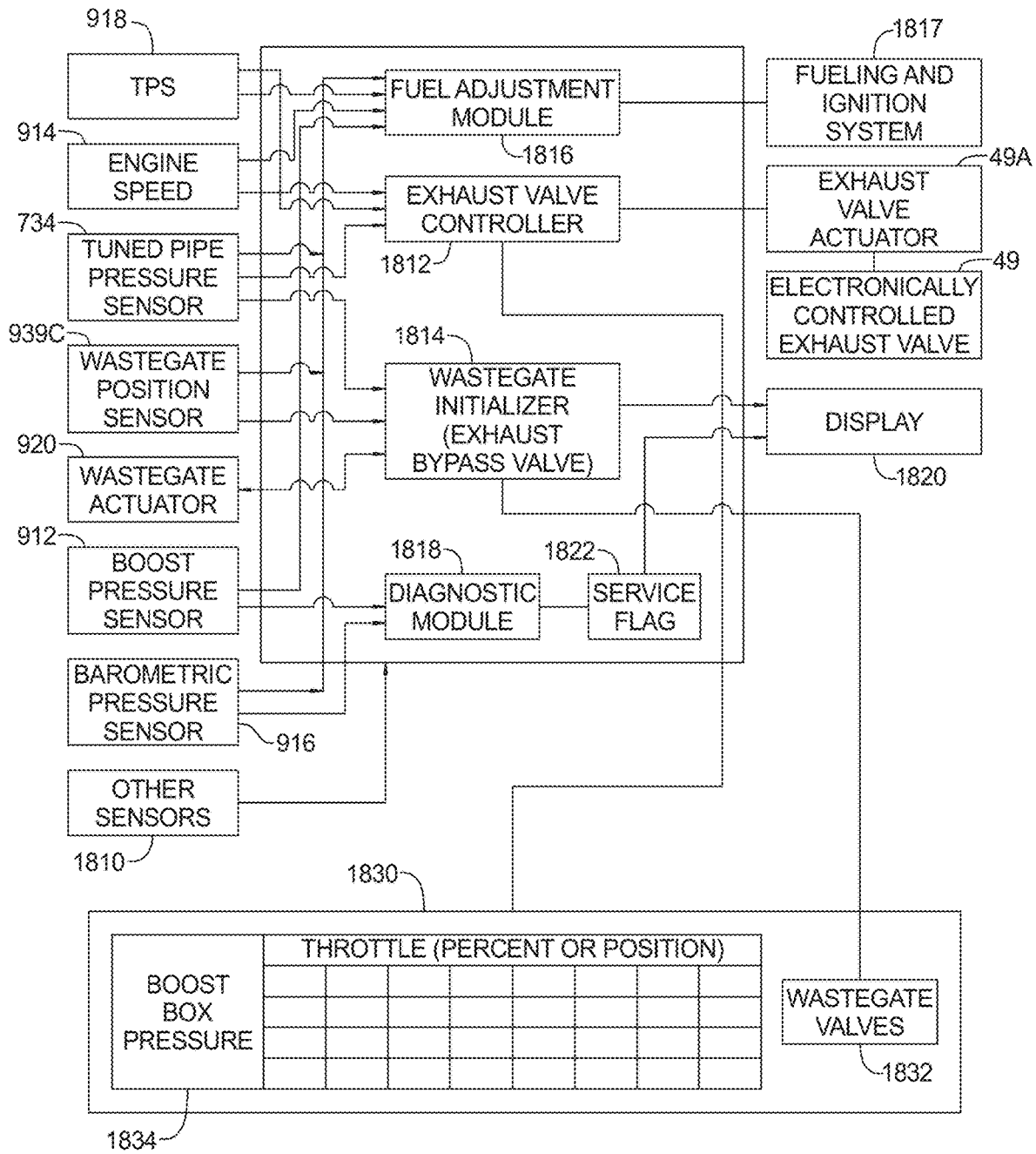
FIG. 18 is a block diagrammatic view of a system for controlling the engine in further detail relative to a sensor diagnostic mode, a wastegate initialization mode, an exhaust valve controller and fuel adjustment module.

Referring now to FIG. 18, the controller 910 of FIG. 9A is illustrated with different modules disposed therein. In this example, the controller 910 is coupled to various sensors including all of the sensors illustrated in FIG. 9A. In this example, all of the sensors are not specifically illustrated. The throttle position sensor 918 is illustrated, the wastegate position sensor 939C, a boost pressure sensor 912, engine speed sensor 914, the atmospheric or barometric pressure sensor 916, the tuned pipe pressure sensor 734 and other sensors 1810 including the other sensors set forth in FIG. 9A.

The controller 910 includes controller 1812, a wastegate initializer module 1814 a fuel adjustment module 1816 and a sensor diagnostic module 1818. The exhaust valve controller 1812 controls the position of the electronically controlled exhaust valve 49. The wastegate initializer 1814 is used to initialize the position of the wastegate to zero out any inconsistencies. The wastegate initializer 1814 may generate a screen display such as an indicator light or a display on the touch screen at the display 1820. The fuel adjustment module 1816 performs fuel amount adjustments in response to one or more of the boost pressure, the barometric pressure, the engine speed and the throttle position as determined by the sensors.

The sensor diagnostic module 1818 may generate a service flag 1822 and generate an indicator on the display 1820. The service flag 1822 may be set within the software of the system.

A memory 1830 stores various parameters and calibratable data therein. In this example, wastegate values 1832 are stored within the memory. As well, a table having boost box pressure and throttle position for determining the position of an electronically controlled exhaust valve is set forth in the memory portion 1834. The modules 1812 through 1818 are described in further detail below.

Figure 19:
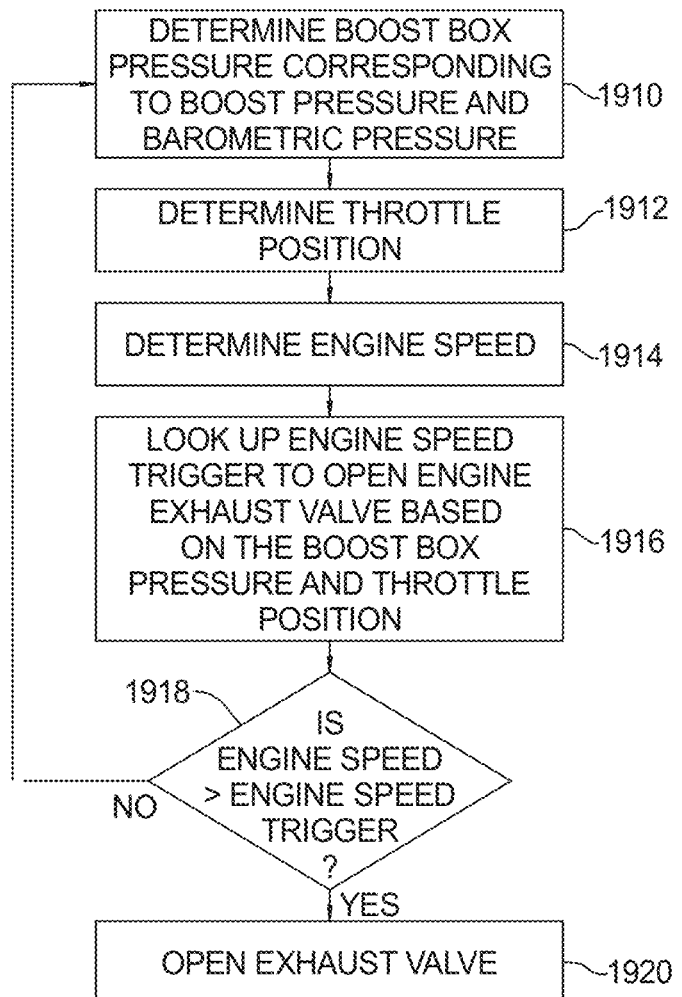
FIG. 19 is a flowchart of a method for controlling an engine based upon the absolute air box pressure.

Referring now to FIG. 19, a method of operating the engine, and in particular the exhaust valve controller 1812 of FIG. 18 is set forth. The method of FIG. 19 may be performed in engines with or without a turbocharger. In the following method, a method for controlling the electronically controlled exhaust valves of the engine is set forth. The throttle position and the absolute air box or boost box pressure is used to determine the engine speed at which the exhaust valve controller 1812 commands the electronically controlled exhaust valve 49 to move.

In step 1910, the boost box pressure is determined. The boost box pressure takes into consideration the turbocharger boost if in a turbocharged engine and the barometric pressure, each of which are present within the boost box. In step 1912, the throttle position is determined. The throttle position is determined from the throttle position signal. Typically, the throttle position is a percentage of the amount that the throttle is opened. In step 1914, the engine speed from the engine speed sensor is determined. Typically, the engine speed is a value corresponding to the rotational speed of the crankshaft. In step 1916, the boost box pressure signal and the throttle position signal are used to determine the engine speed at which to trigger the opening of the exhaust valve. In step 1918 when the engine speed reaches the engine speed trigger or is greater than the engine speed trigger step 1920 opens the exhaust valve. In step, 1918 when the engine speed is not greater than the engine speed trigger the system repeats in step 1910. As mentioned above, step 1916 uses a two-dimensional boost box/throttle position table such as that illustrated in FIG. 18 as reference numeral 1834. By controlling the movement of the electronically controlled exhaust valve of the engine based upon the boost box pressure, the varying elevation and how the engine runs due to the different barometric pressures is taken into consideration. Thus, a smoother and better operating engine is achieved.

Figure 20:
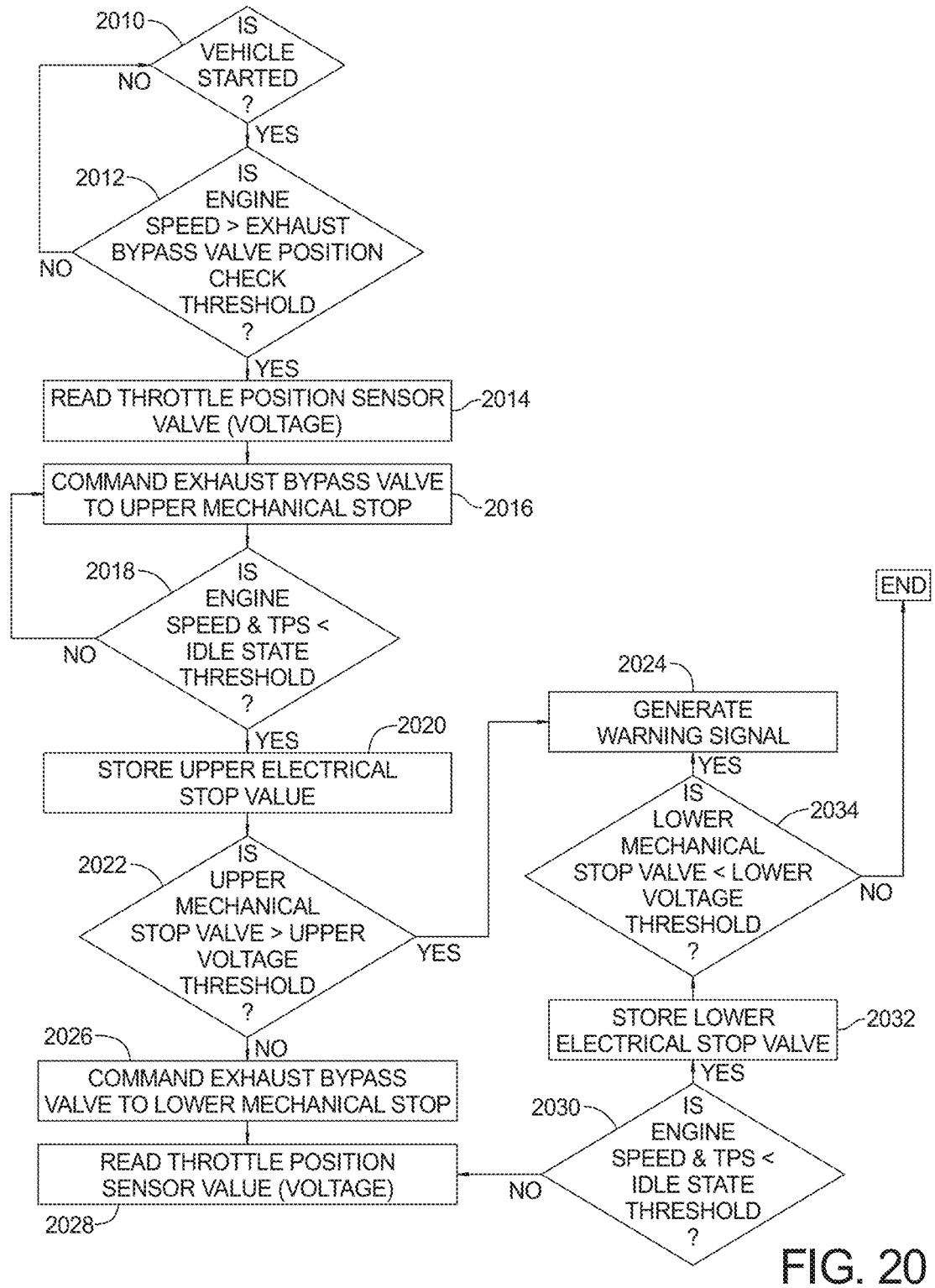
FIG. 20 is a method for checking the range of a wastegate upon startup.

Referring now to FIG. 20, a method for checking the wastegate or exhaust bypass valve is set forth. The wastegate is placed in a parallel flow path to the turbocharger and has an upper and lower mechanical stop that are learned for accurate control of the wastegate. The lower mechanical stop and upper mechanical stop are learned by the controller 910 using the wastegate initializer 1814 described above. Essentially, the voltage readings at each stop are learned. The following method allows the voltages at each stop to be learned, stored and used during operation and compared to determine whether the voltages are out of range so that an indicator may be generated to the vehicle operator.

In step 2010, the system determines whether the vehicle has started. When the vehicle has started, step 2012 determines if the engine speed is greater than an exhaust bypass valve position check threshold. When the engine speed is greater than an exhaust bypass valve position check threshold step 2016 is performed. In step 2012 when the engine speed is not greater than the check threshold step 2010 is repeated. In step 2014, the position of the valve is determined by reading the throttle position sensor voltage. In step 2016, the exhaust bypass valve is commanded to the upper mechanical stop. In step 2018, the engine speed sensor and throttle position sensor are checked if they are less than an idle state threshold. If the throttle position value or engine speed value is above the threshold the sensor outputs continually read in step 2018. When the throttle position sensor value and engine speed value are below the idle state threshold step 2020 stores the voltage value at the upper electrical stop. In step 2022 it is determined whether the upper mechanical stop value is greater than an upper voltage threshold. Step 2024 generates a warning signal such as an indicator or audible signal at the vehicle display. In step 2022 when the upper mechanical stop value is not greater than an upper voltage threshold step 2026 commands the exhaust bypass valve to a lower mechanical stop. In step 2028 the throttle position sensor value is read. That is, the voltage is monitored in step 2028. In step 2030 the throttle position sensor value and engine speed sensor value are monitored to determine they are less than an idle state threshold. When the values are not below an idle state threshold step 2028 is again performed. When the throttle position sensor value and engine speed value are below the idle state threshold, step 2032 stores the lower electrical stop voltage value. After step 2032, step 2034 determines whether the lower mechanical stop value is less than a lower voltage threshold. When the lower mechanical stop value is not less than the lower mechanical voltage threshold, step 2010 is again performed. In step 2034 when the lower mechanical stop value is less than a lower voltage threshold a warning signal is generated in step 2024.

Figure 21:
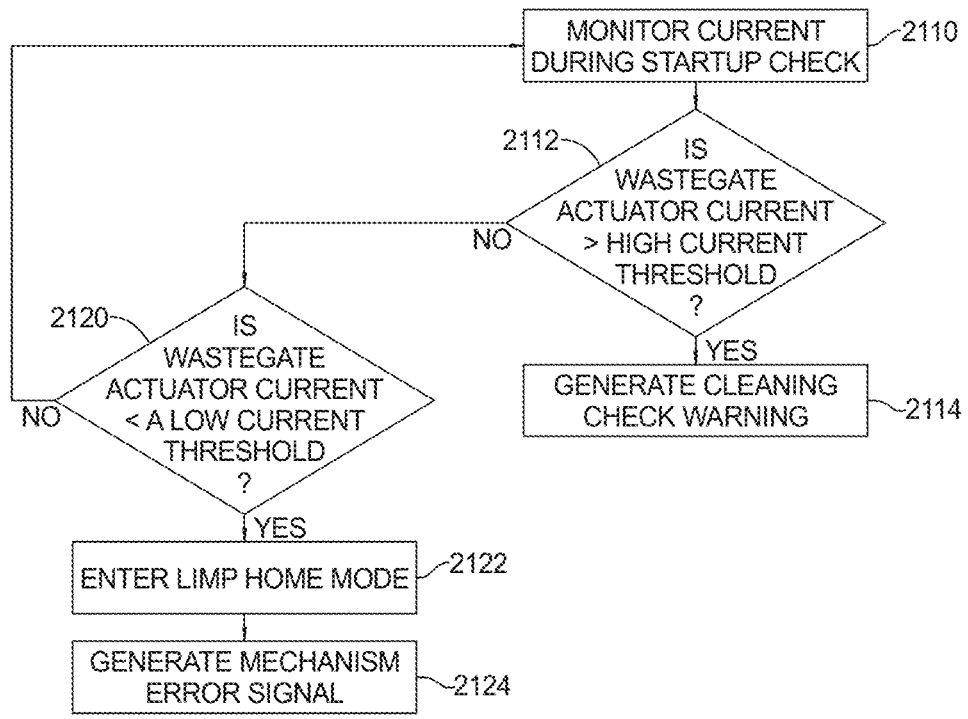
FIG. 21 is a flowchart of a method for monitoring the current of the wastegate upon startup.

Referring now to FIG. 21, a method for monitoring the current during startup is set forth. In step 2110 the current during the startup check performed in FIG. 20 is monitored. When the wastegate or exhaust bypass valve actuator current is higher than a high current threshold step 2114 generates a cleaning check warning. A high current may be generated when the system is encumbered by snow, ice or other debris.

In step 2112 when the wastegate actuator current or exhaust gas bypass valve current is not greater than a high threshold the wastegate actuator current is compared to a low current threshold in step 2120. When the wastegate current is not below a low threshold current step 2110 is again performed. When the wastegate actuator current is greater than a low current threshold step 2122 causes the engine controller 910 to enter a limp home mode and thereafter step 2124 generates a mechanism error signal and optionally a warning display.

The methods set forth in FIGS. 20 and 21 allow the wear to the wastegate to be monitored which can impact the current consumption of the actuator and change the airflow characteristics of the wastegate or exhaust gas bypass valve with regard to the control position. The system also allows the interface between the electrical actuator output shaft and the wastegate rotating assembly to be monitored. In some instances wear can lead to chatter in an otherwise stable system. Ice buildup or other debris on the rotating assembly can be monitored. When debris or ice buildup occurs, a slow response of the wastegate can cause an overshoot of the system because the system tries to correct for the response time based on the undershoot. Corrections in FIG. 20 using the voltage, the system may be continually monitored for out of range values.

Figure 22:
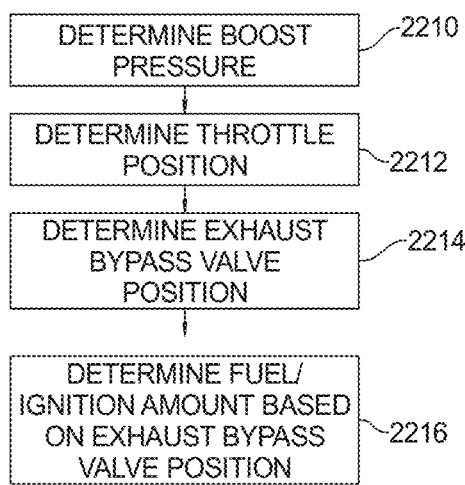
FIG. 22 is a flowchart of a method of controlling fueling and ignition based upon the wastegate position.

Referring now to FIG. 22, a method for controlling a fuel and ignition system for fueling and controlling the timing of ignition of the engine is set forth. In step 2210 the boost pressure for the engine is determined. In step 2212 the throttle position desired for the engine is also determined. In step 2214 the exhaust bypass valve position is determined. In step 2216 the fuel ignition amount based upon the exhaust bypass valve position is generated. The amount of fuel for the fuel system is determined during development of the engine. The fuel and ignition are also a function of the boost pressure at the specific throttle position. However, in conjunction with the exhaust bypass valve position, the engine speed may be maintained at a more stable position.

Figure 23:
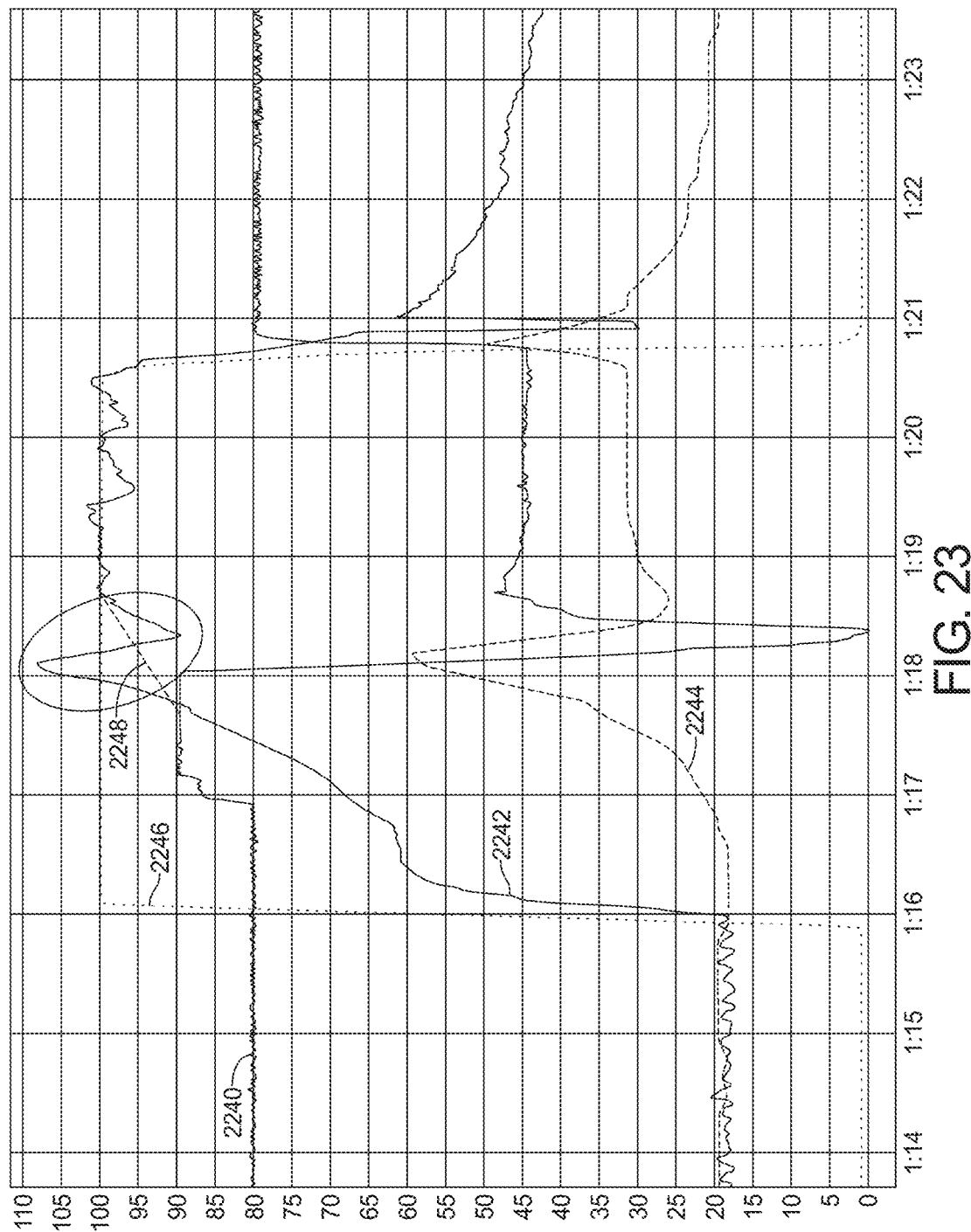
FIG. 23 is a signal diagram of the engine speed uncorrected and corrected relative to the wastegate position and the throttle position and the boost pressure.

Referring now to FIG. 23, wastegate position signal 2240 is shown having an abrupt drop which causes the engine speed signal 2242 to rapidly increase then decrease. The rapid increase and decrease are shown as well at the boost pressure signal 2244. The throttle position signal 2246 as can be seen is maintained in the region of the wastegate position signal rapidly decreasing. By controlling the fueling and the spark the engine RPM may have the upward spike and downward spike eliminated as illustrated by the dashed line 2248.

Figure 24:
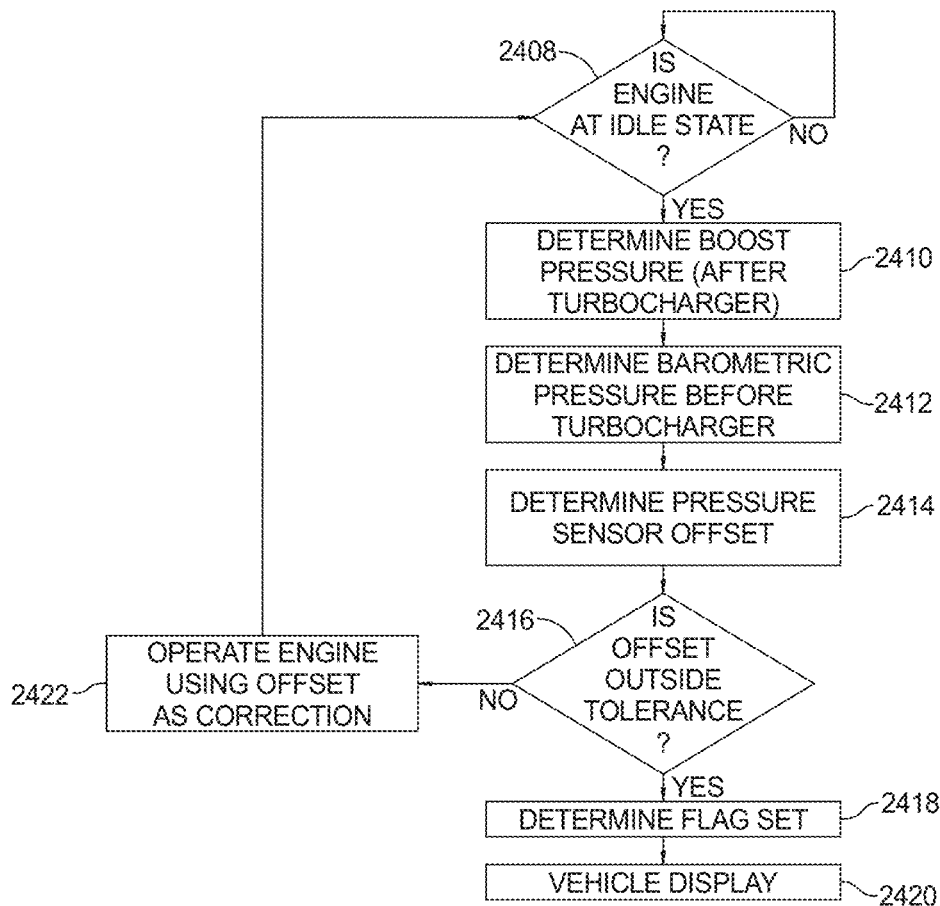
FIG. 24 is a flowchart of a method for determining the difference between barometric pressure and the boost sensor.
Figure 25:
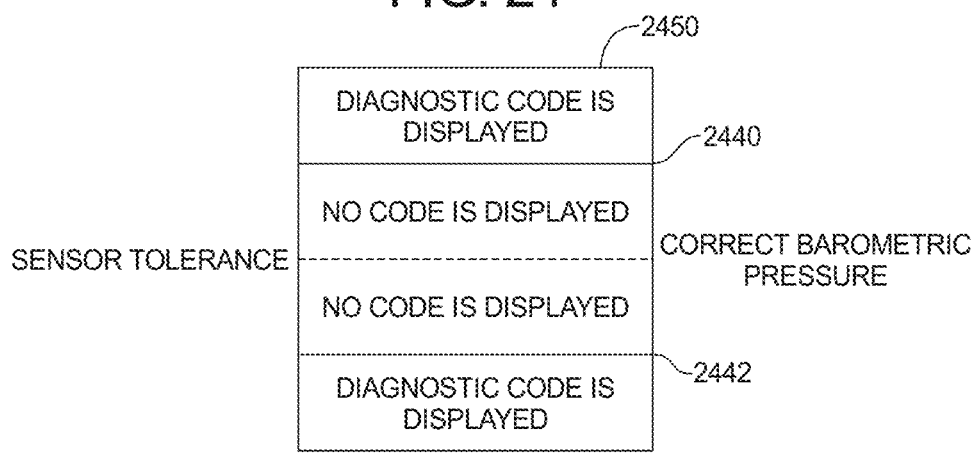
FIG. 25 is a diagrammatic view of a diagnostic threshold for use with the method of FIG. 24.

Referring now to FIG. 24, the method for diagnosing a turbocharger system is set forth. In this example, production pressure sensors that are mass-produced have various tolerances. The barometric pressure sensor and the boost pressure sensor may have different readings when exposed to the same pressures. The present system allows the difference to be set to zero in the control software. However, there is also a check for the diagnosing of a sensor failure. The following is performed at idle. In step 2408 it is determined whether the engine is at idle state. If the system is not step 2408 is performed. If the engine is at idle in step 2408, step 2410 is performed. In step 2410, the boost pressure after the turbocharger is determined. This is determined from a boost pressure signal generated from a boost pressure sensor that is disposed downstream of the turbocharger compressor. In step 2412, the barometric pressure is determined from a barometric pressure sensor that is disposed before the turbocharger. In step 2414, a pressure sensor offset value between the barometric pressure signal and the boost pressure signal is determined by comparing the barometric pressure and the boost pressure signal. In step 2416, it is determined whether the pressure sensor offset is outside a tolerance. The tolerance may have a threshold 2440 and 2442 as illustrated in FIG. 25. When the pressure sensor offset is outside of the tolerance meaning outside of the sensor acceptable tolerance range as defined by thresholds 2440 and 2442, a service flag may be set in the software in step 2418. Also, a vehicle display is generated in step 2420. One example of a vehicle display is that set forth as the display 2450 of FIG. 25. A red indicator may be generated when the difference between the boost pressure and the barometric pressure are outside of the range. It should be noted that the system measures the boost pressure and barometric pressure in steps 2410 and 2412 upon startup of the engine when no boost pressure from the turbocharger is being generated. In this state both the boost pressure and the barometric pressure should be identical. The engine may be allowed to operate in a limited manner in a limp home mode to allow the vehicle operator to seek help. When the offset is within the range, the boost pressure is corrected by the offset value and the engine operates using corrected boost pressure in step 2422. After step 2422, the method restarts in 2408.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed:

1. A method comprising:
   determining an exhaust bypass valve position from an exhaust bypass valve position signal; and
   controlling a fuel and ignition system based on the exhaust bypass valve position signal.

2. The method of claim 1 further comprising determining a throttle position and wherein controlling comprises controlling the fuel and ignition system based on the throttle position.

3. The method of claim 1 further comprising determining a boost pressure of a turbocharger and wherein controlling comprises controlling the fuel and ignition system based on the boost pressure.

4. The method of claim 1 wherein controlling the fuel and ignition system comprises controlling a fuel amount.

5. The method of claim 1 wherein controlling the fuel and ignition system comprises controlling a timing of an ignition of an engine.

6. The method of claim 1 wherein determining the exhaust bypass valve position from the exhaust bypass valve position signal comprises determining the exhaust bypass valve position from the exhaust bypass valve position signal from an exhaust bypass valve receiving exhaust gasses from a center portion of a tuned pipe of a two-stroke engine.

7. The method of claim 1 further comprising determining a boost pressure of a turbocharger of a two-stroke engine and wherein controlling comprises controlling the fuel and ignition system of the two-stroke engine based on the boost pressure.

8. The method of claim 7 further comprising determining the boost pressure based on a boost offset, a raw boost and a barometric pressure.

9. The method of claim 7 further comprising determining the boost pressure from a raw boost with a boost offset and a barometric pressure removed.

10. The method of claim 7 further comprising determining the boost pressure based on filtering using a number of boost pressure readings.

11. A control system comprising:
- an engine having a tuned pipe extending therefrom;
- a turbocharger coupled to the engine;
- an exhaust bypass valve bypass coupled the tuned pipe; and
- a controller programmed to determine an exhaust bypass valve position from an exhaust bypass valve position signal and control a fuel and ignition system based on the exhaust bypass valve position signal.

12. The control system of claim 11 further comprising a throttle position sensor coupled to a throttle of the engine generating a throttle position signal corresponding to a position of the throttle, and wherein the controller is programmed to control the fuel and ignition system in response to the throttle position signal.

13. The control system of claim 11 wherein the controller is programmed to control a fuel amount.

14. The control system of claim 11 wherein the controller is programmed to control a timing of an ignition of the engine.

15. The control system of claim 11 wherein the controller is programmed to determined the exhaust bypass valve position from the exhaust bypass valve receiving exhaust gasses from a center portion of the tuned pipe, wherein the engine comprises a two-stroke engine.

16. The control system of claim 11 wherein the controller is programmed to control the fuel and ignition system based on a boost pressure.

17. The control system of claim 16 wherein the controller is programmed to determine the boost pressure based on a boost offset, a raw boost and a barometric pressure.

18. The control system of claim 16 wherein the controller is programmed to determine the boost pressure based on a raw boost with a boost offset and a barometric pressure removed.

19. The control system of claim 16 wherein the engine comprises a two-stroke engine and wherein the controller is programmed to control the fuel and ignition system of the two-stroke engine based on the boost pressure.

20. The control system of claim 19 wherein the controller is programmed to determine the boost pressure based on filtering using a number of boost pressure readings.

\* \* \* \* \*